US012333886B2

(12) United States Patent
Mennie et al.

(10) Patent No.: US 12,333,886 B2
(45) Date of Patent: Jun. 17, 2025

(54) COIN PAD FOR COIN PROCESSING SYSTEM

(71) Applicant: Cummins-Allison Corp., Mount Prospect, IL (US)

(72) Inventors: Douglas U. Mennie, Barrington, IL (US); John R. Blake, St. Charles, IL (US); Ricky Newsom, Bolingbrook, IL (US); James M. Rasmussen, Chicago, IL (US); Kevin M. Carrara, Des Plaines, IL (US); Glenn S. Gordon, Cameron Park, CA (US)

(73) Assignee: Cummins-Allison Corp., Mount Prospect, IL (US)

( * ) Notice: Subject to any disclaimer, the term of this patent is extended or adjusted under 35 U.S.C. 154(b) by 21 days.

(21) Appl. No.: 18/365,334

(22) Filed: Aug. 4, 2023

(65) Prior Publication Data

US 2023/0419762 A1 Dec. 28, 2023

Related U.S. Application Data

(60) Continuation of application No. 17/816,393, filed on Jul. 29, 2022, now Pat. No. 11,776,345, which is a (Continued)

(51) Int. Cl.
*G07D 3/12* (2006.01)
*G07D 5/02* (2006.01)

(52) U.S. Cl.
CPC ............... *G07D 3/128* (2013.01); *G07D 5/02* (2013.01); *G07D 2205/00* (2013.01)

(58) Field of Classification Search
CPC ...................................................... G07D 3/128
See application file for complete search history.

(56) References Cited

U.S. PATENT DOCUMENTS 4,203,603 A * 5/1980 Konta .................. A63F 7/2409 273/129 W
4,269,413 A * 5/1981 Langieri .................. A63F 7/26 273/DIG. 26

(Continued)

FOREIGN PATENT DOCUMENTS

CA 2189330 C 12/2000
CA 2235925 C 7/2001

(Continued)

OTHER PUBLICATIONS

NPL WO (Year: 2017).*

(Continued)

*Primary Examiner* — Thien M Le
*Assistant Examiner* — Asifa Habib

(57) ABSTRACT

A resilient coin sorting pad for imparting motion to a plurality of coins is provided, the resilient coin sorting pad designed to be coupled to a rotatable disc of a coin sorter, the resilient coin sorting pad being generally circular and having an outer periphery edge. The resilient coin sorting pad comprises a lower foam layer having a top surface, an upper skin layer coupled to the top surface of the foam layer, and a layer of mesh material. According to some embodiments, the upper skin layer comprises at least one layer of nitrile rubber and the layer of mesh material is nylon fiber mesh. According to some embodiments, the upper skin layer comprises at least two layers of nitrile rubber and the layer of mesh material is positioned between the at least two layers of nitrile rubber.

14 Claims, 27 Drawing Sheets

Related U.S. Application Data division of application No. 16/733,494, filed on Jan. 3, 2020, now Pat. No. 11,443,581.

(60) Provisional application No. 62/788,627, filed on Jan. 4, 2019.

(56) References Cited

U.S. PATENT DOCUMENTS 4,416,299 A 11/1983 Bergman
4,417,136 A 11/1983 Rushby
4,423,316 A 12/1983 Sano
4,434,359 A 2/1984 Watanabe
4,436,103 A 3/1984 Dick
4,454,414 A 6/1984 Benton
4,474,197 A 10/1984 Kinoshita
4,488,116 A 12/1984 Plesko
4,531,531 A * 7/1985 Johnson ................. G07D 3/128 453/31
4,543,969 A 10/1985 Rasmussen
4,549,561 A 10/1985 Johnson
4,556,140 A 12/1985 Okada
4,558,711 A 12/1985 Yoshiaki
4,564,036 A 1/1986 Ristvedt
4,570,655 A 2/1986 Raterman
4,594,664 A 6/1986 Hashimoto
4,602,332 A 7/1986 Hirose
4,607,649 A 8/1986 Taipale
4,620,559 A 11/1986 Childers
4,641,239 A 2/1987 Takesako
4,674,260 A 6/1987 Rasmussen
4,681,128 A 7/1987 Ristvedt
4,705,154 A 11/1987 Masho
4,718,218 A 1/1988 Ristvedt
4,731,043 A 3/1988 Ristvedt
4,733,765 A 3/1988 Watanabe
4,749,074 A 6/1988 Ueki
4,753,624 A 6/1988 Adams
4,753,625 A 6/1988 Okada
4,765,464 A 8/1988 Ristvedt
4,766,548 A 8/1988 Cedrone
4,775,353 A 10/1988 Childers
4,775,354 A 10/1988 Rasmussen
4,778,983 A 10/1988 Ushikubo
4,803,347 A 2/1989 Sugahara
4,804,830 A 2/1989 Miyagisima
4,812,629 A 3/1989 O'Neil
4,839,505 A 6/1989 Bradt
4,840,290 A 6/1989 Nakamura
4,844,369 A 7/1989 Kanayachi
4,848,556 A 7/1989 Shah
4,863,414 A 9/1989 Ristvedt
4,883,158 A 11/1989 Kobayashi
4,884,212 A 11/1989 Stutsman
4,900,909 A 2/1990 Nagashima
4,908,516 A 3/1990 West
4,921,463 A 5/1990 Primdahl
4,936,435 A 6/1990 Griner
4,953,086 A 8/1990 Fukatsu
4,954,697 A 9/1990 Kokubun
4,964,495 A 10/1990 Rasmussen
4,966,570 A 10/1990 Ristvedt
4,970,655 A 11/1990 Winn
4,971,187 A 11/1990 Furuya
4,971,324 A * 11/1990 Grabel .................... A63F 7/027 273/129 R
4,988,849 A 1/1991 Sasaki
4,992,647 A 2/1991 Konishi
4,995,848 A 2/1991 Goh
5,009,627 A 4/1991 Rasmussen
5,010,238 A 4/1991 Kadono
5,010,485 A 4/1991 Bigari
5,011,455 A 4/1991 Rasmussen
5,022,889 A 6/1991 Ristvedt
5,025,139 A 6/1991 Halliburton, Jr.
5,026,320 A 6/1991 Rasmussen
5,031,098 A 7/1991 Miller
5,033,602 A 7/1991 Saarinen
5,039,848 A 8/1991 Stoken
5,055,086 A 10/1991 Raterman
5,055,657 A 10/1991 Miller
5,056,643 A 10/1991 Kirberg
5,064,999 A 11/1991 Okamoto
5,067,928 A 11/1991 Harris
5,080,633 A 1/1992 Ristvedt
5,091,713 A 2/1992 Horne
5,104,353 A 4/1992 Ristvedt
5,105,601 A 4/1992 Horiguchi
5,106,338 A 4/1992 Rasmussen
5,111,927 A 5/1992 Schulze, Jr.
5,114,381 A 5/1992 Ueda
5,120,945 A 6/1992 Nishibe
5,123,873 A 6/1992 Rasmussen
5,129,205 A 7/1992 Rasmussen
5,135,435 A 8/1992 Rasmussen
5,140,517 A 8/1992 Nagata
5,141,443 A 8/1992 Rasmussen
5,141,472 A 8/1992 Todd
5,145,455 A 9/1992 Todd
5,146,067 A 9/1992 Sloan
5,154,272 A 10/1992 Nishiumi
5,163,866 A 11/1992 Rasmussen
5,163,867 A 11/1992 Rasmussen
5,163,868 A 11/1992 Adams
5,167,313 A 12/1992 Dobbins
5,175,416 A 12/1992 Mansvelt
5,176,565 A 1/1993 Ristvedt
5,179,517 A 1/1993 Sarbin
5,183,142 A 2/1993 Latchinian
5,184,709 A 2/1993 Nishiumi
5,194,037 A 3/1993 Jones
5,197,919 A 3/1993 Gelb
5,205,780 A 4/1993 Rasmussen
5,207,784 A 5/1993 Schwartzendruber
5,209,696 A 5/1993 Rasmussen
5,236,071 A 8/1993 Lee
5,243,174 A 9/1993 Veeneman
5,251,738 A 10/1993 Dabrowski
5,252,811 A 10/1993 Henochowicz
5,253,167 A 10/1993 Yoshida
5,259,491 A 11/1993 Ward, II
5,263,566 A 11/1993 Nara
5,265,874 A 11/1993 Dickinson
5,268,561 A 12/1993 Kimura
5,277,651 A 1/1994 Rasmussen
5,282,127 A 1/1994 Mil
5,286,226 A 2/1994 Rasmussen
5,286,954 A 2/1994 Sato
5,291,003 A 3/1994 Avnet
5,291,560 A 3/1994 Daugman
5,293,981 A 3/1994 Abe
5,297,030 A 3/1994 Vassigh
5,297,598 A 3/1994 Rasmussen
5,297,986 A 3/1994 Ristvedt
5,299,977 A 4/1994 Mazur
5,302,811 A 4/1994 Fukatsu
5,324,922 A 6/1994 Roberts
5,326,104 A 7/1994 Pease
5,370,575 A 12/1994 Geib
5,372,542 A 12/1994 Geib
5,374,814 A 12/1994 Kako
5,379,344 A 1/1995 Larsson
5,379,875 A 1/1995 Shames
5,382,191 A 1/1995 Rasmussen
5,390,776 A 2/1995 Thompson
5,401,211 A 3/1995 Geib
5,404,986 A 4/1995 Hossfield
5,410,590 A 4/1995 Blood
RE34,934 E 5/1995 Raterman
5,425,669 A 6/1995 Geib
5,429,550 A 7/1995 Mazur
5,440,108 A 8/1995 Tran
5,443,419 A 8/1995 Adams
5,450,938 A 9/1995 Rademacher

(56) References Cited

U.S. PATENT DOCUMENTS

| | | | |
|---|---|---|---|
| 5,453,047 | A | 9/1995 | Mazur |
| 5,458,285 | A | 10/1995 | Remien |
| 5,468,182 | A | 11/1995 | Geib |
| 5,470,079 | A | 11/1995 | LeStrange |
| 5,474,495 | A | 12/1995 | Geib |
| 5,474,497 | A | 12/1995 | Jones |
| 5,480,348 | A | 1/1996 | Mazur |
| 5,489,237 | A | 2/1996 | Geib |
| 5,500,514 | A | 3/1996 | Veeneman |
| 5,501,631 | A | 3/1996 | Mennie |
| 5,507,379 | A | 4/1996 | Mazur |
| 5,514,034 | A | 5/1996 | Jones |
| 5,520,577 | A | 5/1996 | Rasmussen |
| 5,531,309 | A | 7/1996 | Kloss |
| 5,538,468 | A | 7/1996 | Ristvedt |
| 5,542,880 | A | 8/1996 | Geib |
| 5,542,881 | A | 8/1996 | Geib |
| 5,553,320 | A | 9/1996 | Matsuura |
| 5,559,887 | A | 9/1996 | Davis |
| 5,564,546 | A | 10/1996 | Molbak |
| 5,564,974 | A | 10/1996 | Mazur |
| 5,564,978 | A | 10/1996 | Jones |
| 5,570,465 | A | 10/1996 | Tsakanikas |
| 5,573,457 | A | 11/1996 | Watts |
| 5,584,758 | A | 12/1996 | Geib |
| 5,592,377 | A | 1/1997 | Lipkin |
| 5,602,933 | A | 2/1997 | Blackwell |
| 5,615,625 | A | 4/1997 | Cassidy |
| 5,620,079 | A | 4/1997 | Molbak |
| 5,623,547 | A | 4/1997 | Jones |
| 5,625,562 | A | 4/1997 | Veeneman |
| 5,630,494 | A | 5/1997 | Strauts |
| 5,641,050 | A | 6/1997 | Smith |
| 5,650,605 | A | 7/1997 | Morioka |
| 5,650,761 | A | 7/1997 | Gomm |
| 5,652,421 | A | 7/1997 | Veeneman |
| 5,665,952 | A | 9/1997 | Ziarno |
| 5,679,070 | A | 10/1997 | Ishida |
| 5,684,597 | A | 11/1997 | Hossfield |
| 5,696,366 | A | 12/1997 | Ziarno |
| 5,743,373 | A | 4/1998 | Strauts |
| 5,746,299 | A | 5/1998 | Molbak |
| 5,774,874 | A | 6/1998 | Veeneman |
| 5,782,686 | A | 7/1998 | Geib |
| 5,799,767 | A | 9/1998 | Molbak |
| 5,813,510 | A | 9/1998 | Rademacher |
| 5,823,315 | A | 10/1998 | Hoffman |
| 5,830,054 | A | 11/1998 | Petri |
| 5,838,812 | A | 11/1998 | Pare, Jr. |
| 5,842,188 | A | 11/1998 | Ramsey |
| 5,842,916 | A | 12/1998 | Gerrity |
| 5,850,076 | A | 12/1998 | Morioka |
| 5,854,581 | A | 12/1998 | Mori |
| 5,865,673 | A | 2/1999 | Geib |
| 5,875,879 | A | 3/1999 | Hawthorn |
| 5,880,444 | A | 3/1999 | Shibata |
| 5,892,211 | A | 4/1999 | Davis |
| 5,892,827 | A | 4/1999 | Beach |
| 5,909,793 | A | 6/1999 | Beach |
| 5,909,794 | A | 6/1999 | Molbak |
| 5,913,399 | A | 6/1999 | Takemoto |
| 5,918,748 | A | 7/1999 | Clark |
| 5,940,623 | A | 8/1999 | Watts |
| 5,941,364 | A | 8/1999 | Wei |
| 5,944,162 | A | 8/1999 | Filiberti |
| 5,944,600 | A | 8/1999 | Zimmermann |
| 5,944,601 | A | 8/1999 | Hayashi |
| 5,951,476 | A | 9/1999 | Beach |
| 5,957,262 | A | 9/1999 | Molbak |
| 5,988,348 | A | 11/1999 | Martin |
| 5,995,949 | A | 11/1999 | Morioka |
| 5,997,395 | A | 12/1999 | Geib |
| 6,017,270 | A | 1/2000 | Ristvedt |
| 6,021,883 | A | 2/2000 | Casanova |
| 6,032,859 | A | 3/2000 | Muehlberger |
| 6,039,644 | A | 3/2000 | Geib |
| 6,039,645 | A | 3/2000 | Mazur |
| 6,042,470 | A | 3/2000 | Geib |
| 6,047,807 | A | 4/2000 | Molbak |
| 6,047,808 | A | 4/2000 | Neubarth |
| 6,056,104 | A | 5/2000 | Neubarth |
| 6,068,194 | A | 5/2000 | Mazur |
| 6,080,056 | A | 6/2000 | Karlsson |
| 6,082,519 | A | 7/2000 | Martin |
| 6,086,471 | A | 7/2000 | Zimmermann |
| 6,095,313 | A | 8/2000 | Molbak |
| 6,116,402 | A | 9/2000 | Beach |
| 6,131,625 | A | 10/2000 | Casanova |
| 6,139,418 | A | 10/2000 | Geib |
| 6,142,285 | A | 11/2000 | Panzeri |
| 6,145,738 | A | 11/2000 | Stinson |
| 6,154,879 | A | 11/2000 | Pare, Jr. |
| 6,168,001 | B1 | 1/2001 | Davis |
| 6,171,182 | B1 | 1/2001 | Geib |
| 6,174,230 | B1 | 1/2001 | Gerrity |
| 6,196,371 | B1 | 3/2001 | Martin |
| 6,196,913 | B1 | 3/2001 | Geib |
| 6,202,006 | B1 | 3/2001 | Scott |
| 6,213,277 | B1 | 4/2001 | Blad |
| 6,230,928 | B1 | 5/2001 | Hanna |
| 6,264,545 | B1 | 7/2001 | Magee |
| 6,308,887 | B1 | 10/2001 | Korman |
| 6,318,536 | B1 | 11/2001 | Korman |
| 6,318,537 | B1 | 11/2001 | Jones |
| 6,349,972 | B1 | 2/2002 | Geiger |
| 6,386,323 | B1 | 5/2002 | Ramachandran |
| 6,412,620 | B1 | 7/2002 | Imura |
| 6,431,342 | B1 | 8/2002 | Schwartz |
| 6,438,230 | B1 | 8/2002 | Moore |
| 6,456,928 | B1 | 9/2002 | Johnson |
| 6,471,030 | B1 | 10/2002 | Neubarth |
| 6,474,548 | B1 | 11/2002 | Montross |
| 6,484,863 | B1 | 11/2002 | Molbak |
| 6,484,884 | B1 | 11/2002 | Gerrity |
| 6,494,776 | B1 | 12/2002 | Molbak |
| 6,499,277 | B1 | 12/2002 | Warner |
| 6,503,138 | B2 | 1/2003 | Spoehr |
| 6,520,308 | B1 | 2/2003 | Martin |
| 6,522,772 | B1 | 2/2003 | Morrison |
| 6,547,131 | B1 | 4/2003 | Foodman |
| 6,552,781 | B1 | 4/2003 | Rompel |
| 6,554,185 | B1 | 4/2003 | Montross |
| 6,579,165 | B2 | 6/2003 | Kuhlin |
| 6,581,042 | B2 | 6/2003 | Pare, Jr. |
| 6,602,125 | B2 | 8/2003 | Martin |
| 6,609,604 | B1 | 8/2003 | Jones |
| 6,612,921 | B2 | 9/2003 | Geib |
| 6,637,576 | B1 | 10/2003 | Jones |
| 6,640,956 | B1 | 11/2003 | Zwieg |
| 6,644,696 | B2 | 11/2003 | Brown |
| 6,652,380 | B1 | 11/2003 | Luciano |
| 6,655,585 | B2 | 12/2003 | Shinn |
| 6,659,259 | B2 | 12/2003 | Knox |
| 6,662,166 | B2 | 12/2003 | Pare, Jr. |
| 6,663,675 | B2 | 12/2003 | Blake |
| 6,666,318 | B2 | 12/2003 | Gerrity |
| 6,719,121 | B2 | 4/2004 | Alexander |
| 6,755,730 | B2 | 6/2004 | Geib |
| 6,758,316 | B2 | 7/2004 | Molbak |
| 6,761,308 | B1 | 7/2004 | Hanna |
| 6,766,892 | B2 | 7/2004 | Martin |
| 6,783,452 | B2 | 8/2004 | Hino |
| 6,786,398 | B1 | 9/2004 | Stinson |
| 6,854,581 | B2 | 2/2005 | Molbak |
| 6,854,640 | B2 | 2/2005 | Peklo |
| 6,863,168 | B1 | 3/2005 | Gerrity |
| 6,892,871 | B2 | 5/2005 | Strauts |
| 6,896,118 | B2 | 5/2005 | Jones |
| 6,928,546 | B1 | 8/2005 | Nanavati |
| 6,950,810 | B2 | 9/2005 | Lapsley |
| 6,953,150 | B2 | 10/2005 | Shepley |
| 6,957,746 | B2 | 10/2005 | Martin |
| 6,966,417 | B2 | 11/2005 | Peklo |
| 6,976,570 | B2 | 12/2005 | Molbak |

(56) References Cited

U.S. PATENT DOCUMENTS 6,988,606 B2 1/2006 Geib
6,991,530 B2 1/2006 Hino
7,004,831 B2 2/2006 Hino
7,014,029 B2 3/2006 Winters
7,014,108 B2 3/2006 Sorenson
7,017,729 B2 3/2006 Gerrity
7,018,286 B2 3/2006 Blake
7,028,827 B1 4/2006 Molbak
7,036,651 B2 5/2006 Tam
7,083,036 B2 8/2006 Adams
7,113,929 B1 9/2006 Beach
7,131,580 B2 11/2006 Molbak
7,149,336 B2 12/2006 Jones
7,152,727 B2 12/2006 Waechter
7,158,662 B2 1/2007 Chiles
7,188,720 B2 3/2007 Geib
7,213,697 B2 5/2007 Martin
7,243,773 B2 7/2007 Bochonok
7,269,279 B2 9/2007 Chiles
7,303,119 B2 12/2007 Molbak
7,331,521 B2 2/2008 Sorenson
7,337,890 B2 3/2008 Bochonok
7,427,230 B2 9/2008 Blake
7,438,172 B2 10/2008 Long
7,464,802 B2 12/2008 Gerrity
7,500,568 B2 3/2009 Cousin
7,520,374 B2 4/2009 Martin
7,551,764 B2 6/2009 Chiles
7,552,810 B2 6/2009 Mecklenburg
7,580,859 B2 8/2009 Economy
7,604,107 B2 10/2009 Richard
7,654,450 B2 2/2010 Mateen
7,658,270 B2 2/2010 Bochonok
7,735,125 B1 6/2010 Alvarez
7,735,622 B2 * 6/2010 String .................... G07D 9/008
453/57
7,743,902 B2 6/2010 Wendell
7,778,456 B2 8/2010 Jones
7,819,308 B2 10/2010 Osterberg
7,874,478 B2 1/2011 Molbak
7,886,890 B2 2/2011 Blake
7,931,304 B2 4/2011 Brown
7,946,406 B2 5/2011 Blake
7,949,582 B2 5/2011 Mennie
7,963,382 B2 6/2011 Wendell
7,980,378 B2 7/2011 Jones
8,023,715 B2 9/2011 Jones
8,042,732 B2 10/2011 Blake
8,229,821 B2 7/2012 Mennie
8,346,610 B2 1/2013 Mennie
8,352,322 B2 1/2013 Mennie
8,393,455 B2 3/2013 Blake
8,443,958 B2 5/2013 Blake
RE44,252 E 6/2013 Jones
8,523,641 B2 9/2013 Kuykendall
8,545,295 B2 10/2013 Blake
8,602,200 B2 12/2013 Blake
8,607,957 B2 12/2013 Blake
8,616,359 B2 12/2013 Bochonok
RE44,689 E 1/2014 Wendell
8,684,159 B2 4/2014 Blake
8,684,160 B2 4/2014 Hallowell
8,701,860 B1 4/2014 Blake
8,950,566 B2 2/2015 Hallowell
8,959,029 B2 2/2015 Jones
9,058,626 B1 6/2015 Donaho
9,092,924 B1 7/2015 Rasmussen
9,330,515 B1 5/2016 Rasmussen
9,430,893 B1 8/2016 Blake
9,437,069 B1 9/2016 Blake
9,501,885 B1 11/2016 Yacoubian
9,508,208 B1 11/2016 Jagielinski
9,633,500 B1 4/2017 Blake
9,830,762 B1 11/2017 Blake
9,870,668 B1 1/2018 Jagielinski
9,875,593 B1 * 1/2018 Adams ................. G07D 11/235
9,916,713 B1 3/2018 Yacoubian
9,934,640 B2 4/2018 Blake
10,043,333 B1 8/2018 Adams
10,049,521 B1 8/2018 Blake
10,068,406 B1 9/2018 Jagielinski
10,089,812 B1 10/2018 Blake
10,181,234 B2 1/2019 Rasmussen
2001/0034203 A1 10/2001 Geib
2001/0048025 A1 12/2001 Shinn
2002/0065033 A1 5/2002 Geib
2002/0069104 A1 6/2002 Beach
2002/0074209 A1 6/2002 Karlsson
2002/0085745 A1 7/2002 Jones
2002/0095587 A1 7/2002 Doyle
2002/0107738 A1 8/2002 Beach
2002/0126885 A1 9/2002 Mennie
2002/0130011 A1 * 9/2002 Casanova ............... G07F 1/048
194/344
2002/0147588 A1 10/2002 Davis
2002/0151267 A1 10/2002 Kuhlin
2002/0162724 A1 11/2002 Hino
2002/0174348 A1 11/2002 Ting
2002/0179401 A1 12/2002 Knox
2003/0004878 A1 1/2003 Akutsu
2003/0013403 A1 1/2003 Blake
2003/0042110 A1 3/2003 Wilfong
2003/0081824 A1 5/2003 Mennie
2003/0124966 A1 7/2003 Hino
2003/0127299 A1 7/2003 Jones
2003/0150688 A1 8/2003 Martin
2003/0168309 A1 9/2003 Geib
2003/0168310 A1 9/2003 Strauts
2003/0182217 A1 9/2003 Chiles
2003/0190882 A1 10/2003 Blake
2003/0230464 A1 12/2003 Deaville
2003/0234153 A1 12/2003 Blake
2004/0021898 A1 2/2004 Ashizaki
2004/0055902 A1 3/2004 Peklo
2004/0092222 A1 5/2004 Kowalczyk
2004/0153406 A1 8/2004 Alarcon-Luther
2004/0153421 A1 8/2004 Robinson
2004/0154899 A1 8/2004 Peklo
2004/0173432 A1 9/2004 Jones
2004/0188221 A1 9/2004 Carter
2004/0195302 A1 10/2004 Washington
2004/0199924 A1 10/2004 Ganesh
2004/0200691 A1 10/2004 Geib
2004/0238319 A1 12/2004 Hand
2004/0238614 A1 12/2004 Yoshioka
2004/0256197 A1 12/2004 Blake
2005/0006197 A1 1/2005 Wendell
2005/0035140 A1 2/2005 Carter
2005/0040007 A1 2/2005 Geib
2005/0040225 A1 2/2005 Csulits
2005/0045450 A1 3/2005 Geib
2005/0067305 A1 3/2005 Bochonok
2005/0077142 A1 4/2005 Tam
2005/0086140 A1 4/2005 Ireland
2005/0087425 A1 4/2005 Peklo
2005/0096986 A1 5/2005 Taylor
2005/0098625 A1 5/2005 Walker
2005/0108165 A1 5/2005 Jones
2005/0109836 A1 5/2005 Ben-Aissa
2005/0121507 A1 6/2005 Brown
2005/0124407 A1 6/2005 Rowe
2005/0150740 A1 7/2005 Finkenzeller
2005/0156318 A1 7/2005 Douglas
2005/0205654 A1 9/2005 Carter
2005/0205655 A1 9/2005 Carter
2005/0228717 A1 10/2005 Gusler
2005/0256792 A1 11/2005 Shimizu
2006/0037835 A1 2/2006 Doran
2006/0054455 A1 3/2006 Kuykendall
2006/0054457 A1 * 3/2006 Long ....................... G07F 1/041
194/347
2006/0060363 A2 3/2006 Carter
2006/0064379 A1 3/2006 Doran
2006/0065717 A1 3/2006 Hurwitz

(56) References Cited

U.S. PATENT DOCUMENTS

| | | | | |
|---|---|---|---|---|
| 2006/0069654 | A1 | 3/2006 | Beach | |
| 2006/0087074 | A1* | 4/2006 | Moffett | G07F 17/3297 273/143 R |
| 2006/0146839 | A1 | 7/2006 | Hurwitz | |
| 2006/0148394 | A1 | 7/2006 | Blake | |
| 2006/0149415 | A1 | 7/2006 | Richards | |
| 2006/0151285 | A1 | 7/2006 | String | |
| 2006/0154589 | A1 | 7/2006 | String | |
| 2006/0175176 | A1 | 8/2006 | Blake | |
| 2006/0182330 | A1 | 8/2006 | Chiles | |
| 2006/0196754 | A1 | 9/2006 | Bochonok | |
| 2006/0205481 | A1 | 9/2006 | Dominelli | |
| 2006/0207856 | A1 | 9/2006 | Dean | |
| 2006/0219519 | A1 | 10/2006 | Molbak | |
| 2006/0253332 | A1 | 11/2006 | Dobbins | |
| 2006/0283685 | A1 | 12/2006 | Cousin | |
| 2007/0051582 | A1 | 3/2007 | Bochonok | |
| 2007/0071302 | A1 | 3/2007 | Jones | |
| 2007/0108015 | A1 | 5/2007 | Bochonok | |
| 2007/0119681 | A1 | 5/2007 | Blake | |
| 2007/0181676 | A1 | 8/2007 | Mateen | |
| 2007/0187494 | A1 | 8/2007 | Hanna | |
| 2007/0221470 | A1 | 9/2007 | Mennie | |
| 2007/0251800 | A1 | 11/2007 | Castleberry | |
| 2007/0269097 | A1 | 11/2007 | Chiles | |
| 2007/0270997 | A1 | 11/2007 | Brumfield | |
| 2008/0033829 | A1 | 2/2008 | Mennie | |
| 2008/0044077 | A1 | 2/2008 | Mennie | |
| 2008/0135608 | A1 | 6/2008 | Ireland | |
| 2008/0220707 | A1 | 9/2008 | Jones | |
| 2008/0223930 | A1 | 9/2008 | Rolland | |
| 2009/0018959 | A1 | 1/2009 | Doran | |
| 2009/0045031 | A1* | 2/2009 | Gunst | G07D 5/02 194/320 |
| 2009/0236200 | A1 | 9/2009 | Hallowell | |
| 2009/0236201 | A1 | 9/2009 | Blake | |
| 2009/0239459 | A1 | 9/2009 | Watts | |
| 2009/0242626 | A1 | 10/2009 | Jones | |
| 2009/0320106 | A1 | 12/2009 | Jones | |
| 2010/0038419 | A1 | 2/2010 | Blake | |
| 2010/0065623 | A1 | 3/2010 | Sauter | |
| 2010/0198726 | A1 | 8/2010 | Doran | |
| 2010/0234985 | A1 | 9/2010 | Shuren | |
| 2010/0261421 | A1 | 10/2010 | Wendell | |
| 2010/0276485 | A1 | 11/2010 | Jones | |
| 2010/0327005 | A1 | 12/2010 | Martin | |
| 2011/0098845 | A1 | 4/2011 | Blake | |
| 2011/0099105 | A1 | 4/2011 | Mennie | |
| 2011/0259961 | A1 | 10/2011 | Folk | |
| 2011/0270695 | A1 | 11/2011 | Jones | |
| 2012/0067950 | A1 | 3/2012 | Blake | |
| 2012/0156976 | A1 | 6/2012 | Blake | |
| 2013/0178139 | A1 | 7/2013 | Hallowell | |
| 2013/0199890 | A1 | 8/2013 | Blake | |
| 2013/0205723 | A1 | 8/2013 | Blake | |
| 2015/0101907 | A1 | 4/2015 | Hall | |
| 2015/0302678 | A1 | 10/2015 | Blake | |
| 2018/0108198 | A1 | 4/2018 | Rasmussen | |
| 2018/0108199 | A1 | 4/2018 | Blake | |
| 2019/0130690 | A1 | 5/2019 | Rasmussen | |
| 2019/0139348 | A1 | 5/2019 | Rasmussen | |
| 2024/0108972 | A1* | 4/2024 | Simone | A63F 7/2409 |

FOREIGN PATENT DOCUMENTS

| | | | |
|---|---|---|---|
| CA | 2143943 | C | 3/2003 |
| CA | 2660418 | A1 | 9/2009 |
| CN | 205541081 | U | 8/2016 |
| CN | 208433036 | U | 1/2019 |
| DE | 660354 | C | 5/1938 |
| DE | 3021327 | A1 | 12/1981 |
| EP | 0351217 | A2 | 1/1990 |
| EP | 0667973 | A1 | 8/1995 |
| EP | 0926634 | A2 | 6/1999 |
| EP | 1104920 | A1 | 6/2001 |
| EP | 1209639 | A2 | 5/2002 |
| EP | 1528513 | A1 | 5/2005 |
| FR | 2042254 | A5 | 2/1971 |
| GB | 2035642 | A | 6/1980 |
| GB | 2175427 | A | 11/1986 |
| GB | 2198274 | A | 6/1988 |
| GB | 2458387 | A | 9/2009 |
| GB | 2468783 | A | 9/2010 |
| GB | 2514241 | A | 11/2014 |
| GB | 2553928 | A | 3/2018 |
| JP | S4958899 | A | 6/1974 |
| JP | S5214495 | A | 2/1977 |
| JP | S5271300 | A | 6/1977 |
| JP | S5640992 | A | 4/1981 |
| JP | S57117080 | A | 7/1982 |
| JP | S5979392 | A | 5/1984 |
| JP | S6016271 | U | 2/1985 |
| JP | S62134168 | U | 8/1987 |
| JP | S62182995 | A | 8/1987 |
| JP | S62221773 | A | 9/1987 |
| JP | S62166562 | U | 10/1987 |
| JP | S6435683 | A | 2/1989 |
| JP | S6442789 | A | 2/1989 |
| JP | S6467698 | A | 3/1989 |
| JP | H01118995 | A | 5/1989 |
| JP | H01307891 | A | 12/1989 |
| JP | H0250793 | A | 2/1990 |
| JP | H02252096 | A | 10/1990 |
| JP | H0312776 | A | 1/1991 |
| JP | H0363795 | A | 3/1991 |
| JP | H0392994 | A | 4/1991 |
| JP | H03156673 | A | 7/1991 |
| JP | H0485695 | A | 3/1992 |
| JP | H04175993 | A | 6/1992 |
| JP | H0546839 | A | 2/1993 |
| JP | H05217048 | A | 8/1993 |
| JP | H05274527 | A | 10/1993 |
| JP | H0635946 | A | 2/1994 |
| JP | H06103285 | A | 4/1994 |
| JP | H09251566 | A | 9/1997 |
| JP | 2002117439 | A | 4/2002 |
| JP | 2003242287 | A | 8/2003 |
| JP | 2004213188 | A | 7/2004 |
| SE | 44244 | | 9/1988 |
| WO | 1985000909 | A1 | 2/1985 |
| WO | 1991006927 | A1 | 5/1991 |
| WO | 1991008952 | A1 | 6/1991 |
| WO | 1991012594 | A1 | 8/1991 |
| WO | 1991018371 | A1 | 11/1991 |
| WO | 1992008212 | A1 | 5/1992 |
| WO | 1992020043 | A1 | 11/1992 |
| WO | 1992020044 | A1 | 11/1992 |
| WO | 1992022044 | A1 | 12/1992 |
| WO | 1993000660 | A1 | 1/1993 |
| WO | 1993009621 | A1 | 5/1993 |
| WO | 1994006101 | A1 | 3/1994 |
| WO | 1994008319 | A1 | 4/1994 |
| WO | 1994023397 | A1 | 10/1994 |
| WO | 1995002226 | A1 | 1/1995 |
| WO | 1995004978 | A1 | 2/1995 |
| WO | 1995006920 | A1 | 3/1995 |
| WO | 1995009406 | A1 | 4/1995 |
| WO | 1995013596 | A1 | 5/1995 |
| WO | 1995019017 | A1 | 7/1995 |
| WO | 1995023387 | A1 | 8/1995 |
| WO | 1995030215 | A1 | 11/1995 |
| WO | 1996007163 | A1 | 3/1996 |
| WO | 1996007990 | A1 | 3/1996 |
| WO | 1996012253 | A1 | 4/1996 |
| WO | 1996027525 | A1 | 9/1996 |
| WO | 1996027859 | A1 | 9/1996 |
| WO | 1997022919 | A1 | 6/1997 |
| WO | 1997025692 | A1 | 7/1997 |
| WO | 1998024041 | A1 | 6/1998 |
| WO | 1998024067 | A1 | 6/1998 |
| WO | 1998048383 | A2 | 10/1998 |
| WO | 1998048384 | A2 | 10/1998 |
| WO | 1998048385 | A2 | 10/1998 |

(56) References Cited

FOREIGN PATENT DOCUMENTS

| | | | | |
|---|---|---|---|---|
| WO | 1998051082 A1 | 11/1998 | | |
| WO | 1998059323 A1 | 12/1998 | | |
| WO | 1999000776 A1 | 1/1999 | | |
| WO | 1999006937 A1 | 2/1999 | | |
| WO | 1999016027 A2 | 4/1999 | | |
| WO | 1999033030 A1 | 7/1999 | | |
| WO | 1999041695 A1 | 8/1999 | | |
| WO | 1999048057 A1 | 9/1999 | | |
| WO | 1999048058 A1 | 9/1999 | | |
| WO | 2000048911 A1 | 8/2000 | | |
| WO | 2000065546 A1 | 11/2000 | | |
| WO | 2001063565 A2 | 8/2001 | | |
| WO | 2002071343 A1 | 9/2002 | | |
| WO | 2003052700 A2 | 6/2003 | | |
| WO | 2003079300 A1 | 9/2003 | | |
| WO | 2003085610 A1 | 10/2003 | | |
| WO | 2003107280 A2 | 12/2003 | | |
| WO | 2004044853 A1 | 5/2004 | | |
| WO | 2004109464 A2 | 12/2004 | | |
| WO | 2005041134 A2 | 5/2005 | | |
| WO | 2005088563 A1 | 9/2005 | | |
| WO | 2006086531 A1 | 8/2006 | | |
| WO | 2007031770 A1 | 3/2007 | | |
| WO | 2007035420 A2 | 3/2007 | | |
| WO | 2007120825 A2 | 10/2007 | | |
| WO | WO-2017048894 A1 * | 3/2017 | ............... | G07D 3/00 |

OTHER PUBLICATIONS

Brandt; Model 966 Microsort™ Coin Sorter and Counter, 4 pages, (1979).
Childers Corporation: Computerized Sorter/Counter, "To coin an old adage, time is money . . . ," 3 pages (1981).
Cummins: JetSort® Coin Sorter Counter/CA-130XL Coin Wrapper, Cummins Automated Money Systems (AMS) Case Study—Fifth-Third, "6,000 Coin Per Minute Counter/Sorter Keeps pace With Fifth-Third Banks Money Processing Needs," (Form 13C1180), 2 pages (Nov. 1981).
Brandt: 95 Series Coin Sorter Counter, 2 pages (1982).
Brandt: Model 958 Coin Sorter/Counter, 5 pages (© 1982).
Cummins: JetSort® 700-01 Coin Sorter/Counter, Operating Instructions, 14 pages (1982).
Cummins: JetSort® 700-01/CA-118 Coin Wrapper, Cummins Automated Money Systems (AMS) Case Study—University State Bank, "Cummins Money Processing System Boosts Teller Service at University State Bank," (Form 13C1192), 2 pages (Mar. 1982).
Cummins: JetSort® 700-01, Cummins Automated Money Systems (AMS) Case Study—First State Bank of Oregon, "JetSort® Gives Bank Coin Service Edge," (Form 13C1196), 2 pages (Apr. 1982).
Cummins: JetSort®, "What do all these Banks have in Common . . . ," JetSort, CA-130XL coin wrapper, CA-118 coin wrapper, CA-4000 JetCount, (13C1203), 3 pages (Aug. 1982).
Brandt: Model 817 Automated Coin and Currency Ordering System, 2 pages (1983).
Brandt: Model 970 Coin Sorter and Counter, 2 pages (1983).
Cummins: The Universal Solution to All Coin and Currency Processing Needs (Form 13C1218 3-83), 1 page (Mar. 1983).
Cummins: JetSort® Model CA-750 Coin Sorter/Counter and CA-4050 JetCount currency counter, "Money Processing Made Easy," (Form 13C1221) 2 pages (Jun. 1983).
Cummins: JetSort® 701, Cummins Automated Money Systems (AMS) Case Study-Convenco Vending, "High Speed Coin Sorter increases coin processing power at Convenco Vending," (Form 13C1226), 2 pages (Jul. 1983).
Brandt: Model 960 High-Speed Coin Sorter & Counter, 2 pages (1984).
Cummins: JetSort® Model 1701 with JetStops, Operating Instructions Manual (Form 022-1329-00), 16 pages (1984).
Cummins: JetSort Models 701 and 750 , "State-of-the-art coin processing comes of age," 2 pages (Feb. 1984).
Cummins: JetSort® Model CA-750 Coin Processor (Item No. 50-152), 1 page (Jul. 1984).
Cummins: JetSort® Model 1760 brochure, (Form 023-1262-00), 2 pages (Jul. 1985).
Cummins: JetSort® Models 1770 and 3000, Communication Package specification and operating instructions, 10 pages (uncertain, possibly Nov. 1985).
Brandt: Model 1205 Coin Sorter Counter, 2 pages (1986).
Cummins: JetSort® Model 1770, "JetSort® Speed and Accuracy, Now with Communications," (Form 023-1272) 1 page (Oct. 1986).
Cummins: JetSort® 3000, "3,000 Coins per Minute," (Form 023-1312), 1 page (date unknown, est. 1987).
Cummins: JetSort®, "Venders Love JetSort," (13C1255), 1 page (Mar. 1987).
Cummins: JetSort® mailer, "One moving part simplicity," "Vendors-Are validators changing your coin and currency needs" (Form 023-1297), 3 pages (Apr. 1987).
Cummins: JetSort® 3200, Enhanced electronics for the JetSort® 3200 (Form 023-1350), 1 page (Apr. 1987).
Scan Coin: International Report, 49 pages (Apr. 1987).
Scan Coin: World, 2 pages (Feb. 1988).
Cummins: JetSort® "Time for a Change, Be a smashing success," (Form 023-1328), 1 page (Jun. 1988).
Cummins: JetSort® "Time for a Change—JetSort® vs. Brandt X," (Form 023-1330), 1 page (Jun. 1988).
Cummins: JetSort® "Time for a Change—No Coins Sorted After 3:00 or on Saturday," (Form 023-1327), 1 page (Aug. 1988).
Brandt: Model 8904 Upfeed—"High Speed 4-Denomination Currency Dispenser," 2 pages (1989).
Scan Coin: CDS Coin Deposit System-Technical Referens Manual, 47 pages (1989).
Cummins: JetSort® "High Speed Coin Sorter & Counter for Payphone Applications," "CTOCS Ready" (Form 023-1365), 2 pages (Mar. 1989).
Brandt: Model 952 Coin Sorter/Counter, 2 pages (date unknown, prior to Oct. 31, 1989).
Brandt: Model 940-6 High Speed Sorter/Counter, 2 pages (date unknown, prior to Oct. 31, 1989).
Brandt: Model 954 Coin Sorter/Counter, 2 pages (date unknown, prior to Oct. 31, 1989).
Brandt: Model 957 Coin Sorter/Counter, 2 pages (date unknown, prior to Oct. 31, 1989).
Cummins: JetSort® Series V High Speed Coin Sorter/Counter, (Form 023-1383), 2 pages (Sep. 1990).
Scan Coin: CDS MK 1 Coin Deposit System-Technical Manual, 32 pages (1991).
Royal Bank: Hemeon, Jade, "Royals Burlington drive-in bank provides customers 24-hour tellers," The Toronto Star, 1 page (Aug. 21, 1991).
Royal Bank: Oxby, Murray, "Royal Bank Opens "Super Branch,"" The Gazette Montreal, 2 pages (Sep. 14, 1991).
Royal Bank: Leitch, Carolyn, "High-Tech Bank Counts Coins," The Globe and Mail, 2 pages (Sep. 19, 1991).
Cummins: Cash Information and Settlement Systems (Form 023-1408), 4 pages (date Dec. 1991).
Brandt: Mach 7 High-Speed Coin Sorter/Counter, 2 pages (1992).
De La Rue: CDS 500 Cash Deponier System, 6 pages (date unknown, p. 5 has date May 1994, p. 6 has date Dec. 1992) (German).
Royal Bank: SuperBranch, "Experience the Ultimate in Convenience Banking," 2 pages (Feb. 1992).
Cash, Martin: Newspaper Article "Bank Blends New Technology with Service," Winnipeg Free Press, 1 page (Sep. 4, 1992).
Cummins: JetSort® High Speed Sorter/Counter Kits I & J-Operating Instructions (Form 022-7123-00) 12 pages (1994).
Meece, Mickey: Article "Development Bank of Singapore Gets Cobranding Edge with Smart Cards," American Banker, New York, NY, vol. 159, Iss. 195, p. 37, 2 pages (Oct. 10, 1994).
AUI: Coinverter—"No More Lines . . . Self-Serve Cash-Out,"by Cassius Elston, 1995 World Games Congress/Exposition Converter, 1 page (dated prior to 1995).
Cummins: JetSort® 3000 Series High Speed Coin Sorter (Form 023-1468 Rev 1), 2 pages (Feb. 1995).

(56) References Cited

OTHER PUBLICATIONS

Reis Eurosystems: CRS 6501/CRS 6510 Cash Receipt Systems for Self-Service Area, 3 pages (date unknown, prior to Aug. 13, 1996, maybe Feb. 1995).
Frisco Bay: Commercial Kiosk, “Provide self-service solutions for your business customers,” 4 pages (date unknown, prior to Mar. 2, 2011, p. 4 has date 1996).
Glory: CRS-8000 Cash Redemption System, 2 pages (1996).
Intellectual Australia Pty. Ltd.: Microbank, “From down under: Microbank,” “hand-held smart card terminal that combines smart card functions and telephone banking,” 2 pages (Feb. 1996).
ESD, Inc: Smartrac Card System, “Coinless laundry makes quarters obsolete; Smartrac Card System really makes a change in laundry industry,” Business Wire, 2 pages (Feb. 23, 1996).
ISH Electronic: ISH I2005/500 Coin Counter (with translation), 4 pages (date unknown, prior to Aug. 1996).
ISH Electronic: ISH I2005/501 Self-Service Unit (with translation), 4 pages (date unknown, prior to Aug. 1996).
De La Rue: CDS 5700 and CD8 5800 Cash Deponier System (German) and translation, 7 pages (date unknown, prior to Aug. 13, 1996).
NGZ Geldzahlmaschinengesellschaft: NGZ 2100 Automated Coin Depository, 4 pages (date unknown, prior to Sep. 1996).
Brandt: Model 920/925 Counter, 2 pages (date unknown, prior to Jul. 2011, possibly prior to Mar. 17, 1997).
Brandt: System 930 Electric Counter/Sorter, “Solving Problems, Pleasing Customer, Building Deposits,” 1 page (date unknown, prior to Mar. 2, 2011, possibly prior to Mar. 17, 1997).
Brandt: System 945 High-Speed Sorter, 2 pages (date unknown, prior to Mar. 2, 2011, possibly prior to Mar. 17, 1997).
Brandt: Model 1400 Coin Sorter Counter, 2 pages (date unknown, prior to Mar. 2, 2011, possibly prior to Mar. 17, 1997).
Diebold: Merchant MicroBranch, “Merchant MicroBranch Combines ATM After-Hour Depository Rolled-Coin Dispenser,” Bank Technology News, 1 page (Nov. 1997).
Cummins: JetSort® 2000 Series High Speed Coin Sorter/Counter (Form 023-1488), 2 pages (Oct. 2000).
Case ICC Limited: CDS Automated Receipt Giving Cash Deposit System, 3 pages (date unknown, prior to Nov. 15, 2000).
Amiel Industries: AI-1500 “Pulsar” High Performance Sorting and Bagging Machine, 13 pages (date unknown, but prior to Dec. 14, 2000).
CTcoin: CDS602 Cash Deposit System, 1 page (date unknown, prior to Jan. 15, 2001).
Glory: AMT Automated Merchant Teller, 4 pages (date unknown, prior to Jan. 15, 2001).
Hamilton: Hamiltons Express Banking Center, In Less Space Than a Branch Managers Desk, 4 pages (date unknown, prior to Jan. 15, 2001).
Namsys, Inc.: Namsys Express, Making currency management . . . more profitable, 2 pages (date unknown, prior to Jan. 15, 2001).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6520/ CRS 6525 Standard-Class Coin Deposit Systems, 1 page (date unknown, prior to Apr. 2003).
Reis Eurosystems: CS 3510 Disc-Sorter, 1 page (date unknown, prior to Apr. 2003).
Scan Coin: Money Processing Systems, 8 pages (date unknown, prior to Apr. 2003).
Scan Coin: CDS Cash Deposit System, 6 pages (date unknown, prior to Apr. 2003) [SC 0369].
Scan Coin: CDS 600 Users Manual, 14 pages (date unknown, prior to Apr. 2003).
Scan Coin: CDS 600 & CDS 640 Cash Deposit System-Technical Manual, 45 pages (date unknown, prior to Apr. 2003).
Scan Coin: SC 102 Value Counter Technical Manual, 28 pages (date unknown, prior to Apr. 2003).
Pay By Touch: Secure ID News, “Piggly Wiggly Extends Biometric Payments Throughout the Southeast U.S.,” 2 pages, (Dec. 14, 2005).
Scan Coin: Coin Sachet System brochure, 4 pages (last page marked “© Scan Coin / Jun. 2007”).
“3M Flexomount™ Solid Printing Tapes,” Technical Data, 5 pages (Jul. 2009).
Fa. GBS-Geldbearbeitungssysteme: GBS9401SB Technical Specification, 24 pages (date unknown, prior to Nov. 10, 2010).
“3M Repositionable Tapes,” Technical Data, 5 pages (Jan. 2011).
U.S. Appl. No. 13/836, 117, filed Mar. 15, 2013, Blake et al., System, Method and Apparatus for Automatically Filling a Coin Cassette.
Camloc Quick-Operating Fasteners, 86 pages (Release Feb. 2017, last 2 pages say Release Aug. 2014).
“New conductive ink for electronic apparel,” Phys Org, https://phys.org/news/2015-06-ink-electronic-apparel.html, 2 pages (Jun. 25, 2015).
U.S. Appl. No. 15/461,046, filed Mar. 16, 2017, Jagielinski, Systems, Methods and Devices for Processing Batches of Coins Utilizing Coin Imaging Sensor Assemblies.
U.S. Appl. No. 15/827,573, filed Nov. 30, 2017, Blake et al., System, Method and Apparatus for Repurposing Currency.
U.S. Appl. No. 16/028,068, filed Jul. 5, 2018, Adams et al., Systems, Methods and Devices for Coin Processing and Coin Recycling.
U.S. Appl. No. 16/059,765, filed Aug. 9, 2018, Blake et al., Systems, Methods and Devices for Managing Rejected Coins During Coin Processing.
U.S. Appl. No. 16/120,252, filed Sep. 1, 2018, Jagielinski et al., Systems, Methods and Devices for Processing Coins with Linear Array of Coin Imaging Sensors.
U.S. Appl. No. 16/224,246, filed Dec. 18, 2018, Rasmussen, Coin Sorting Head and Coin Processing System Using the Same.
U.S. Appl. No. 16/226,020, filed Dec. 19, 2018, Rasmussen et al., Coin Sorting System Coin Chute.
“Soft, Wearable Health Monitor with Stretchable Electronics,” by Georgia Institute of Technology, Tech Briefs, www.techbriefs.com, pp. 35-36, (Sep. 2019).
U.S. Appl. No. 16/733,494, filed Jan. 3, 2020, Mennie et al., Coin Pad for Coin Processing System.
Southco® Quarter-turn fastener information, 1st page entitled “82 DZUS® Performance Quarter-Turn Fasteners, Studs,” 22 pages (date unknown, obtained Jan. 22, 2020).
Southco® Quarter-turn fastener information, 1st page entitled “DZUS® Quarter-Turn Fasteners,” 63 pages (date unknown, obtained Jan. 22, 2020).
Southco® Quarter-turn fastener information, 1st page entitled “D5 Dzus® Panel Line Quarter-turn Fasteners, Studs” pages (date unknown, obtained Jan. 22, 2020).
Southco® Quarter-turn fastener information, 1st page entitled “D4 Dzus® Standard Line Quarter-Turn Fasteners, Stud Selection-Size 3” 15 pages (date unknown, obtained Jan. 22, 2020).
Southco® DZUS® Quarter-Turn Fasteners webpage, https://www.soutchco.com/en-us/product/hierarchy.htmlhid=7345, 1 page (date unknown, obtained Jan. 22, 2020).
McMaster-Carr Quarter-Turn information, 1 page (date unknown, obtained Jan. 22, 2020).
Search Report dated Jun. 17, 2020 in connection with United Kingdom Patent Application No. GB2000070.9, 4 pages.
Examination report dated Mar. 17, 2021 in connection with Canadian Application No. 3,066,598, 4 pages.
Examination Report under Section 18(3) dated Mar. 1, 2022, in connection with United Kingdom Application No. GB2000070.9, 5 pages.
Combined Search and Examination Report under Sections 17 and 18(3) dated Sep. 26, 2022 in connection with United Kingdom Application No. 2212540.5, 5 pages.
Combined Search and Examination Report under Sections 17 and 18(3) dated Mar. 27, 2023 in connection with United Kingdom Application No. 2302853.3, 6 pages.
Combined Search and Examination Report under Sections 17 and 18(3) dated Apr. 3, 2023 in connection with United Kingdom Application No. 2302854.1, 4 pages.

(56) References Cited

OTHER PUBLICATIONS

Examination Report under Section 18(3) dated May 24, 2023 in connection with United Kingdom Application No. 2302853.3, 4 pages.

Search Report under Section 17 dated Jul. 24, 2023, in connection with United Kingdom Application No. 2302902.5, 3 pages.

* cited by examiner

| | | | |
|---|---|---|---|
| OPTION #1 | OVERALL HEIGHT - .043" | | WARCO 80-P-987 - .028" |
| | | | FIBER MESH - .005" |
| | | | WARCO 80-P-987 - .010" |

| | | | |
|---|---|---|---|
| OPTION #2 | OVERALL HEIGHT - .043" | | WARCO 80-P-987 - .019" |
| | | | FIBER MESH - CENTERED - .005" |
| | | | WARCO 80-P-987 - .019" |

| | | | |
|---|---|---|---|
| OPTION #3 | OVERALL HEIGHT - .068" | | WARCO 80-P-987 - .053" |
| | | | FIBER MESH - .005" |
| | | | WARCO 80-P-987 - .010" |

COIN PAD FOR COIN PROCESSING SYSTEM

CROSS-REFERENCE TO RELATED APPLICATION(S)

This application is a continuation of U.S. patent application Ser. No. 17/816,393, filed Jul. 29, 2022, which is a divisional of U.S. patent application Ser. No. 16/733,494, filed Jan. 3, 2020, which claims priority to U.S. Provisional Patent Application No. 62/788,627, filed Jan. 4, 2019, the disclosures of which are incorporated herein by reference.

TECHNICAL FIELD

The present disclosure relates generally to coin sorting devices and, more particularly, to coin sorters of the type which use a coin-driving member and a coin-guiding member or sorting head for sorting coins of mixed diameters.

BACKGROUND

Generally, disc-type coin sorters sort coins according to the diameter of each coin. Typically, in a given coin set such as the United States coin set, each coin denomination has a different diameter. Thus, sorting coins by diameter effectively sorts the coins according to denomination.

Disc-type coin sorters typically include a resilient pad (disposed on a rotating disc) that rotates beneath a stationary sorting head having a lower surface positioned parallel to the upper surface of the resilient pad and spaced slightly therefrom. The rotating, resilient pad presses coins upward against the sorting head as the pad rotates. The lower surface of sorting head includes a plurality of shaped regions including exit slots for manipulating and controlling the movement of the coins. Each of the exit slots is dimensioned to accommodate coins of a different diameter for sorting the coins based on diameter size. As coins are discharged from the sorting head via the exit slots, the sorted coins may follow respective coin paths to, for example, sorted coin receptacles where the sorted coins are stored.

Although coin sorters have been used for a number of years, problems are still encountered in this technology. For example, as coins are guided by the sorting head, portions of the sorting head and/or pad become worn due to friction between the stationary sorting head and the moving coins.

SUMMARY

According to some embodiments of the present disclosure, a resilient coin sorting pad for imparting motion to a plurality of coins is provided, the resilient pad designed to be coupled to a rotatable disc of a coin sorter, the resilient pad being generally circular and having an outer periphery edge. The resilient pad comprises a lower foam layer having a top surface, an upper skin layer coupled to the top surface of the foam layer, and a layer of mesh material. According to some embodiments, the upper skin layer comprises at least one layer of nitrile rubber and the layer of mesh material is Kevlar® fiber mesh. According to some embodiments, the upper skin layer comprises at least one layer of nitrile rubber and the layer of mesh material is nylon fiber mesh having woven pattern such as a leno or a triaxial weave pattern. According to some embodiments, the upper skin layer comprises at least two layers of nitrile rubber and the layer of mesh material is positioned between the at least two layers of nitrile rubber.

The above summary of the present disclosure is not intended to represent each embodiment, or every aspect, of the present disclosure. Additional features and benefits of the present disclosure will become apparent from the detailed description, figures, and claims set forth below.

BRIEF DESCRIPTION OF THE DRAWINGS

10A is a perspective view.

Figure 1A:
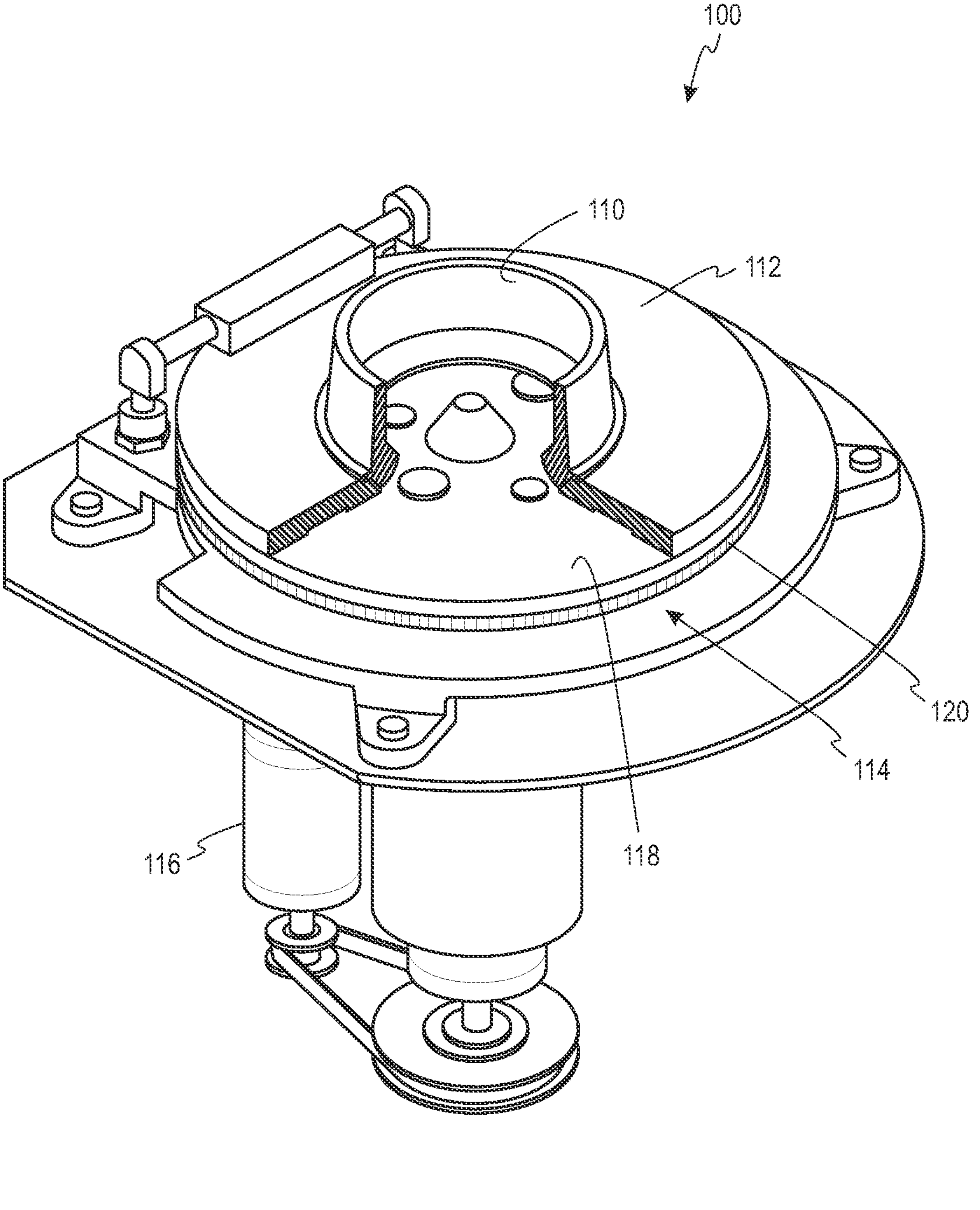
FIG. 1A is a perspective view of a coin processing system or coin sorter, according to some embodiments of the present disclosure, with portions thereof broken away to show the internal structure.

While the disclosure is susceptible to various modifications and alternative forms, specific embodiments will be shown by way of example in the drawings and will be desired in detail herein. It should be understood, however, that the disclosure is not intended to be limited to the particular forms disclosed. Rather, the disclosure is to cover all modifications, equivalents and alternatives falling within the spirit and scope of the inventions as defined by the appended claims.

DETAILED DESCRIPTION

Turning now to the drawings and referring first to FIG. 1A, a disc-type coin processing system or coin sorter 100 according to some embodiments of the present disclosure is shown. FIG. 1A is a perspective view of a coin processing system or coin sorter, according to some embodiments of the present disclosure, with portions thereof broken away to show the internal structure. The coin processing system 100 includes a hopper 110 for receiving coins of, for example, mixed denominations that feeds the coins through a central opening in an annular sorting head 112. As the coins pass through this opening, they are deposited on the top surface of a rotatable disc 114. This rotatable disc 114 is mounted for rotation on a shaft (not shown) and driven by an electric motor 116. The disc 114 typically comprises a resilient pad 118, preferably made of a resilient rubber or polymeric material, bonded to the top surface of a solid disc 120. While the solid disc 120 is often made of metal, it can also be made of a rigid polymeric material.

According to some embodiments, coins are initially deposited by a user or operator in a coin tray (not shown) disposed above the coin processing system 100 shown in FIG. 1A. The user lifts the coin tray which funnels the coins into the hopper 110. A coin tray suitable for use in connection with the coin processing system 100 is described in detail in U.S. Pat. No. 4,964,495, which is incorporated herein by reference in its entirety.

As the disc 114 is rotated, the coins deposited on the resilient pad 118 tend to slide outwardly over the surface of the pad 118 due to centrifugal force. As the coins move outwardly, those coins which are lying flat on the pad 118 enter a gap between the surface of the pad 118 and the sorting head 112 because the underside of the inner periphery of the sorting head 112 is spaced above the pad 118 by a distance which is about the same as the thickness of the thickest coin the coin sorter 100 is designed to sort. The coins are processed and sent to exit stations or channels where they are discharged. The coin exit stations or channels may sort the coins into their respective denominations and discharge the coins from the sorting head 112 corresponding to their denominations.

Figure 1B:
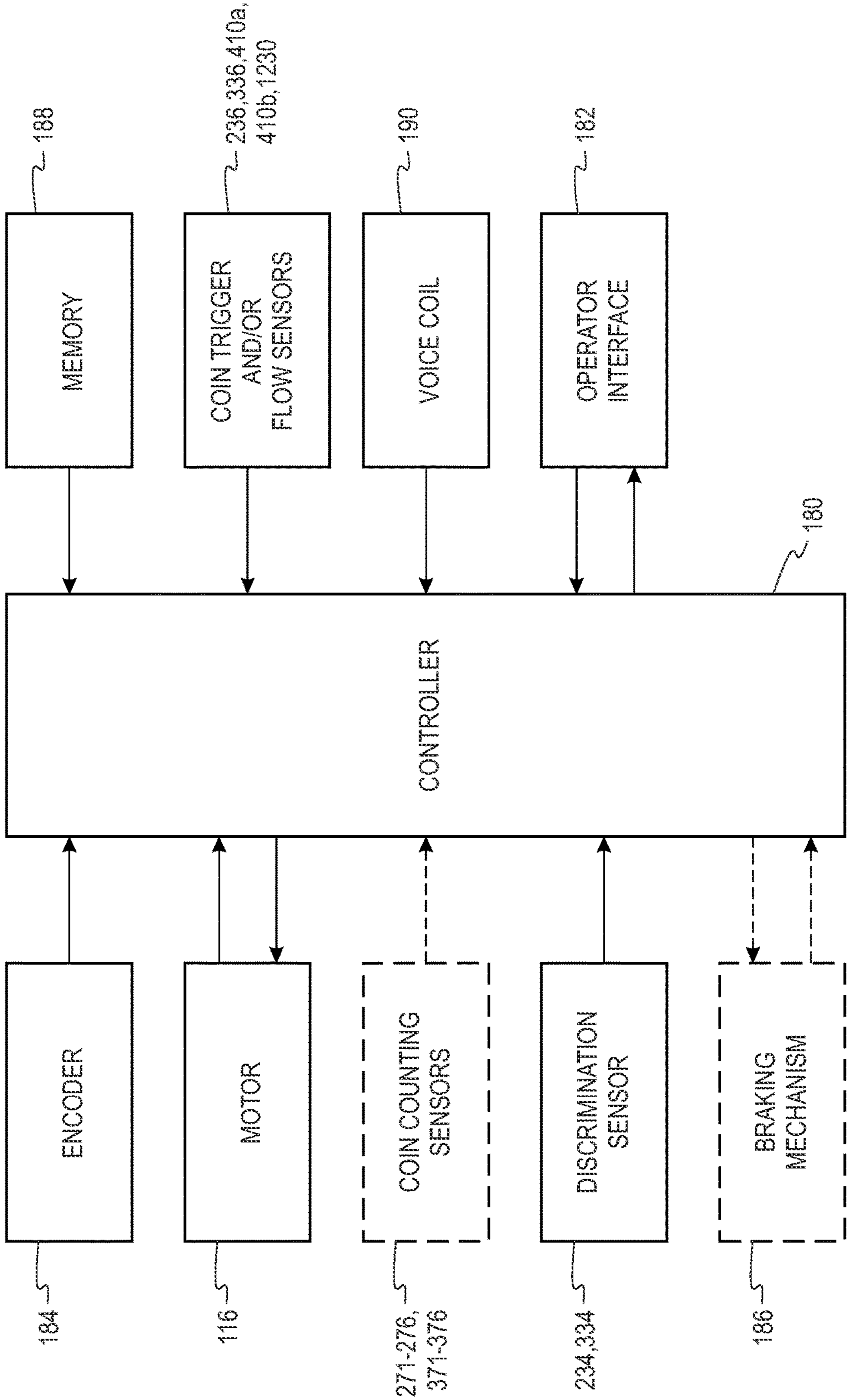
FIG. 1B is a functional block diagram of a control system for the coin processing system shown in FIG. 1A.

FIG. 1B is a functional block diagram of a control system for the coin processing system 100 shown in FIG. 1A which may be employed with the sorting heads 112, 212, 312 to be subsequently described. FIG. 1B illustrates a system controller 180 and its relationship to the other components in the coin processing system 100. More details regarding a system controller 180 and its relationship to the other components in the coin processing system 100 are described in U.S. Pat. No. 7,743,902, which is incorporated herein by reference in its entirety. But briefly, an operator of system 100 communicates with the coin processing system 100 via an operator interface 182 which is configured to receive information from the operator and display information to the operator about the functions and operation of the coin processing system 100. The controller 180 monitors the angular position of the disc 114 via an encoder 184 which sends an encoder count to the controller 180 upon each incremental movement of the disc 114. Based on input from the encoder 184, the controller 180 determines the angular velocity at which the disc 114 is rotating as well as the change in angular velocity, that is, the acceleration and deceleration, of the disc 114. The encoder 184 allows the controller 180 to track the position of coins on the sorting head 112, 212 or 312 after being sensed. According to some embodiments of the coin processing system 100, the encoder has a resolution of 40,000 pulses per revolution of the disc 114.

The controller 180 also controls the power supplied to the motor 116 which drives the rotatable disc 114. When the motor 116 is a DC motor, the controller 180 can reverse the current to the motor 116 to cause the rotatable disc 114 to decelerate. Thus, the controller 180 can control the speed of the rotatable disc 114 without the need for a braking mechanism. If a braking mechanism 186 is used, the controller 180 also controls the braking mechanism 186. Because the amount of power applied is proportional to the braking force, the controller 180 has the ability to alter the deceleration of the disc 114 by varying the power applied to the braking mechanism 186.

Figure 2:
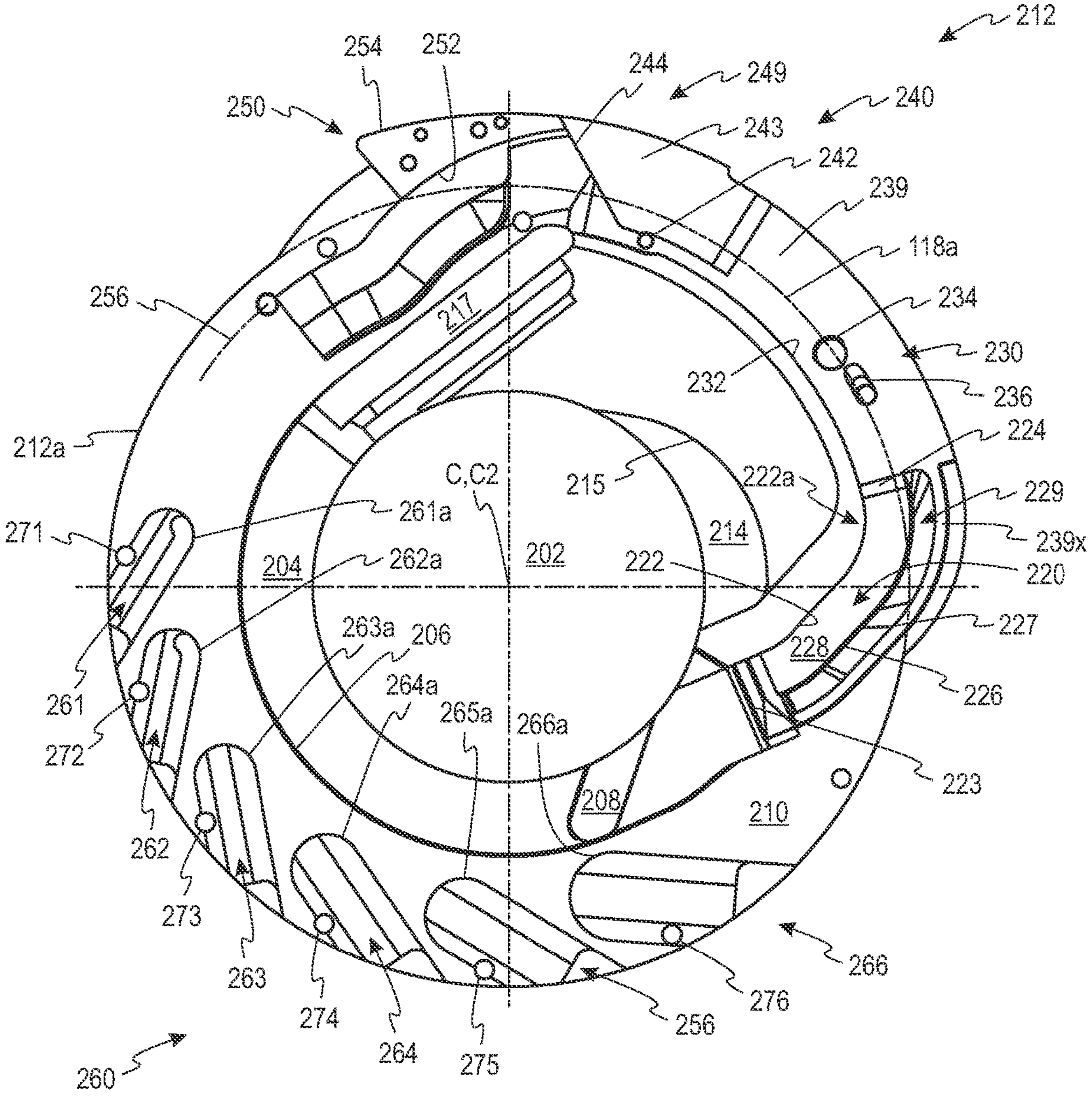
FIG. 2 is a bottom plan view of a first sorting head for use with the system of FIGS. 1A and 1B.
Figure 3:
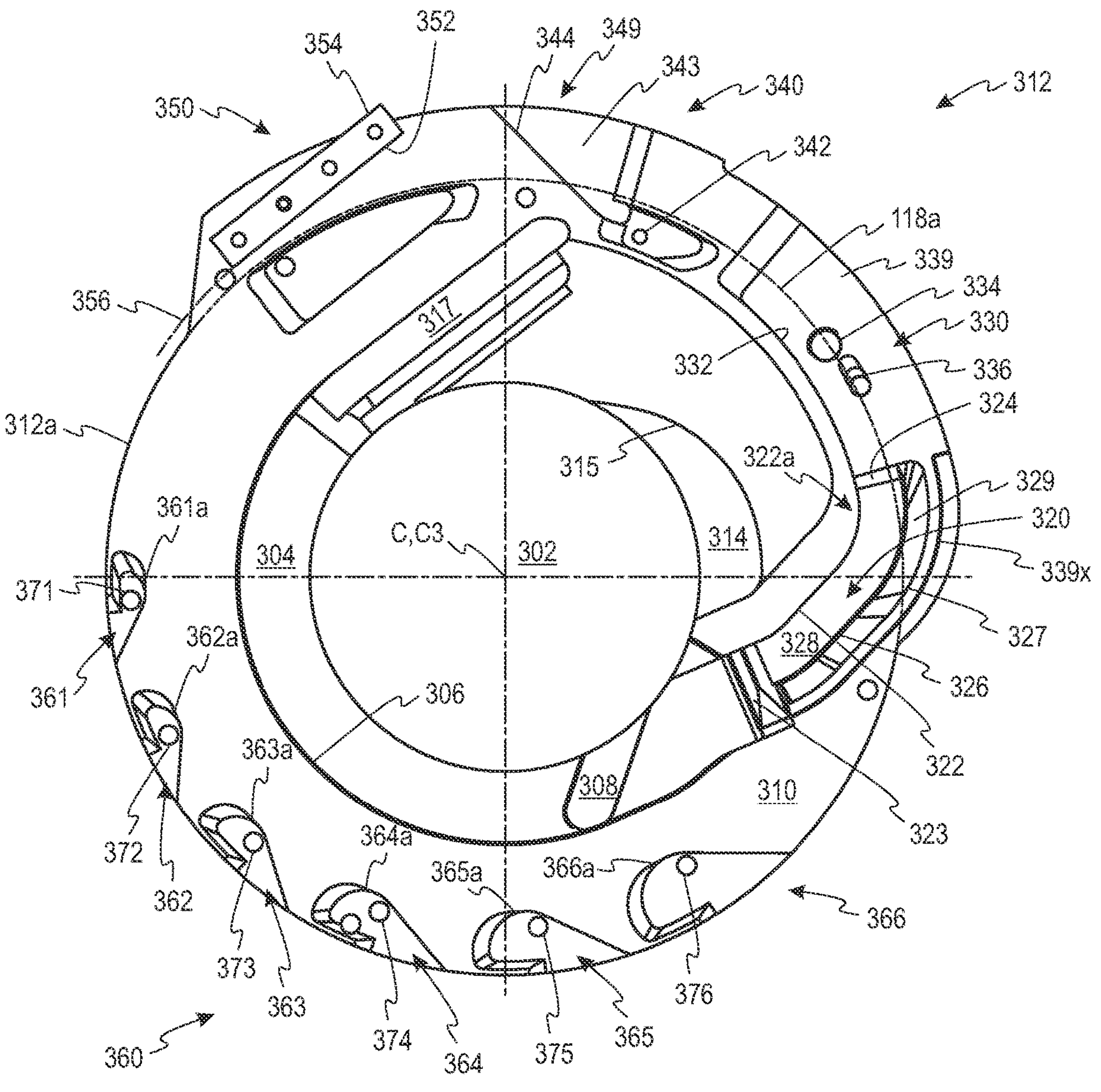
FIG. 3 is a bottom plan view of a second sorting head for use with the system of FIGS. 1A and 1B.

FIG. 2 is a bottom plan view of a first exemplary sorting head for use with the system of FIGS. 1A and 1B and FIG. 3 is a bottom plan view of a second exemplary sorting head for use with the system of FIGS. 1A and 1B. The sorting heads 212 and 312 and the operation of system of FIGS. 1A and 1B employing these sorting heads are described in more detail in U.S. patent application Ser. No. 15/782,343 filed Oct. 12, 2017, now issued as U.S. Pat. No. 10,181,234, each of which is incorporated herein by reference in its entirety.

In FIGS. 2-3, the underside of sorting heads 212, 312 are shown. The coin sets for any given country are sorted by the sorting heads 212, 312 due to variations in the diameter size. The coins circulate between the sorting head 212, 312 and the pad 118 (FIG. 1A) on the rotatable disc 114 (FIG. 1A). The pad 118 has a circular surface with a center at C. The sorting head 212, 312 has a circular portion centered at point C2, C3 which corresponds with the center C of pad 118. The coins are deposited on the pad 118 via a central opening 202, 302 and initially enter an entry area 204, 304 formed in the underside of the sorting head 212, 312. It should be kept in mind that the circulation of the coins in FIGS. 2-3 appear counterclockwise as FIGS. 2-3 are views of the underside of the sorting heads 212, 312.

The sorting heads 212, 312 may include a cutout for a discrimination sensor 234, 334. The discrimination sensor 234, 334 may be disposed flush with a flat surface 239, 339 of a discrimination region 230, 330 or recessed slightly within the sorting head just above the flat surface 239, 339 of the discrimination region 230, 330. Likewise, a coin trigger sensor 236, 336 is disposed just upstream of the discrimination sensor 234, 334 for detecting the presence of a coin. Coins first move over the coin trigger sensor 236, 336 (e.g., a photo detector or a metal proximity detector) which sends a signal to a controller (e.g., controller 180) indicating that a coin is approaching the coin discrimination sensor 234. According to some embodiments, the sensor 236, 336 is an optical sensor which may employ a laser to measure a chord of passing coins and/or the length of time it takes the coin to traverse the sensor 236, 336 and this information along with the information from the coin discrimination sensor is used to determine the diameter, denomination, and validity of a passing coin. Additional description of such embodiments may be found in U.S. Pat. No. 7,743,902, incorporated herein by reference in its entirety.

According to some embodiments, the coin discrimination sensor 234, 334 is adapted to discriminate between valid and invalid coins. Use of the term "valid coin" refers to coins of the type the sorting head is designed or configured to sort. Use of the term "invalid coin" refers to items being circulated on the rotating disc that are not one of the coins the sorting head is designed to sort. Any truly counterfeit coins (i.e., a slug) are always considered "invalid." According to another alternative embodiment of the present disclosure, the coin discriminator sensor 234, 334 is adapted to identify the denomination of the coins and discriminate between valid and invalid coins.

Some coin discrimination sensors suitable for use with the disc-type coin sorter 100 shown in FIGS. 1A-3 are described in detail in U.S. Pat. Nos. 7,743,902; 5,630,494; and 5,743,373, each of which is incorporated herein by reference in its entirety. Another coin discrimination sensor suitable for use with the present disclosure is described in detail in U.S. Pat. No. 6,892,871, which is incorporated herein by reference in its entirety. Other coin discrimination sensors suitable for use with the present disclosure are described in detail in U.S. Pat. Nos. 9,430,893; 9,508,208; 9,870,668; 10,068,406; 9,501,885; 9,916,713; and 10,685,523.

In disc-type coin processing systems or coin sorters 100 such as those shown in FIGS. 1A, 1B, 2 and 3, processing of coins without errors or interruptions and/or preventing interference can be very important. In many applications such as in self-service coin applications in which a customer deposits coins into a coin sorter system or sorter 100 (as opposed to an employee depositing coins into the coin sorter system or sorter 100), maintaining uptime may be important as these machines are a source of revenue for their owner. Component failures can result in costly service calls. One particular high frequency of failure component is the coin sorting pad 118.

In some environments or applications, such as for example, in some self-service applications, bulk coin that is received from users (patrons or customers) can contain non-coin materials. Although coin processing systems or sorters 100 may employ one or more methods of debris management to remove, cull or minimize debris getting onto the pad 118, debris, particularly sharp objects (screws, paperclips, nails, etc.), that, nonetheless, makes its way to the sort pad 118 can stall, tear, rip, ripple, puncture, and/or stretch, etc. the pad 118. Resulting damage to the pad 118 can affect the processing capabilities of the coin processing system or sorter 100 and/or interfere with accurate authentication, counting, sorting and general processing of coins, and/or may ultimately result in the coin processing system or sorter 100 being unusable, forcing a service call where a technician would repair the coin processing system or sorter 100 by replacing the pad 118.

Coin processing in the coin processing system or sorter 100 relies on the pad 118 to drive the coins under the sort head 212, 312 past a series of grooves and undulations in a predetermined method to authenticate, count and/or direct coins into one or more coin receptacles such as mixed denomination or denomination-specific containers. The process relies on a good quality flat pad to ensure control of the coins. When debris and other non-coin materials enter the system, the pad 118 can tear, rip, gouge, ripple, and/or stretch, affecting the accuracy of the coin processing system or sorter 100. The damage to the pad 118 can cause problems in the ability to process the coins.

Figure 4A:
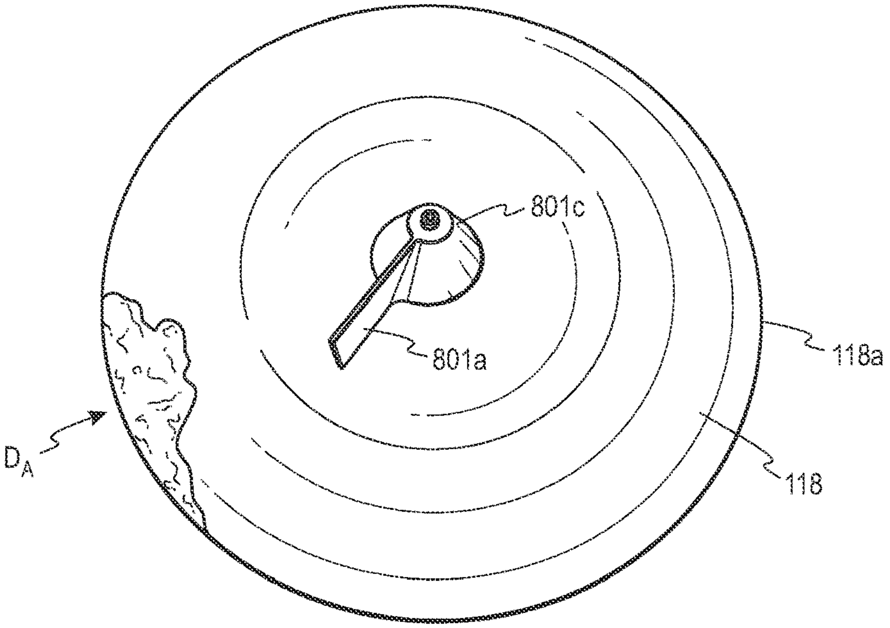
FIGS. 4A-4J illustrate examples of damage caused to coin sorter pads by non-coin sharp objects.
Figure 4B:
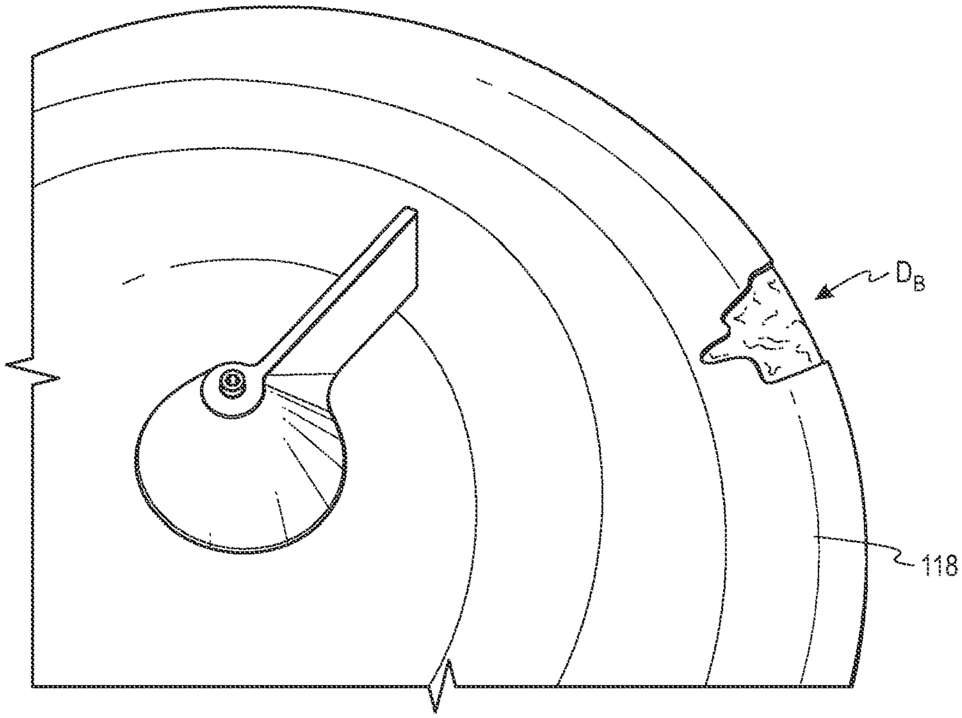
Figure 4C:
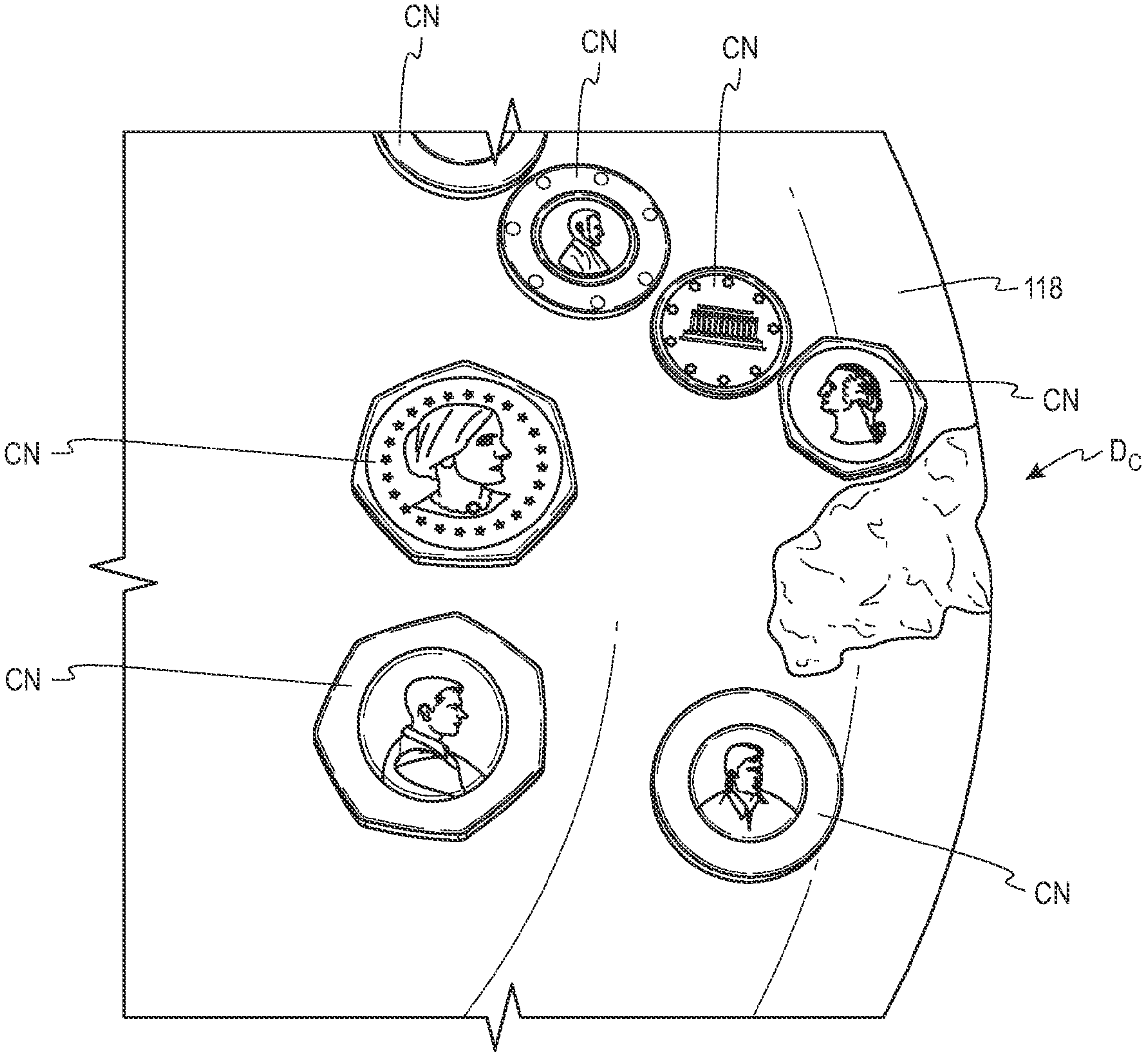
Figure 4D:
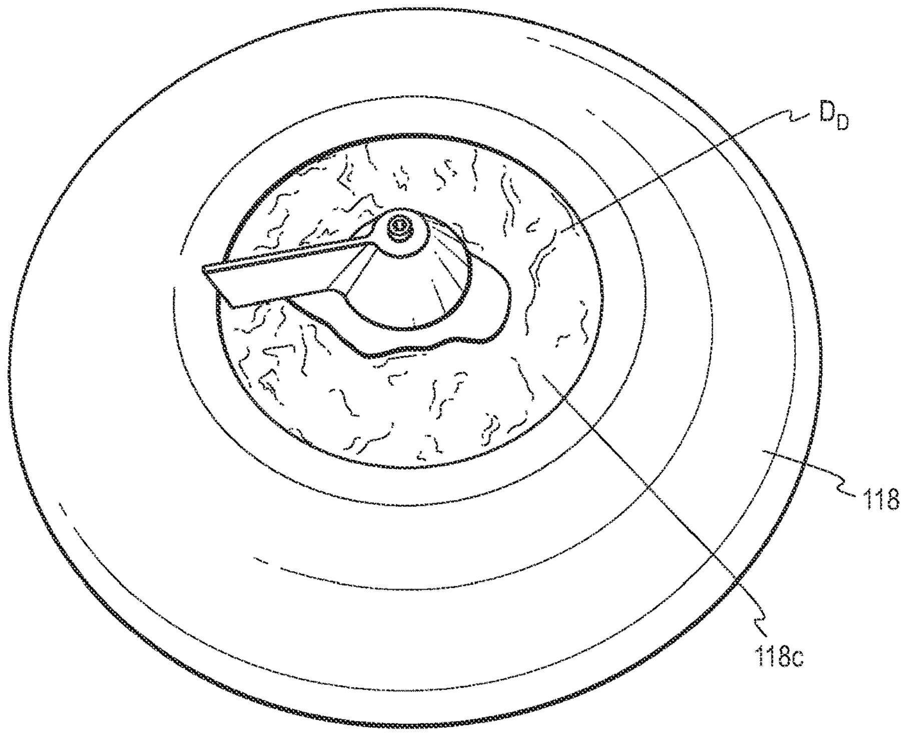
Figure 4E:
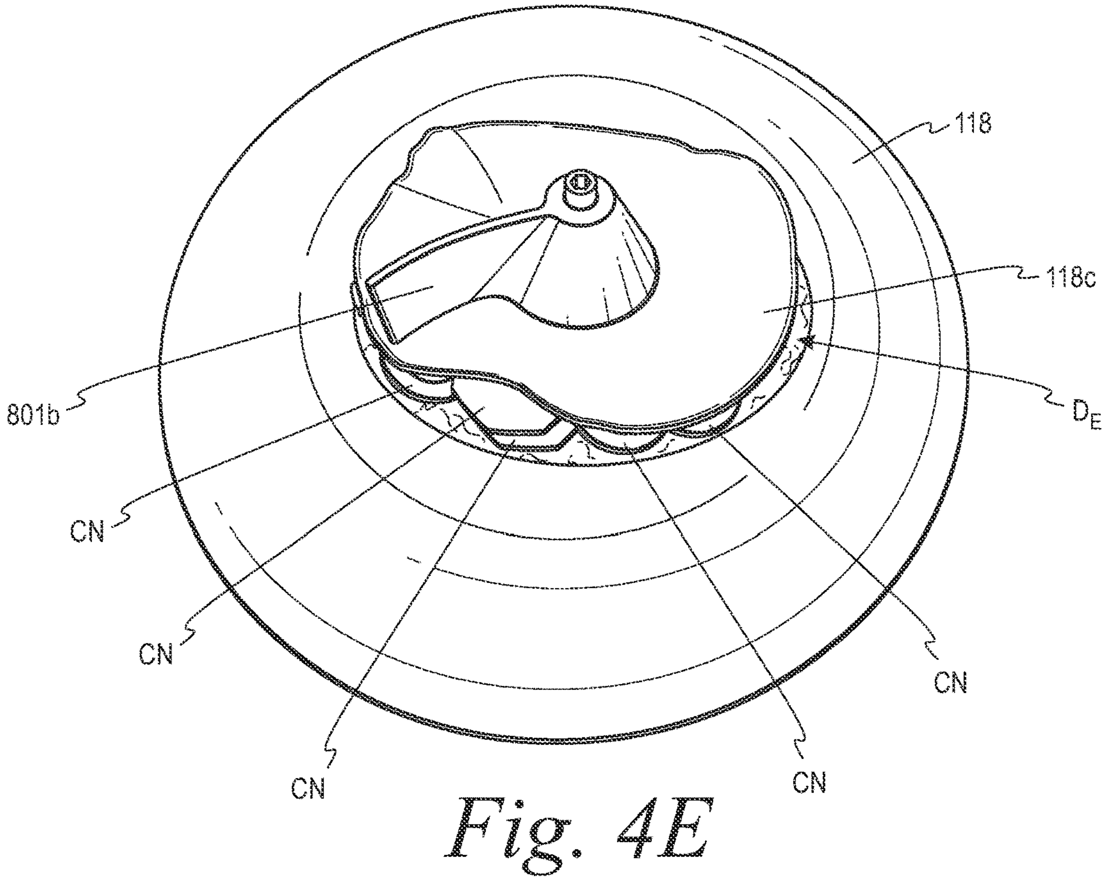
Figure 4F:
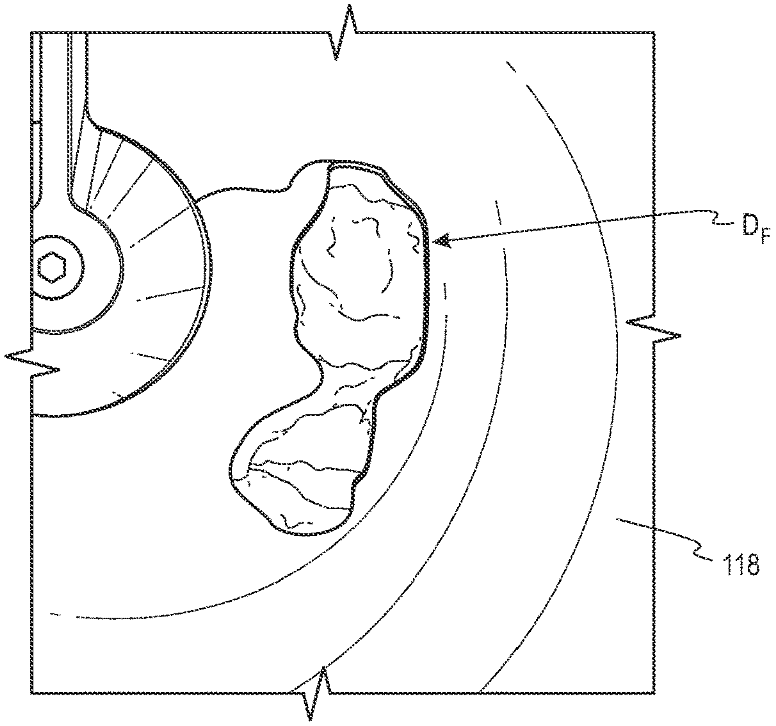
Figure 4G:
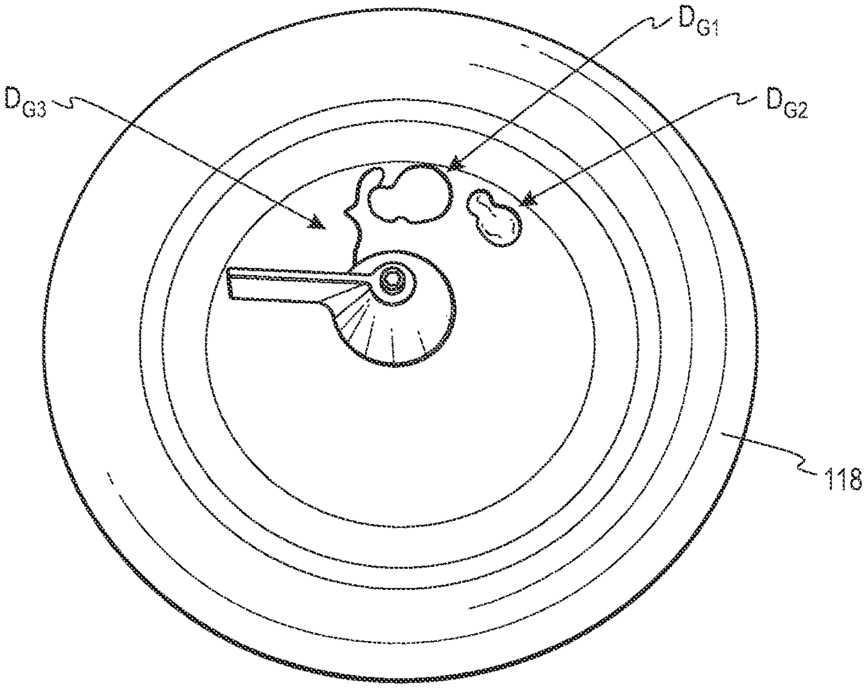
Figure 4H:
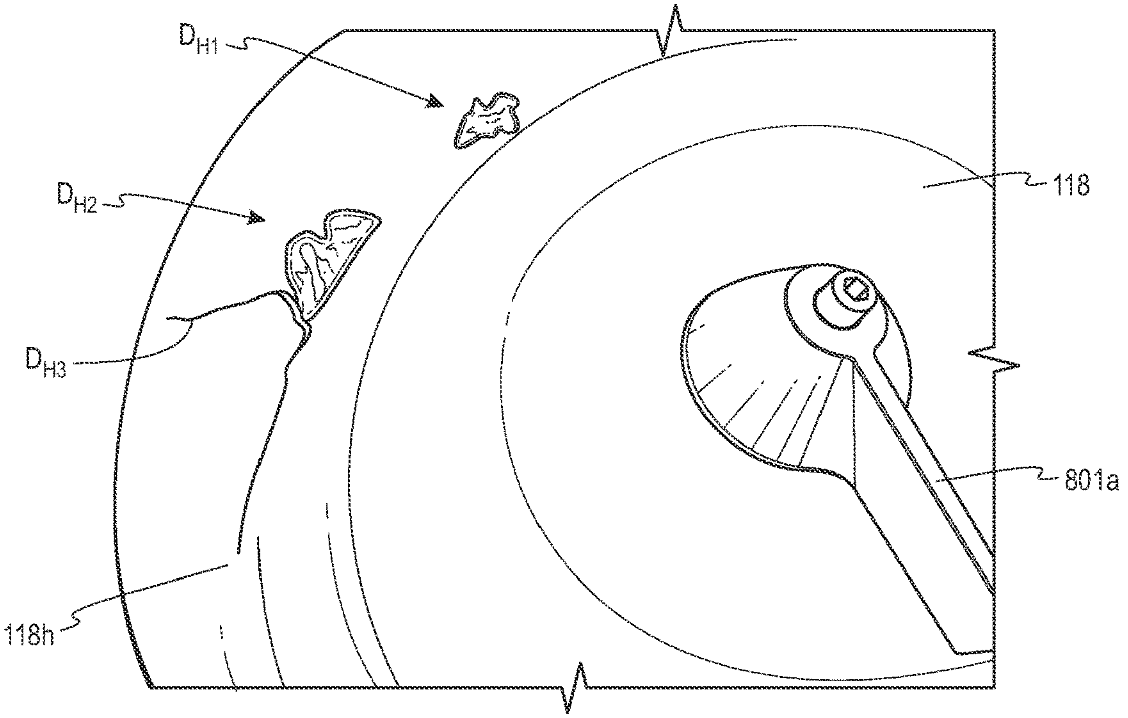
Figure 4I:
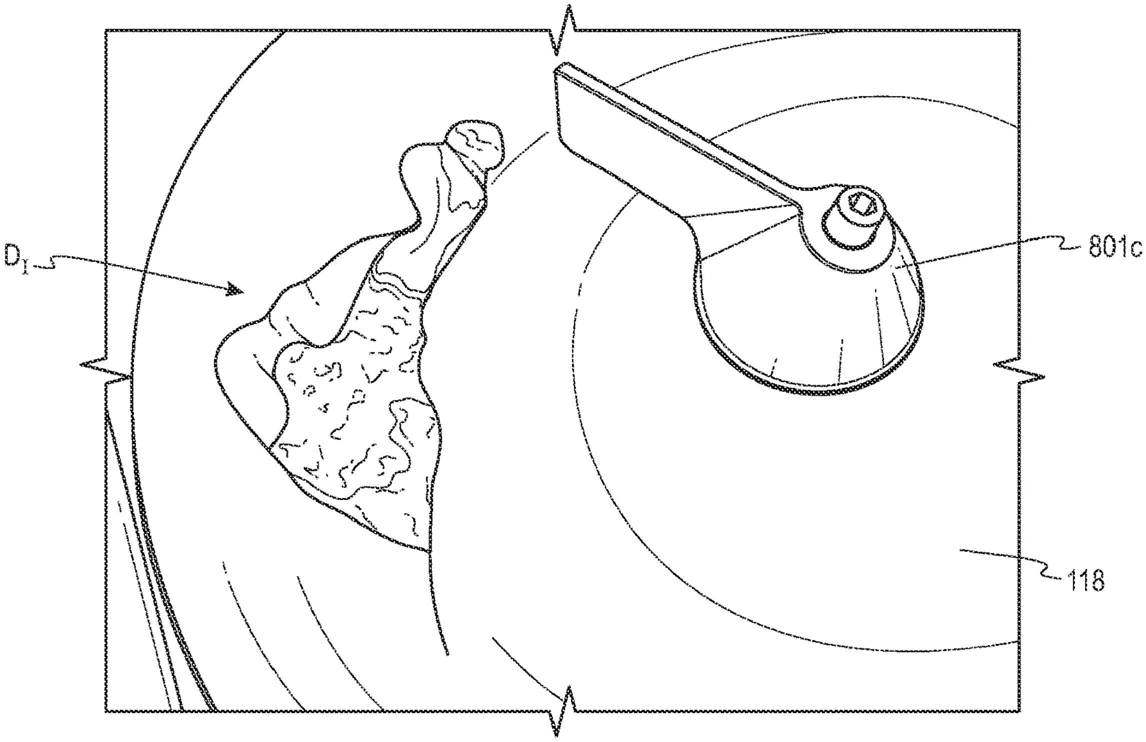
Figure 4J:
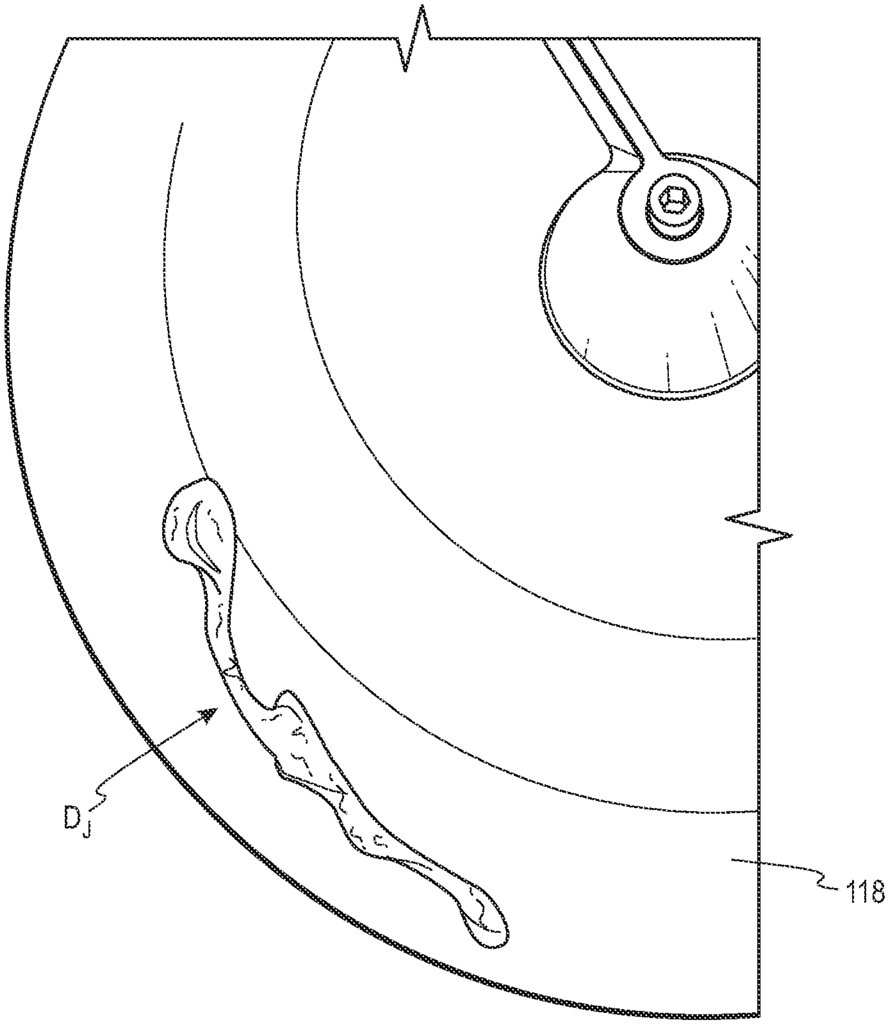

Some coin processing systems or coin sorters 100 employ a pad 118 made from a nitrile rubber rubber-based material. While such material may provide good coin sorting performance, it may also be very susceptible to tears, gouges, rips, punctures, stretching, etc., when debris (sharp debris) is deposited onto the pad 118. As a result, such pad material, when punctured, may tear very easily, propagating the puncture to the point that the coin processing system or sorter 100 is quickly rendered un-usable. Some exemplary damage to coin sorter pads 118 caused by non-coin sharp objects is illustrated in FIGS. 4A-4J. More particularly, FIGS. 4A-4C illustrate examples of damage such as gouges or tears DA, DB, DC near an edge **118*a* of a pad 118; FIGS. 4D-4G illustrate examples of damage such as tears or gouges DD, DE, DF to a center portion 118*c* of a pad 118; and FIGS. 4H-4J illustrate examples of damage such as tears to portions 118*h* of a pad 118 under a sorting head such as sorting head 212, 312. In FIG. 4E, coins CN have accumulated under the center portion 118*c* of the pad 118 after a top portion of the center portion 118*c* has been torn away from a bottom portion of the pad 118. In FIG. 4F, a gouged-out area DF is illustrated along with a tear extending from the gouged-out area DF toward the center of the pad 118. In FIG. 4G, a gouged-out area DG2 is illustrated along with a tear DG3 extending from a damaged area DG1 toward the center of the pad 118. In FIG. 4H, gouged-out areas DH1, DH2 are illustrated along with a bent-shaped tear DH3 extending from the gouged-out area DH2 toward the edge of the pad 118 and having a top portion or layer of the pad near the gouged-out area DH2 that has separated from a bottom portion or layer of the pad. In FIG. 4I, a gouged-out area DI is illustrated along with a tear extending from an edge of the gouged-out area DI. In FIG. 4J**, a gouged-out area DJ is illustrated.

In some environments or applications, such as for example, in some self-service applications, failures caused by pad damage from non-coin, sharp objects may typically occur within 400,000 coins processed on average. In some environments, such as for example, in some self-service applications, failures caused by pad damage from non-coin, sharp objects may occur within the processing of 100,000-800,000 coins. In contrast, in some environments, such as, for example, in some attended applications in which a trained operator feeds coins into a coin hopper 110, failures caused by pad damage from non-coin, sharp objects may be much rarer and coin pad 118 may last for the processing of as many as 4-6 million coins, with typical pad life ranging from 1.5 million coins to 4 million coins. A typical service interval for the coin processing systems or coin sorters 100 where a technician visits to perform routine maintenance, including a pad 118 replacement, may occur at an average interval of approximately 1.5 million coins processed by the coin processing systems or coin sorters 100. Having to visit a coin processing system or coin sorter 100 between regular service intervals, such as, for example, every 400,000 coins processed on average in, for example, some self-serve applications, increases the cost of maintenance by nearly a factor of four (4), and decreases coin processing system or coin sorter 100 uptime resulting in lost revenue.

According to some embodiments, a need exists for a solution that results in an average service life of the coin pad 118 of approximately 1.5 million coins processed and/or for the ability for an untrained user to replace the pad 118 without a service call in the event of early failure, thereby avoiding an unplanned service call. According to some embodiments, it has been found that it would be desirable if the pad 118 were made from a material that was puncture resistant and/or from a material if punctured that would resist propagation on the puncture, thus, resisting the formation of a tear and/or gouged-out area. Furthermore, it has also been found that it would be desirable if a pad 118 were constructed so as to prevent and/or minimize the extent of tears, rips, ripples, stretch, gouges, and/or punctures of or in the pad 118 and/or for a system for detecting the existence of damage to a pad 118 and annunciating and/or alerting an operator of or owner of or maintenance personnel for a coin processing system or coin sorter 100 of damage to a pad 118 when it occurs, before the damage to the pad 118 compromises the counting/sorting function of the coin processing system or coin sorter 100.

Often the pad surface, or skin, material can be fabricated in different ways such as Calendaring or coating techniques.

The present disclosure provides several improvements to increase pad 118 resilience and operating life and/or to detect the existence of damage to a pad 118 and annunciate and/or alert an operator of or owner of or maintenance personnel for a coin processing system or coin sorter 100 of damage to a pad 118 when it occurs, before the damage to the pad 118 compromises the counting/sorting function of the coin processing system or coin sorter 100 and/or to reduce downtime of a coin processing system or coin sorter 100 by facilitating pad 118 replacement by an unskilled person as opposed to a trained service technician. These improvements include (1) a debris-resilient pad skin having a mesh layer; (2) a pad skin that is machined to achieve tight pad tolerances; (3) a coin pad 118 having detectable coin pad layers; (4) a system for detecting pad 118 damage; (5) a composite differential adhesive for adhering a coin pad 118 to disc 120; and/or (6) a twist-lock debris blade or cone. According to some embodiments, one or more or all of these improvements may be employed with a coin processing system or coin sorter 100. According to some embodiments, one or more or all of these improvements may be employed in a self-service coin processing system or coin sorter 100 and/or an attended coin processing system or coin sorter 100.

(1) Debris-Resilient Pad Skin Having a Mesh Layer

Figure 5A:
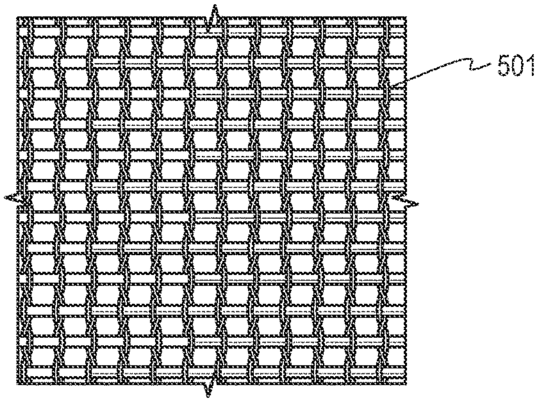
FIG. 5A and FIG. 5B are top views of a mesh material that may comprise a layer of a coin pad according to some embodiments.
Figure 5B:
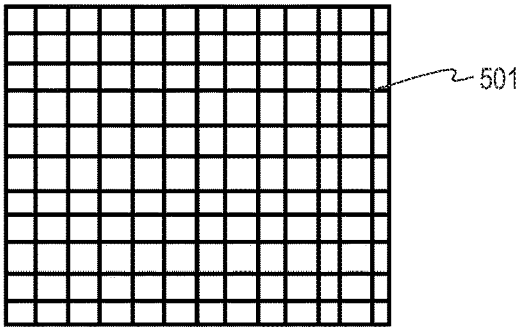

FIG. 5A and FIG. 5B are top views of a mesh material 501 that may comprise a layer of coin pad 118. According to some embodiments, the mesh material 501 is made of Kevlar® fiber made by DuPont, nylon, or other material. Bench testing has shown little to no stretch of pads 118 made using a Kevlar® fiber mesh 501 and/or the prevention of or the resistance to puncture of the skin 118*s* of a pad 118 made using a Kevlar® fiber mesh 501.

Figure 5C:
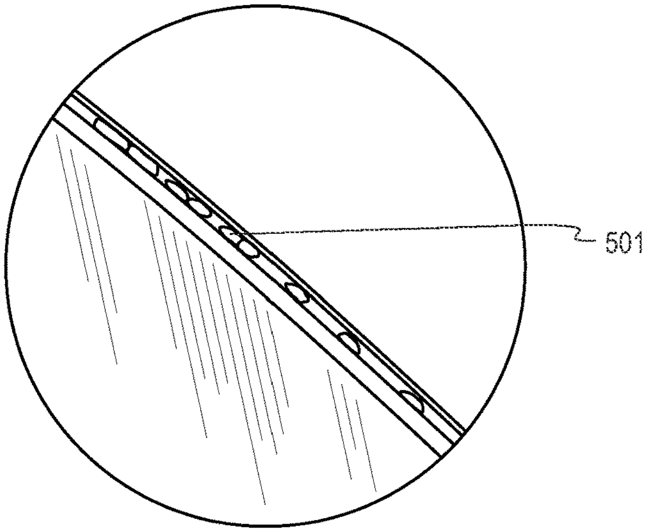
FIG. 5C is a side view of a skin layer having a layer of mesh material embedded therein according to some embodiments.
Figures 5D, 5E:
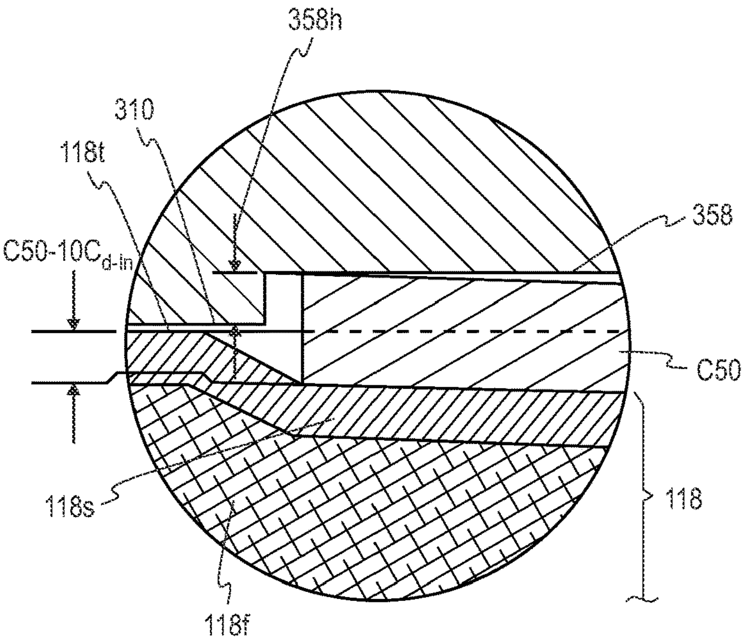
FIG. 5D is a partial cross-sectional view of a portion of a sorting head illustrating an exemplary coin pressing a portion of a pad downward according to some embodiments.
FIG. 5E illustrates three exemplary options for placement of a mesh layer within a skin layer of a pad according to some embodiments.
Figure 5F:
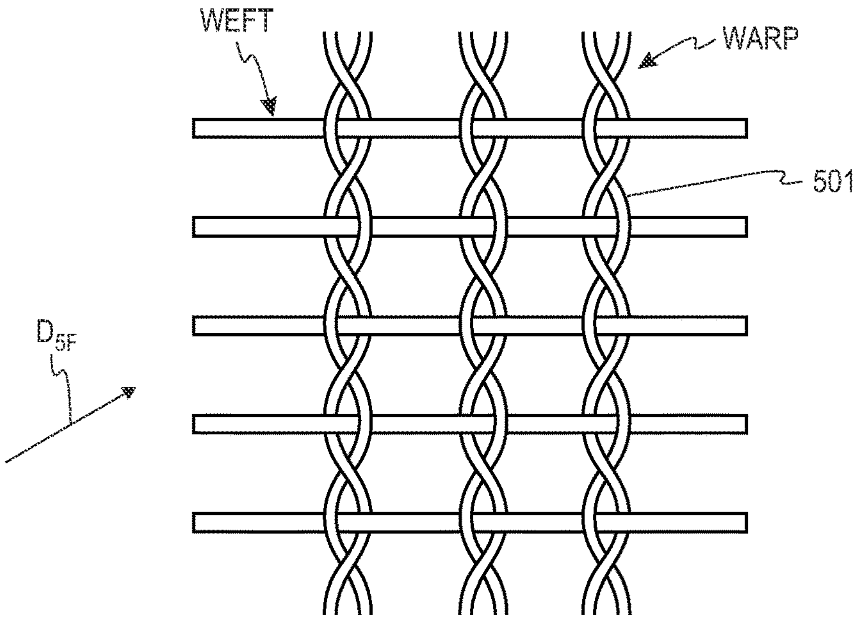
FIG. 5F a top view of an exemplary leno weave pattern for a mesh layer according to some embodiments.

FIG. 5F a top view of an exemplary leno weave pattern for a mesh layer 501 according to some embodiments. Such a leno weave pattern is also illustrated in FIG. 5A. According to some embodiments, the leno weave pattern is achieved when parallel sets of twisted pairs of fibers WARP are oriented generally orthogonal to a set of single fibers WEFT, wherein the single fibers WEFT are woven through adjacent twists of the twisted pairs of the fibers WARP. According to some embodiments, 4.1 ounce (116 g) nylon leno mesh is employed. According to some embodiments, the mesh material 501 is made of Kevlar® fibers. According to some embodiments, the use of a leno weave pattern increases the stability (e.g., tear resistance, stretch resistance) of the mesh materials and the NBR diagonally between the orthogonal sets of fibers. According to some embodiments, the use of leno nylon mesh in combination with nitrile rubber inhibits, reduces, or prevents stretching of the pad 118 in a diagonal direction D5F (see. FIG. 5F) with respect to the leno weave pattern.

Figure 5G:
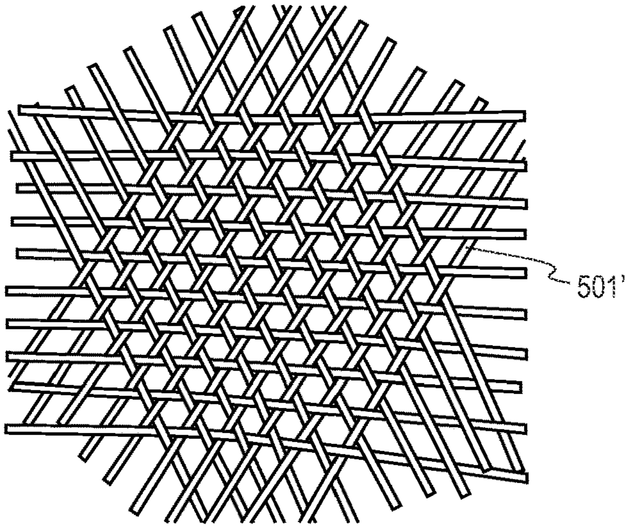
FIG. 5G is a top view of an exemplary triaxial weave pattern for a mesh layer according to some embodiments.

FIG. 5G is a top view of an exemplary triaxial weave pattern for a mesh layer 501' according to some embodiments. According to some embodiments, three sets of parallel threads are oriented at about 60° from each other and are interwoven in an alternating over one, under one pattern with respect to the threads of the non-parallel sets of threads. According to some embodiments, the mesh material 501' is made of Kevlar® fibers. According to some embodiments, the mesh material 501' is made of nylon fibers. According to some embodiments, the use of a triaxial weave pattern provides better stability (e.g., tear resistance, stretch resistance) in all directions. According to some embodiments, the use of a triaxial weave pattern provides three dimensional (3D) stretch resistance and may reduce or minimize the "rebounding" or "slingshot" effect as the pressure on the top of the pad generating a "plowing" effect otherwise exhibited by some pads when pad pressure on a coin is released, such as in a re-gauging area, such as described in U.S. Pat. No. 10,679,449, herein incorporated by reference in its entirety. According to some embodiments, use of pads without a mesh layer or without a mesh layer employing a triaxial weave pattern, may result in a "rebounding" or "slingshot" effect as the pressure on the top of the pad generating the "plowing" effect is relieved such as when the coins move downstream of the re-gauging wall 252 and/or the re-gauging block 254 whereby the top of the pad 118 which has been pushed radially inward by a coin moving along re-gauging wall 252 moves or rebounds radially outward as a coin moves past the downstream end of the gauging block 254 and/or along the re-gauging wall 252 and/or the downstream end of the re-gauging wall 252.

According to some embodiments, alternative weave patterns are employed for mesh material 501, 501' such as, for example, two sets of parallel threads oriented orthogonal to each other and interwoven in an alternating one over, one under pattern.

According to some embodiments, a layer of mesh 501, 501' made of Kevlar®, nylon, and/or other material is incorporated into a pad 118 and the layer of mesh enhances tensile strength, dimensional stability, puncture/cut resistance, impact resistance, stretch resistance, and overall longevity. According to some embodiments, a layer of mesh 501, 501' having a leno weave pattern or triaxial weave pattern and made of Kevlar®, nylon, and/or other material is incorporated into a pad 118 and the layer of mesh enhances tensile strength, dimensional stability, puncture/cut resistance, impact resistance, stretch resistance, and overall longevity.

According to some embodiments, the layer of mesh 501, 501' is imbedded and/or fabricated within a pad 118 such as a pad 118 made of nitrile rubber. FIG. 5D is a partial cross-sectional view of a portion of a sorting head 312 illustrating an exemplary coin C50 (US 500 coin) pressing a portion of pad 118 downward. In some embodiments, the pad 118 may comprise a lower foam layer **118*f* and an upper skin layer 118*s* coupled to the lower foam layer 118*f* such as with adhesive. According to some embodiments, a layer of mesh material 501, 501' is contained within the skin layer 118*s* of the pad 118. Fabricating such a pad skin 118*s* can be accomplished in several ways such as, for example, calendaring and coating approaches. FIG. 5C is a side view of a skin layer 118*s* having a layer of mesh material 501 (or 501'**) embedded therein.

Turning to FIG. 5E, the mesh layer 501, 501' can be positioned and controlled in any position (distance) within the thickness of the skin **118*s*. FIG. 5E illustrates three exemplary options for placement of a mesh layer 501, 501' within a skin layer 118*s* of a pad 118 (not to scale). According to Option #1 and Option #2, a skin layer 118*s* has an overall thickness of 0.043 inches (1.1 mm). In the illustrated example in Option #1, a 0.005 inch (0.1 mm) thick mesh layer 501, 501' is positioned above a bottom 0.010 inch (0.25 mm) thick nitrile rubber layer and below a top inch (0.71 mm) thick nitrile rubber layer. In Option #2, the mesh layer 501, 501' is positioned closer to the middle of the skin layer 188*s*, with a 0.005 inch (0.1 mm) thick mesh layer 501, 501' positioned between a bottom 0.019 inch (0.48 mm) thick nitrile rubber layer and below a top 0.019 inch (0.48 mm) thick nitrile rubber layer. According to Option #3, a skin layer 118*s* has an overall thickness of 0.068 inches (1.7 mm) and comprises a 0.005 inch (0.1 mm) thick mesh layer 501, 501'** positioned between a bottom 0.010 inch (0.25 mm) thick nitrile rubber layer and below a top inch (1.3 mm) thick nitrile rubber layer. According to some embodiments, the nitrile rubber layers are made from WARCO 80-P-987 material.

According to some embodiments, pads 118 incorporating such a layer of mesh 501, 501' have prevented or inhibited the occurrence of tears, rips, gouges, stretching, ripples, stretch etc. According to some embodiments, embedding a mesh layer 501, 501' between two layers of rubber such as nitrile rubber or other material allows for any final surface finish, such as a mesh finish.

While nitrile rubber has been described as a material from which the skin **118*s* of a pad 118** may be made, other materials additionally or alternatively be used, such as, for example, Neoprene, urethane, composite urethane, polymers, rubber, or rubber products, leather, or a spongy, compliant material.

Likewise, while layer 501, 501' has been described as a mesh, other configurations and/or materials may be used according to some embodiments, such as, for example, a solid layer of support material, loose fibers in spoke or overlapping material, a layer of urethane, spray on materials, embedded materials, gold specs, or a pad skin made from a slurry of materials cured into a pad skin. The materials may include, for example, Kevlar® fiber, nylon, urethane, metal, etc.

Likewise, while pads 118 in the present disclosure have been and/or are later described as a having a bottom foam layer, the bottom layer may be made out of other material such as, for example, nitrile rubber, Neoprene, urethane, composite urethane, polymers, rubber, or rubber products, leather, or a spongy, compliant material.

Finally, while the pads 118 in the present disclosure have been and/or are later described as having separate skin **118*s* and bottom 118*f* layers, a pad without separate layers may also be used according to some embodiments, such as, for example, a pad 118** with an embedded mesh or stiffening materials without separate skin and foam layers, e.g., a single type of material throughout the pad and/or such a single type of material with a layer of mesh or other strengthening layer therein.

(2) Machine Skin to Achieve Tight Pad Tolerances

In Options #1 and #3 of FIG. 5E, the mesh layer 501, 501' is positioned closer to the bottom of the skin layer **118*s*, leaving more nitrile rubber material on top to enhance the wear life of the pad 118, allowing the completed pad 118 to be post-processed, by machining the thicker side of the skin top surface to control the overall thickness of the pad 118 with great accuracy. According to some embodiments, the mesh layer 501, 501' is positioned in the lower 50% of the skin thickness. According to some embodiments, the mesh layer 501, 501' is positioned in the lower 40% of the skin thickness. According to some embodiments, the mesh layer 501, 501' is positioned in about the lower 33%-35% of the skin thickness. According to some embodiments, the mesh layer 501, 501'** is positioned in the lower 25% of the skin thickness.

According to some embodiments, it can be desirable to maintain a tight tolerance on the height or thickness of coin pads 118. In disc-type coin processing systems 100 such as coin sorters or coin counters or coin sorters, an air gap exists between the top of the sort pad 118 and the underside of the sorting head 112. The height of the air gap will vary based on the country set of coins to be processed by the system 100 and whether the system 100 is a coin counter or a coin sorter. For example, a properly adjusted machine 100 may be set with an air gap range of 0.005"-0.008" (a 0.003" range) [0.13 mm-0.020 mm (a 0.07-0.08 mm range)]. This air gap is set once a new sort pad 118 is installed in the machine 100. Setting/adjusting the air gap is performed by a trained technician. When the pad 118 needs to be replaced, a new pad 118 will be installed. Coin pads 118 could have a height or thickness tolerance of +/−0.003" (0.08 mm). Thus, if, for example, the original pad 118 that was installed had a thickness on the low end of the tolerance range (−0.003") [−0.08 mm] and the new pad 118 being installed has a thickness on the high end of the tolerance range (+0.003") [+0.08 mm], the 0.006" [0.15 mm] increase in height/thickness of the pad could eliminate the intended air gap or cause it to fall outside an acceptable range. As a result, a trained technician or trained attendant installing the new pad 118 would need to adjust air gap so it was within an acceptable range, e.g., by adjusting the height of the sorting head 112.

Sort pads 118 used on attended machines 100 typically have a life expectancy of 4-6 million coins. However, sort pads 118 used on self-service machines 100 typically have a much shorter life expectancy of under 1 million coins. The shorter lifespan in self-service machines 100 can be attributed to several factors, such as, for example, coin condition and/or user training but is mainly due debris and non-coin objects (nails, screws, keys, etc.) that are deposited into the machine 100 by a customer. The shorter coin pad life expectancy and the lack of trained personnel to change coin pads and adjust the air gap in self-service applications can result in more downtime for a self-service machine 100 and/or higher maintenance costs.

According to some embodiments, coin pads 118 are manufactured to tighter height/thickness tolerances so as to obviate or reduce the need to adjust the machines 100 to obtain an air gap within a desired range (e.g., by adjusting the height of the sorting head 112). To remove the need to adjust the air gap after each sort pad change, the tolerance range of the coin sort pad 118 overall thickness is made tighter than the allowable air gap range. Therefore, according to some embodiments, coin pads 118 are made with a height/thickness tolerance range for a finished pad 118 of about +/−0.0015" (about +/−38 μm).

According to some embodiments, in order to achieve this tolerance range, a face grinding process is performed following the final assembly process of a sorting pad 118. The desired pad thickness tolerance is achieved by grinding the top skin 118*s* of a pad 118. According to some embodiments, an assembled sorting pad 118 is mounted to a vacuum chuck in a lathe. Then using a tool post grinder and grinding wheel, the face (top skin) 118*s* of the pad 118 is ground so as to bring the coin pad 118 to a desired or target finish dimension/thickness within a tolerance of about +/−0.0015" (about +/−38 μm).

(3) Detectable Coin Pad Layers/Coatings

According to some embodiments, one or more coatings of detectable material is/are applied to the top surface of the coin pad skin 118*s*. According to some embodiments, the presence and/or thickness or level of the coating(s) is detected using one or more sensors such as, for example, a discrimination sensor 234, 334. According to some embodiments, one or more sensors such as, for example, a discrimination sensor 234, 334 are employed to determine or measure: (a) coin thickness, (b) pad wear levels, (c) coin spacing (if the coating is eddy current detectable and distinguishable from the coins), (d) basic imaging of coins (and/or distinguishing between the presence and absence of a coin under the sensor(s)), such as, for example, if an infrared (IR) coating is used, and/or (e) diameter of coin such as, for example, if an infrared (IR) coating is used.

Figure 6A:
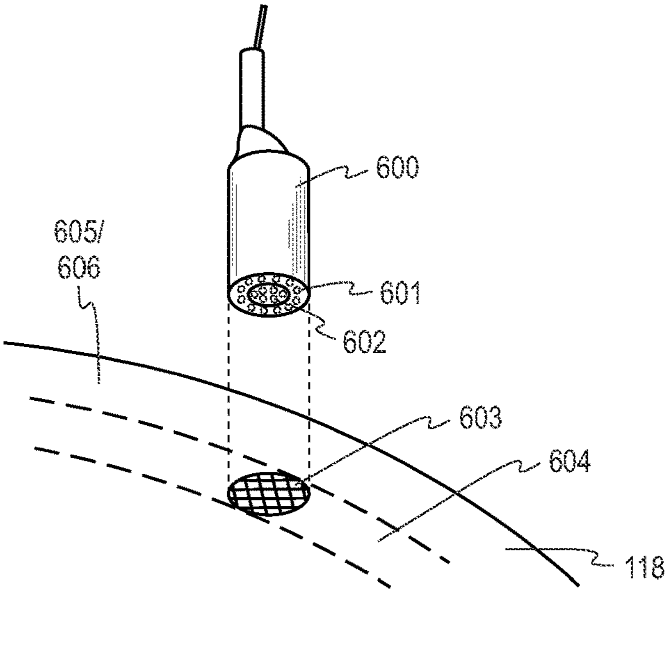
FIG. 6A is a schematic view of a sensor for detecting characteristics of a pad and/or a coin positioned on the pad according to some embodiments.

FIG. 6A is a schematic view of a sensor 600 for detecting characteristics of pad 118 and/or a coin positioned on the pad such as within a monitored path 604 and/or area 603 located within an annular region 604 of the pad 118. According to some embodiments, the sensor 600 comprises one or more emitters 601 and one or more detectors 602. According to some embodiments, a plurality of emitters 601 are positioned about or around the one or more detectors 602. According to some embodiments, the emitters 601 emit ultraviolet (UV) and/or infrared (IR) light and the detectors 602 sense reflected or emitted ultraviolet (UV) and/or infrared (IR) and/or visible light. According to some embodiments, the sensor 600 is mounted in the sorting head 212, 312 such as, for example, in the location of discrimination sensor 234, 334 and may be mounted in the sorting head 212, 312 so as to be in close proximity to the top surface of the skin 118*s*.

Figure 6B:
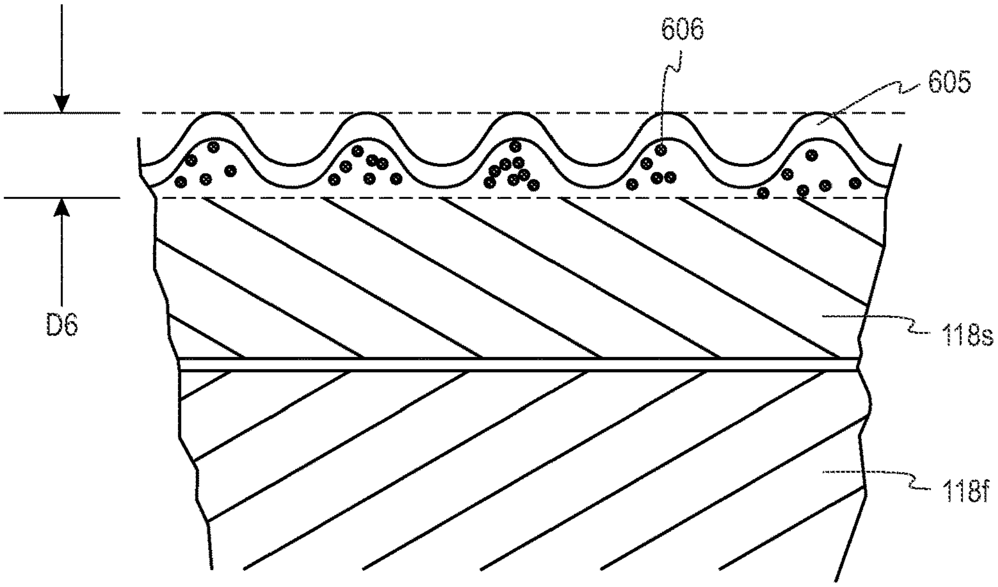
FIG. 6B is a side sectional view of a portion of a pad comprising a lower foam layer and an upper skin layer and having a detectable coating and/or detectable elements according to some embodiments.

FIG. 6B is a side sectional view of a portion of a pad 118 comprising a lower foam layer 118*f* and an upper skin layer 118*s*. According to some embodiments, a coating 605 of detectable material is applied on the surface of the coin pad skin 118*s*. Alternatively, according to some embodiments, detectable elements 606 are applied on the surface of the coin pad skin 118*s*. Alternatively, according to some embodiments, both a coating 605 of detectable material and detectable elements 606 are applied on the surface of the coin pad skin 118*s*. One or more of the sensors 600 are configured to detect the detectable material of the coating 605 and/or the detectable elements 606. The coating 605 and/or the detectable elements 606 have a thickness of D6. According to some embodiments, the coating 605 (and/or the detectable elements 606) are applied across the entire surface of the pad 118. According to some embodiments, the coating 605 (and/or the detectable elements 606) are applied across only select portions of the surface of the pad 118 such as, for example, near the perimeter of the pad 118, e.g., within annular region 604.

According to some embodiments, the sorting head assembly including the sorting head 212, 312 and pad 118 are manufactured to a high degree of precision. As a result, the location and relative proximities of pad surface features are known with a high degree of accuracy. According to such embodiments, the sensor(s) 600 can be calibrated to detect the distance between an upper surface of a new coin pad 118 and the sensor(s) 600 and set the detected distance as corresponding to a pad life of 100%, e.g., a processor such as controller 180 may store an initial detected distance in a memory such as memory 188, and associate that detected distance with a pad life of 100%. Then as coins wear away the top surface of the pad 118, the distance between the sensor(s) 600 and the top surface of the pad 118 will increase and the increase in distance can be associated with a detected degree of wear, and a processor such as controller 180 may receive periodic distance measurements from a corresponding sensor such as sensor 600 and compare those measurements with the initial detected distance and detect any change and/or the degree of change in the measured distance and take appropriate action or actions as the measured distance satisfies one or more predetermined thresholds, such as, sending or displaying a warning to change the pad shortly when a first threshold is met (e.g., associated with 10% remaining pad life) and/or stop the operation of the coin sorter or counter 100 and send or display a message to change the pad when a second threshold is met (e.g., when 0% pad life remains).

For example, according to some embodiments, when a new pad is installed on rotatable solid disc 120, using average distance or specific location distance (such as by employing disc encoder 184 to associate a measured distance with a specific location on the surface of the pad 118), a location specific distance and/or average distance "X" between one or more sensor(s) 600 and the top surface of the pad 118 is measured. For example, the initial distance may be detected to be 0.25 inches (6.3 mm), e.g., 0.21" (5.3 mm) recess depth between the bottom of sensor 600 and the lowermost surface 210/310 of the sorting head 212/312 plus a 0.04" (1.0 mm) gap between the lowermost surface 210/310 of the sorting head 212/312 and the top of the pad 118 such as the level of the top of coating 605. The height of the level of the top of the coating 605 (and/or the detectable elements 606) and/or pad 118 is then repeatedly monitored and the level of wear of the coating 605 (and/or the detectable elements 606) and/or pad 118 is repeatedly determined. For example, when a new coin pad 118 is installed, the distance between the sensor(s) 600 and the coating level 605 is detected, e.g., by sensor 600, and the measured distance is set or associated with a pad life of 100%, e.g., a processor such as controller 180 communicatively coupled to an associated distance sensor, e.g., sensor 600, may store an initial measured distance in a memory such as memory 188, and associate that measured distance with a pad life of 100%. As the top surface of the coating 605 (and/or the detectable elements 606) and/or pad 118 and/or pad skin 118*s* wears away, the measured distance increases and may increase proportionally. A processor such as controller 180 may receive periodic distance measurements from a corresponding sensor such as sensor 600 and compare those measurements with the initial measured distance and detect any change and/or the degree of change in the measured distance and take appropriate action or actions as the measured distance satisfies one or more predetermined thresholds. For example, when the measured distance reaches a predetermined amount, the controller 180 may generate a warning signal or message and, for example, alert an operator via operator interface 182, to indicate that the coin pad 118 should be cleaned and/or replaced. For example, the controller 180 may generate such a warning signal when the measured distance increases to a distance associated with an expected remaining pad life of 10%-15% or 5%.

According to some embodiments, a gap between the lower surface of a sorting head such as the lowermost surface 210/310 of the sorting head 212/312 and the top of the pad 118 may change over time such as caused by pad wear or settling of the pad. According to some embodiments, when the measured gap distance exceeds of predetermined threshold, a processor such as controller 180 receiving periodic distance measurements from a corresponding sensor such as sensor 600 may send and/or display a message instructing an operator or service technician that the height of the sorting head relative to the top of the pad 118 needs to be manually adjusted, such as by lowering the sorting head.

According to some embodiments, the top of a pad 118 may have waves in it causing the measured gap between the lower surface of a sorting head such as the lowermost surface 210/310 of the sorting head 212/312 and the top of the pad 118 to vary by rotation of the pad. According to some such embodiments, one or more specific location distances (such as by employing disc encoder 184 to associate a measured distance with a specific location on the surface of the pad 118) may be employed for distance measurements and decisions.

According to some embodiments, the sensor(s) 600 measure the amount of light (e.g., visible, infrared and/or ultraviolet light) reflected off or emitted by the coating 605 (and/or the detectable elements 606) and the amount of detected light is used to measure pad wear. For example, according to some embodiments, when a new pad is installed on rotatable solid disc 120, using average light intensity or specific location light intensity (such as by employing disc encoder 184 to associate a measured light intensity with a specific location on the surface of pad 118), a location specific light intensity and/or average light intensity "Y" is measured, e.g., by sensor 600, and a processor such as controller 180 communicatively coupled to an associated sensor may store an initial light intensity "Y" in a memory such as memory 188, and associate that measured light intensity "Y" with a pad life of 100%. The light intensity received by the sensor(s) 600 from the coating 605 (and/or the detectable elements 606) is then repeatedly monitored, e.g., by a processor such as controller 180 communicatively coupled to an associated light intensity sensor, e.g., sensor 600, and the level of wear of the coating 605 is repeatedly determined. For example, when a new coin pad 118 is installed, the light intensity is detected and the measured light intensity is set or associated with a pad life of 100% e.g., a processor such as controller 180 communicatively coupled to an associated light intensity sensor may store an initial detected or measured light intensity in a memory such as memory 188, and associate that detected light intensity with a pad life of 100%. A processor such as controller 180 may receive periodic light intensity measurements from a corresponding sensor such as sensor 600 and compare those measurements with the initial measured light intensity and detect any change and/or the degree of change in the measured light intensity and take appropriate action or actions as the measured light intensity satisfies one or more predetermined thresholds. As the top surface of the coating 605 (and/or the detectable elements 606) wears away, the detectable coating 605 (and/or the detectable elements 606) wears away such as by, for example, wearing away proportionally and the corresponding detected light intensity diminishes or increases such as by, for example, diminishing or increasing proportionally. When the detectable light intensity level reaches a predetermined amount, the controller 180 may generate a warning signal or message and, for example, alert an operator via operator interface 182, to indicate that the coin pad 118 should be cleaned and/or replaced. For example, the controller 180 may generate such a warning signal when the measured light intensity decreases or increases to an intensity associated with an expected remaining pad life of 10%-15% or 5%. According to some embodiments, a deeper fabric finish or a thicker coating 605 (and/or thicker layer of the detectable elements 606) is provided to allow for a longer coating wear life.

According to some embodiments, the coating 605 (and/or the detectable elements 606) is IR (infrared) detectable and is used with a coin imaging sensor [see, e.g., U.S. Pat. Nos. 9,430,893; 9,508,208; 9,870,668; 10,068,406; 9,501,885; 9,916,713; and 10,685,523, each incorporated by reference herein by its entirety] to discern whether a coin is present under the sensor or not (Coin/No Coin), and/or provide a high precision coin diameter measurement, including the ability to measure non-circular perimeters and internal voids in coins (e.g., holes, cutouts, etc.). According to some such embodiments, the IR coating 605 (and/or the IR detectable elements 606) combined with the use of imaging sensor(s) enhances the contrast between a coin and the coin pad 118 hereby facilitating distinguishing a coin from the background coin pad 118 such as by a processor such as controller 180 communicatively coupled to an associated sensor wherein the processor is configured to receive data from the associated sensor and use the received data to distinguish a coin from the background coin pad 118.

According to some embodiments, the coating 605 (and/or the detectable elements 606) is eddy current detectable by an eddy current sensor (e.g., sensor 600 may be an eddy current sensor). According to such embodiments, the detection of such an eddy current coating 605 (and/or eddy current detectable elements 606) is used to signal a break between closely spaced coins that would otherwise appear as overlapping signal patterns, particularly when the coins being processed are not eddy current detectable and the coating 605 (and/or elements 606) are distinguishable from the coins such as by a processor such as controller 180 communicatively coupled to an associated sensor wherein the processor is configured to receive data or signal patterns from the associated sensor and use the received data or signal patterns to detect a spacing between coins and to distinguish one coin from an adjacent coin.

According to some embodiments, the distance a coin displaces the top of the coin pad 118 from the location it has been detected to be in the absence of a coin is measured and the increase in distance is used to measure the thickness of the coin displacing the top of the coin pad 118. For example, using average distance or specific location distance (such as being employing disc encoder 184 to associate a measured distance with a specific location on the surface of pad 118), a location specific distance and/or average distance "X" between one or more sensor(s) 600 and the top surface of the pad 118 is measured when no coins are present on the pad 118. For example, the initial distance may be detected to be 0.25 inches (6.3 mm), e.g., 0.21" (5.3 mm) recess depth between the bottom of sensor 600 and the lowermost surface 210/310 of the sorting head 212/312 plus a 0.04" (1.0 mm)

gap between the lowermost surface 210/310 of the sorting head 212/312 and the top of the pad 118. With this known initial distance, a coin passing beneath the sensor 600 presses the upper pad surface further away by the difference between the coin thickness and distance "X". The controller 180 receiving distance measurements from sensor 606 can then determine the thickness of the coin to a high degree of accuracy. Uses of coin thickness detection might include differentiating between two coins of identical or similar diameter but having different thicknesses, etc.

(4) Detectable Pad/Skin Tear

Figure 7A:
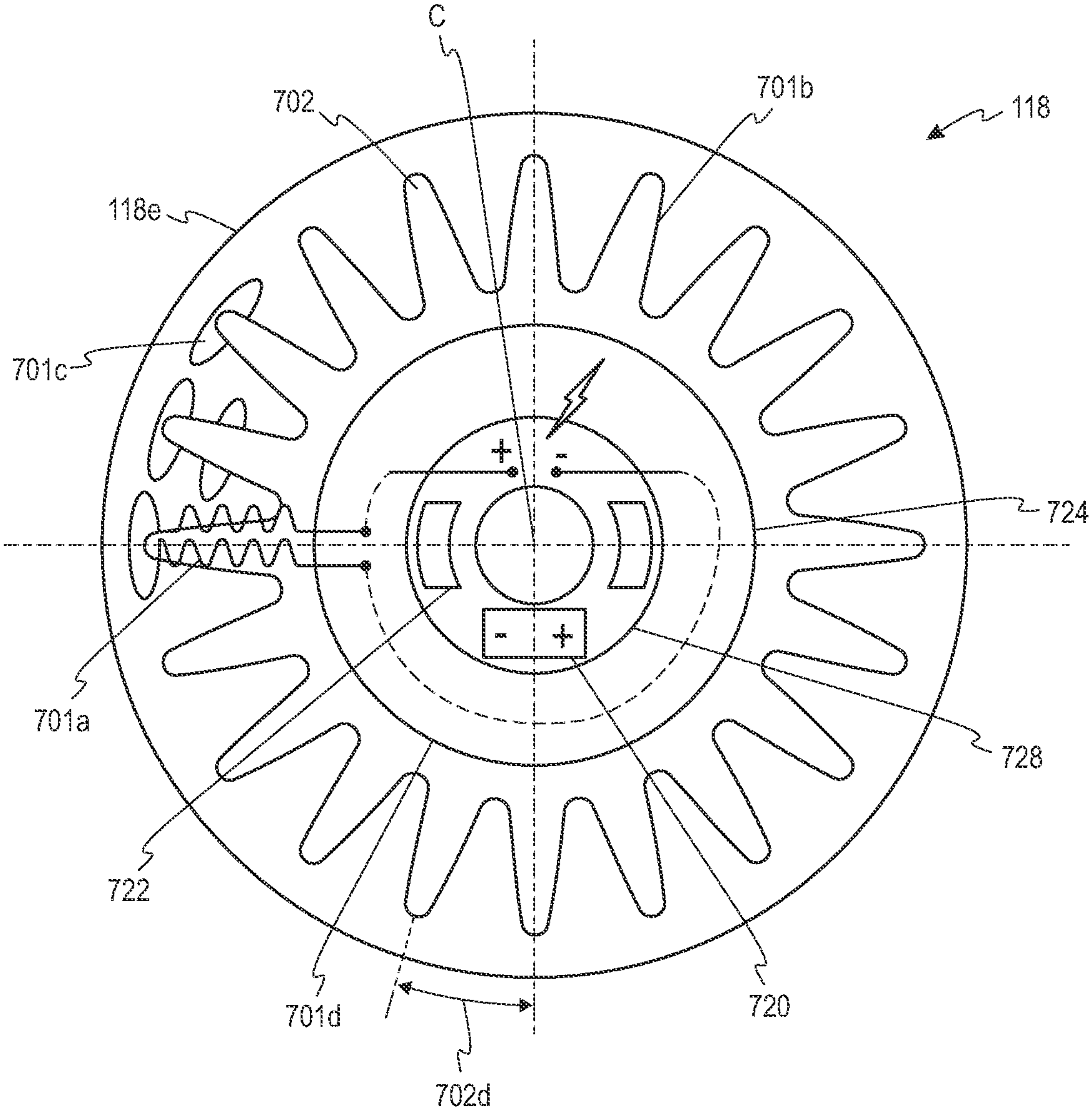
FIG. 7A is a schematic top view of a coin pad having one or more tear detectable elements according to some embodiments.
Figure 7B:
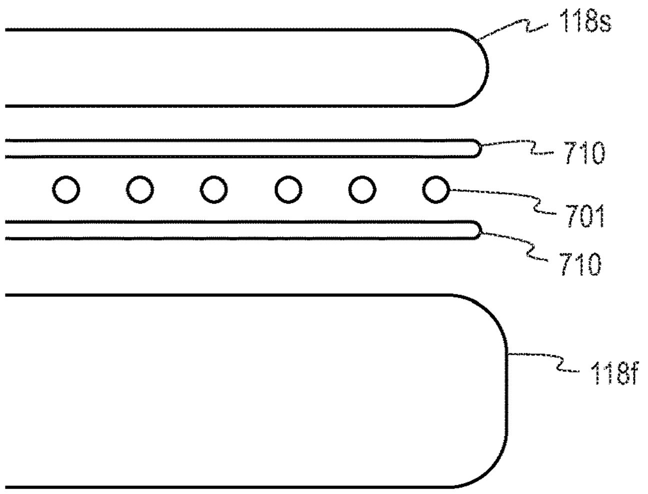
FIG. 7B is a schematic side view of a coin pad having one or more tear detectable elements according to some embodiments.
Figure 7C:
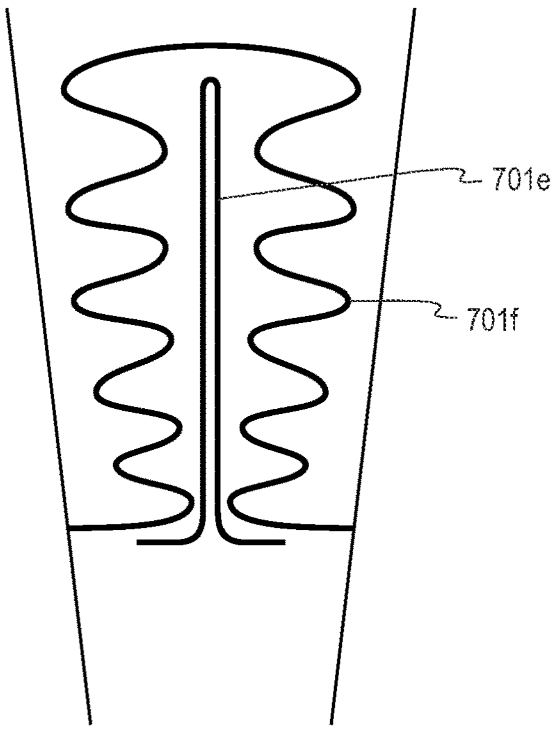
FIG. 7C is a schematic top view of exemplary tear detectable elements that may be employed with a coin pad such as, for example, the coin pad illustrated in FIG. 7A.

FIG. 7A is a schematic top view of a coin pad 118 having a plurality of tear detectable elements 701 and/or 702. FIG. 7B is a schematic side view of a coin pad 118 having a tear detectable element 701. FIG. 7C is a schematic top view of exemplary tear detectable elements 701 that may be employed with a coin pad such as, for example, the coin pad illustrated in FIG. 7A. While only one detectable element 701*a* is shown in FIG. 7A, according to some embodiments, a plurality of detectable elements 701*a*, 701*e*, and/or 701*f* can be positioned about the pad 118 such as, for example, 4-6 elements 701*a* (and/or 701*e* and/or 7010 per quarter of the circular pad 118. According to some embodiments, a plurality of detectable elements 701*a* (and/or 701*e* and/or 7010 can be positioned about the pad 118 every certain number 702*d* of degrees such as, for example, about every 18 degrees. The pad 118 has a center C. According to some embodiments, a pad 118 may have only a single detectable element such as detectable element 701*b* or 701*d*.

The shape of the detectable elements such as 701*a*, 701*b*, 701*e*, 701*f* may take on different shapes such as, for example, arc-shaped configurations repeated in one or more or all of sectors 702*d*.

According to some embodiments, each detectable element 701*a*-701*f* comprises a wire such as, for example, a thin copper wire, providing a continuity path monitored by a continuity sensor communicatively coupled to controller 180. While continuity is maintained in each detectable element 701*a*-701*f*, the pad integrity is indicated to be O.K. (e.g., the continuity detector(s) communicate maintained continuity to controller 180. When the surface of the pad 118 is damaged, such as by a sharp non-coin object, a tear, rip, gouge, etc., and the damage in the pad 118 breaks one or more of the detectable elements, e.g., wires, 701*a*-701*f*, the continuity of one or more of the detectable element(s) is broken, halting the flow of electricity through the one or more of the detectable elements, e.g., wires, 701*a*-701*f*. When electricity no longer flows through the one or more of the detectable elements, e.g., wires, 701*a*-701*f*, such condition is detected by one or more continuity detectors and communicated to a processor such as controller 180 which can then generate a stop signal to cause the rotatable disc 120 to stop rotating, e.g., by turning off or reversing motor 116 and/or applying braking mechanism 186, and/or the controller 180 can generate an alert that the pad 118 has been damaged, such as, for example, via operator interface 182. Accordingly, if a break in the continuity of the one or more detectable elements 701*a*-701*f* is detected, this condition could be used to detect a deterioration of the pad (e.g., a tear or rip in the coin pad). According to some embodiments, when a break in continuity is detected, an emergency stop signal may be issued (e.g., by controller 180) and the motor 116 driving the pad 118 may be stopped and/or an associated brake 186 may be activated to stop the rotation of the rotatable disc 120 and the pad 118 and/or the controller may annunciate and/or alert an operator of or owner of or maintenance personnel for a coin processing system or coin sorter 100 of damage to the pad 118. According to some embodiments, the sensor(s) monitoring continuity communicates wirelessly with a processor such as the motor controller 180 and/or brake 186.

According to some embodiments, magnetic detectors are employed instead of or in addition to continuity detectors to detect a break in one or more of the detectable elements 701*a*-701*f*.

According to some embodiments, such as embodiments employing a plurality of detectable elements separately monitored, e.g., detectable elements 701*a*, 701*c*, 701*e*, 701*f*, the coin sorter or counter 100 may permit an operator to override (e.g., using operator interface 182) a stop or halt command issued by a controller 180 upon the detection that one or more of the detectable elements has been broken in a particular one or more sectors 702*d* if after inspection of the pad 118, the operator believes the damage to the pad is not significant enough to warrant replacement of the pad.

According to some embodiments, the detectable elements 701*a*-701*f* are printed on or inside the pad 118 using stretchable or flexible electronic technology (see, e.g., "Soft, Wearable Health Monitor with Stretchable Electronics," by Georgia Institute of Technology, Tech Briefs, September 2019, pp. 35-36, www.techbriefs.com included as Exhibit 3 in the Appendix and/or "New conductive ink for electronic apparel," Phys Org, Jun. 25, 2015, https://phys.org/news/2015-06-ink-electronic-apparel.html included as Exhibit 4 in the Appendix.

As shown in FIG. 7B, according to some embodiments, the detectable elements, e.g., wires, 701*a*-701*f* are embedded within the pad 118 such as, for example, between the pad skin 118*s* and the pad foam layer 118*f*. In the example shown in FIG. 7B, layers of adhesive 710 are positioned on each side of the detectable elements, e.g., wires, 701*a*-701*f* between the pad skin 118*s* and the pad foam layer 118*f*. According to some embodiments, a single layer of adhesive 710 positioned on one side of the detectable elements, e.g., wires, 701*a*-701*f* between the pad skin 118*s* and the pad foam layer 118*f* could be employed. According to some embodiments, the wires 701 are made of copper printed on a fabric sheet embedded within the pad 118 as described above.

Additionally or alternatively, the pad 118 may comprise a detectable element 702 which may comprise a thin sheet of copper such as, for example, printed copper on a fabric sheet embedded within the pad 118 such as, for example, between the pad skin 118*s* and the pad foam layer 118*f*, such as explained above with connection with FIG. 7B. According to some embodiments, the printed detectable element 702 which may take any of a variety of forms or patterns such as, for example, the annular star shape having an undulating outer edge defined by line 701*d* and a central area (inside of line 724) devoid of copper shown in FIG. 7A. According to some embodiments, the central area has perimeter 724 having a diameter of between about 5-6 inches (12.7-15 cm), e.g., about 5.38 inches (13.7 mm). According to some embodiments, the central area (and/or continuity line 701*d*) is sized so that the detectable elements 701*a*-701*f*, 702 are positioned below the sorting head 212, 312, and not within the central opening 202, 302 of the annular sorting head 212, 312. According to some embodiments, the annular star shape of the detectable element 702 has a plurality of outward projections positioned about the pad 118 every certain number 702*d* of degrees such as, for example, about every 18 degrees.

According to some embodiments, when the surface of the pad 118 is damaged, such as by a sharp non-coin object causing a tear, rip, gouge, etc., and the damage in the pad 118 results in a break in the detectable element 702, resulting in the continuity of the detectable element(s) being broken, the halt of the flow of electricity through the detectable element 702 is detected by one or more continuity detectors. Such a condition is communicated by the one or more continuity detectors to a processor such as controller 180 which can then cause the rotatable disc 120 to stop rotating, e.g., by turning off or reversing motor 116 and/or applying braking mechanism 186, and/or the controller 180 can generate an alert that the pad 118 has been damaged, such as, for example, via operator interface 182. Accordingly, if a break in the continuity of the detectable element 702 is detected, this condition could be used to detect a deterioration of the pad (e.g., a tear or rip in the coin pad). According to some embodiments, when a break in continuity is detected, an emergency stop signal may be issued (e.g., by controller 180) and the motor 116 driving the pad 118 may be stopped and/or an associated brake 186 may be activated to stop the rotation of the rotatable disc 120 and the pad 118 and/or the controller may annunciate and/or alert an operator of or owner of or maintenance personnel for a coin processing system or coin sorter 100 of damage to the pad 118. According to some embodiments, the sensor(s) monitoring continuity communicates wirelessly with a processor such as the motor controller 180 and/or brake 186.

According to some embodiments, a battery 720 supplies power to the detectable elements 701*a*-701*f*, 702 and/or the continuity sensor(s). For example, as shown via dotted lines coupled to the ends of detectable element 701*a*, the ends of the detectable elements 701*a*-701*f* may be connected to one or more power lines powered by battery 720 and monitored by one or more continuity sensors. According to some embodiments, kinetic energy is used to recharge the battery 720 (e.g., as done with some wrist watches). According to some embodiments, the battery 720 may be wirelessly charged. According to some embodiments, one or more transceivers are coupled to the continuity sensor(s) both of which may be located in an electronics area 722. The one or more transceivers enable the continuity sensors to wirelessly communicate with a processor such as, for example, controller 180. According to some embodiments, an external power source may be employed and fed to the electronics on the pad 118 such as the detectable elements 701*a*-701*f*, 702 and/or the continuity sensor(s).

According to some embodiments, the pad 118 has an outer edge 118*e* having a diameter of about 11 inches (28 cm). According to some embodiments, an electronics area 722 has a diameter of about 2-3 inches (5-8 cm), e.g., about 2.63 inches (6.68 cm) and fits under or in and/or is protected by a center cone 801*c*, see, e.g., FIGS. 4A, 4I, 8A, and 8B.

According to some embodiments, the battery 720 and electronic area(s) 722 are mounted on a removable pad interface 728 having. e.g., a circular shape and dimensioned to fit under or in and/or be protected by a center cone 801*c*. During a pad change, the removable pad interface 728 may be decoupled from a pad 118 to be replaced and coupled to a new pad 118 to be or which has been coupled to the solid disc 120. According to some embodiments, the removable pad interface 728 and/or the pad 118 have printing or other alignment indications thereon to facilitate the proper alignment of the removeable pad interface 728 with respect to the pad 118. According to some embodiments, a bottom surface of the removeable pad interface 728 has a plurality of electrodes extending therefrom and which electrically couple the electronics on the removeable pad interface 728 to the detectable elements 701*a*-701*f*, 702 when the removeable pad interface 728 is pressed into the top surface of the pad 118.

(5) Composite Differential Adhesive

According to some embodiments, to facilitate the changing of a pad 118, such as by an operator of the system 100 between visits of regular maintenance personnel and/or by maintenance personnel, an adhesive having a lower level of tackiness is used to couple a pad 118 to the rotatable disc 120. According to some embodiments, due to the size and high surface energy of the turntable (e.g., a disc 120 having an 11" (28 cm) diameter and being made of machined aluminum) a "low tack" adhesive is able to produce high amounts of strength in a shear direction (e.g., parallel to the surface of the disc 120 while allowing for very low force required while removing the pad when in tension (e.g., in a direction perpendicular and/or some other angle other than parallel to the surface of the disc 120). Additionally or alternatively, according to some embodiments, a differential adhesive (different levels of adhesion on each side) is employed that will properly bond with the low surface energy of the machined pad and the high surface energy of the turntable platen/disc 120. According to some such embodiments, an operator may peel off a pad 118 that needs to be replaced and couple a new pad 118 to the disc 120 in its place.

According to some embodiments, the differential adhesive is oriented with respect to the lower surface of the pad 118 such that the differential adhesive releases the bond between it and the disc 120 while remaining adhered to the old pad 118 so that when an old pad 118 is removed, all or most of the adhesive remains attached to the removed old pad 118 and the top surface of the rotatable disc 120 is substantially free of adhesive. Then an adhesive protective layer (e.g., film) may be removed from the bottom of a new pad 118 and then the pad 118 may be coupled to the top surface of the disc 120.

According to some embodiments, the differential adhesive is made by adhering or laminating a "low tack" adhesive layer to a "high tack" or high-strength adhesive layer and adhering the "high tack" adhesive layer to the bottom surface of the pad 118. A liner remains over the "low tack" adhesive layer until the pad 118 is to be adhered to a disc 120. According to some embodiments, 3M Flexomount™ Solid Printing Tape 412DL is used as the "high tack" adhesive layer and 3M Repositionable Tape 9415PC tape is used as the "low tack" adhesive layer. "High tack" is a tackiness equal to or greater than the tackiness of 3M Flexomount™ Solid Printing Tape 412DL and "low tack" is a tackiness equal to or less than the tackiness of 3M Repositionable Tape 9415PC. The 3M Repositionable Tape 9415PC tape may be used on items that need to be repositioned easily and carries a very low adhesive bond similar to that of a 3M Post-it® note. More information about 3M Flexomount™ Solid Printing Tapes including 412DL is provided in the data sheet included as Exhibit 1 in the Appendix and more information about 3M Repositionable Taps including 9415PC is provided in the data sheet included as Exhibit 2 in the Appendix. According to some embodiments, 3M Flexomount™ Solid Printing Tape 412DL serves as a high strength adhesive that provides a good bond to a machined foam 118*f* surface of the sort pad 118.

According to some embodiments, a sheet of differential adhesive is made beginning with a sheet of 3M Flexomount™ Solid Printing Tape 412DL and a sheet of 3M Repositionable Tape 9415PC tape, each having a paper or plastic liner on both opposing surfaces thereof. The liner on one surface of each of the 3M Flexomount™ Solid Printing Tape 412DL and 3M Repositionable Tape 9415PC tape is removed, and the exposed surfaces of the sheets of 3M Flexomount™ Solid Printing Tape 412DL and 3M Repositionable Tape 9415PC tape are adhered or laminated together to create a sheet of differential adhesive. The high tack side of the 3M Flexomount™ Solid Printing Tape 412DL is then attached or adhered to the foam 118*f* side of a sort pad 118 (after removing the liner from that side of the sheet of differential adhesive) while the liner on the 9415PC side of the differential adhesive sheet remains on the sort pad 118 until the pad 118 ready to be installed on a disc 120. At that time, the liner covering the 9415PC side of the differential adhesive sheet is removed, and the pad 118 via the differential adhesive is adhered to the disc 120 of a coin sorter 100.

(6) Twist-Lock Debris Blade or Cone

Figure 8A:
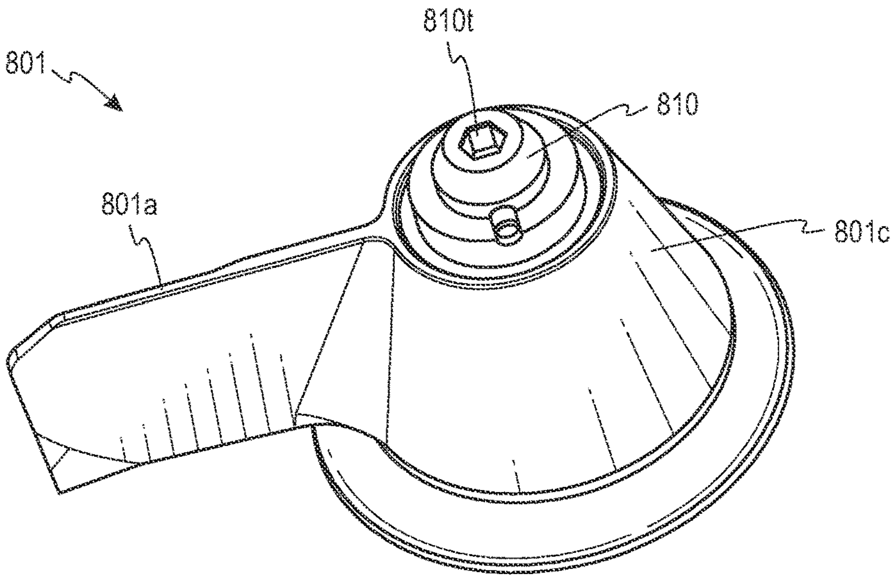
FIG. 8A is a top perspective view and FIG. 8B is a bottom perspective view of a twist-lock debris blade according to some embodiments.
Figure 8B:
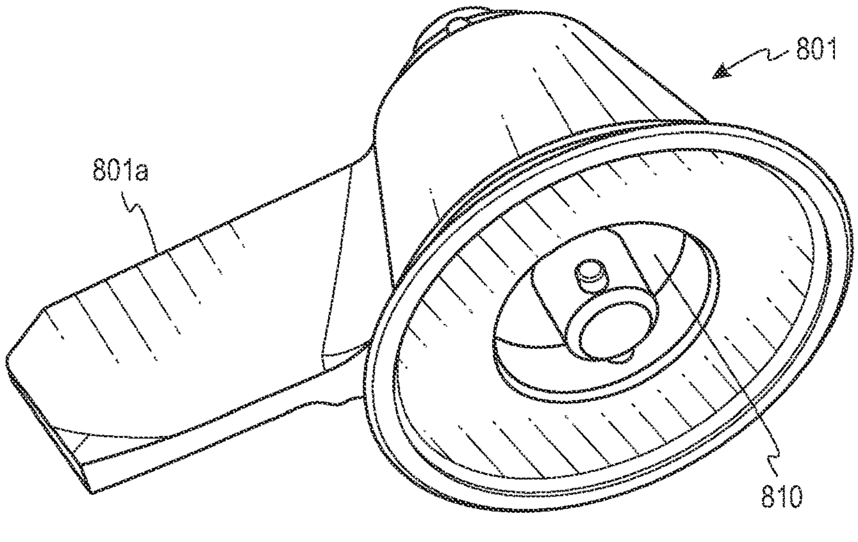
Figure 8C:
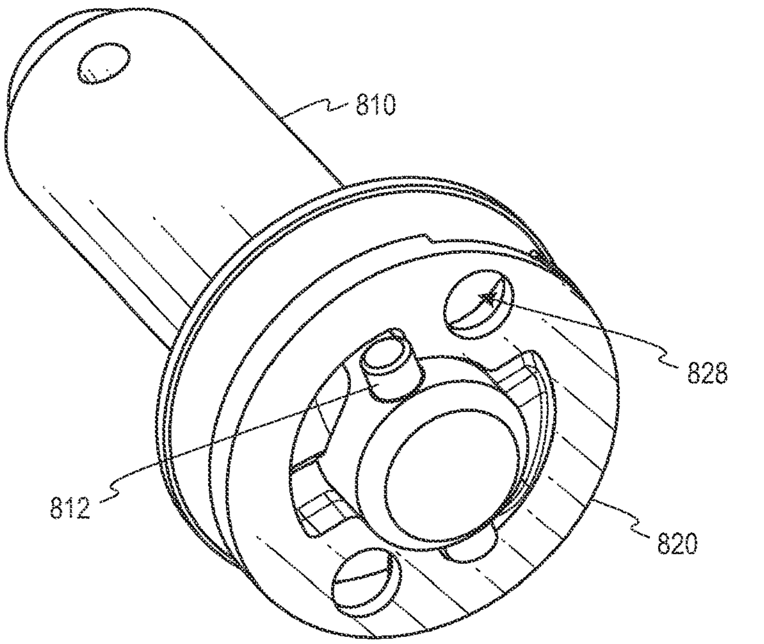
FIG. 8C is a bottom perspective view of a debris blade post and a retaining washer interface according to some embodiments.
Figure 8D:
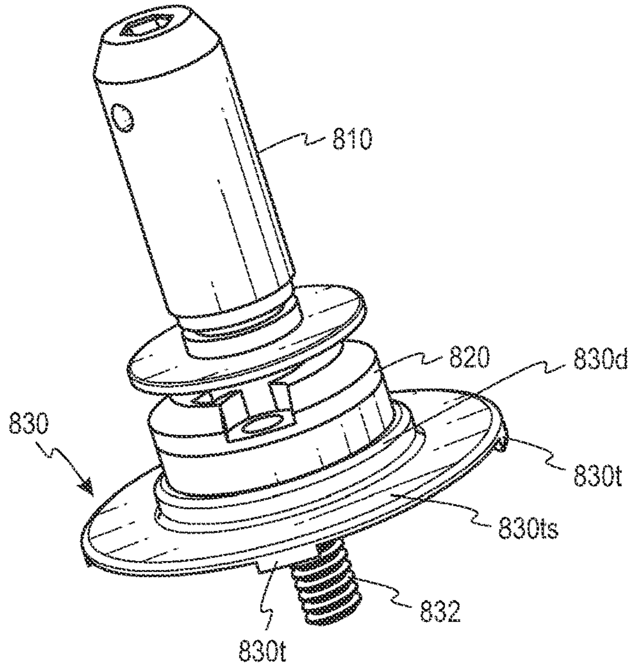
FIG. 8D is a side perspective view of the debris blade post, the retaining washer interface, and a coupler according to some embodiments.
Figure 8E:
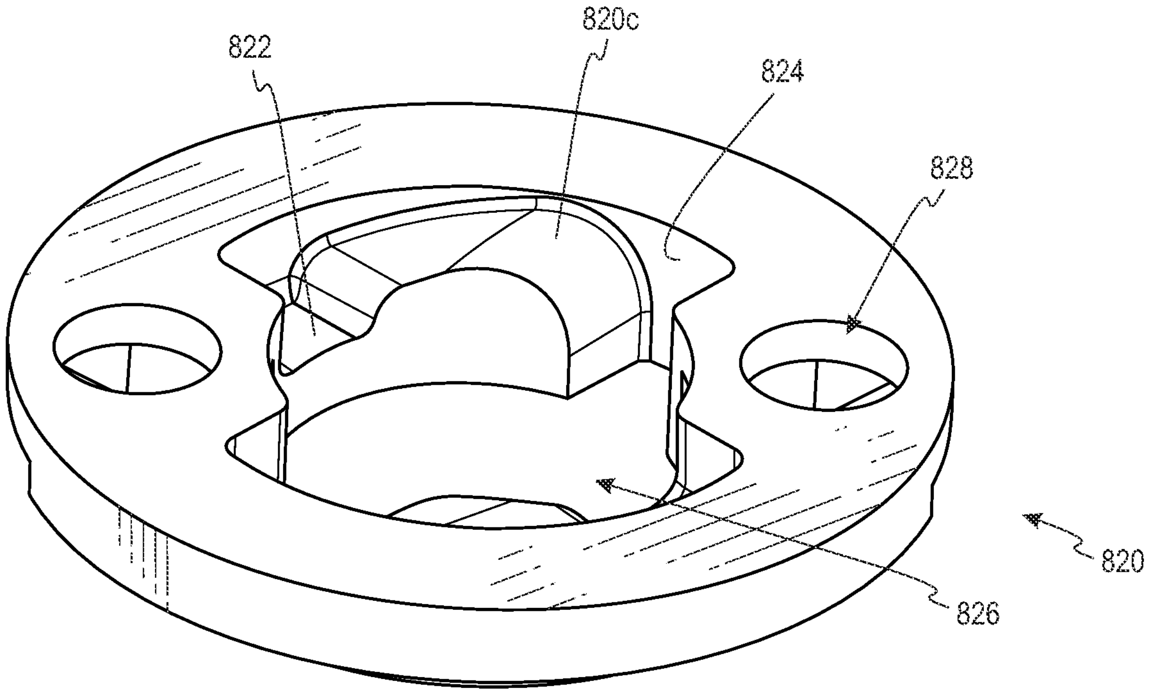
FIG. 8E is a bottom perspective view of a retaining washer interface according to some embodiments.
Figure 8F:
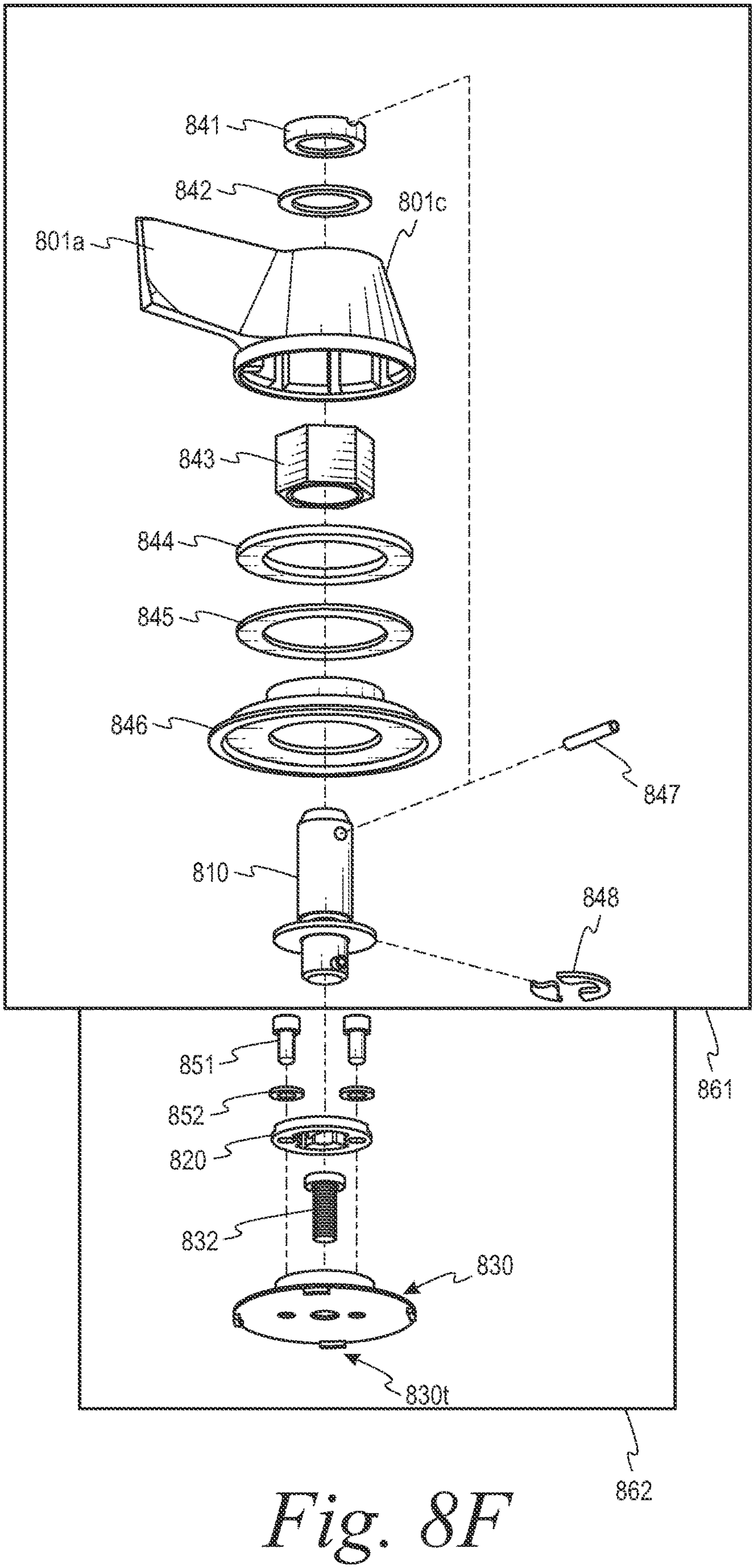
FIG. 8F is an exploded, perspective view of some components of a twist-lock debris blade assembly and disc mounting assembly according to some embodiments.
Figure 8G:
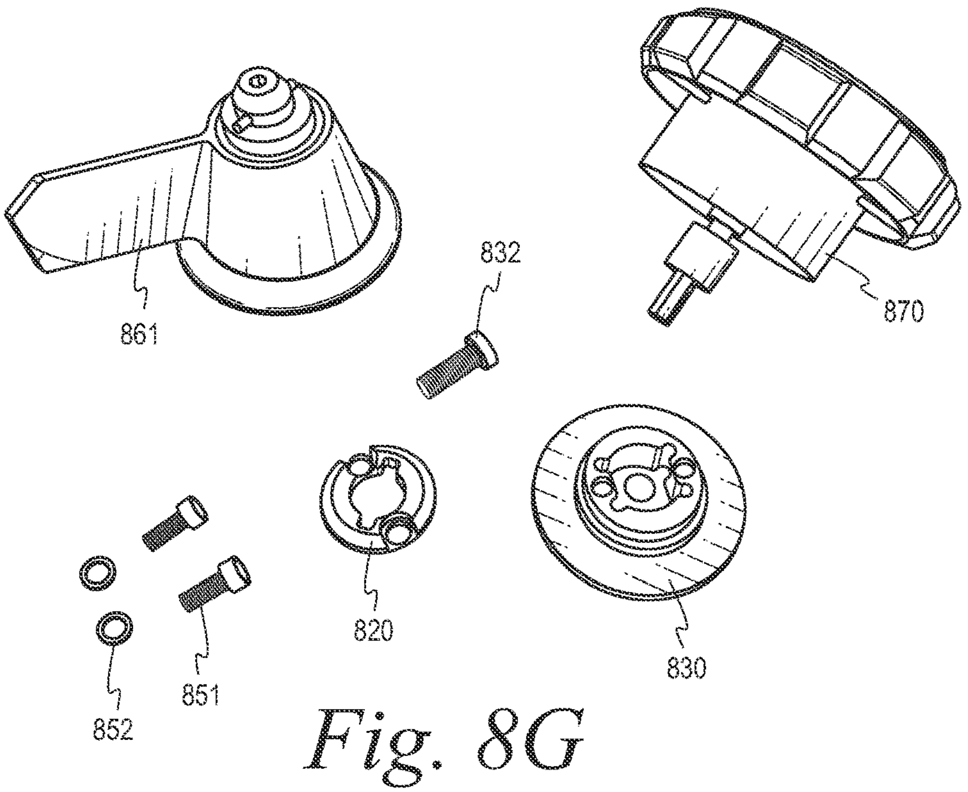
FIG. 8G illustrates perspective views of parts of a twist-lock debris blade assembly and disc mounting assembly and a post coupling tool according to some embodiments.
Figure 8H:
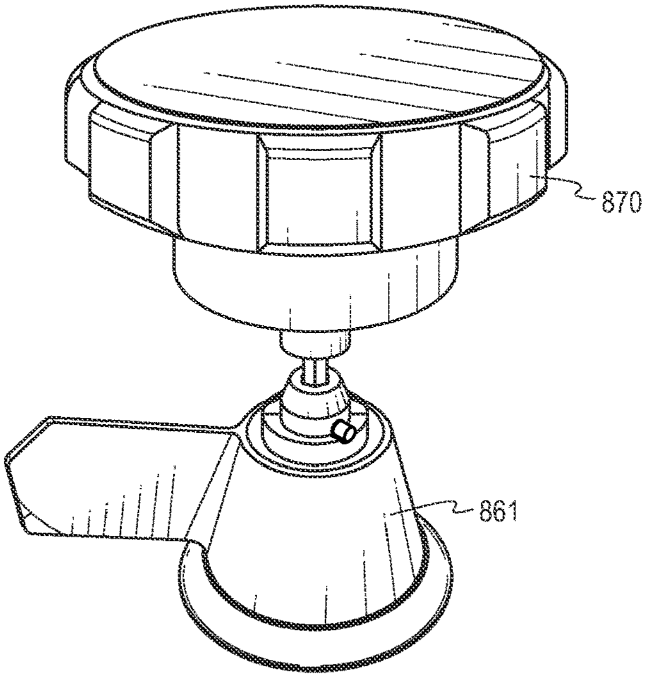
FIG. 8H is a perspective view of a post coupling tool engaged with a twist-lock debris blade assembly according to some embodiments.

According to some embodiments, to facilitate the changing of a pad 118, such as by an operator of the system 100 between visits of regular maintenance personnel and/or by maintenance personnel, a twist-lock debris blade or cone 801 is employed. FIG. 8A is a top perspective view and FIG. 8B is a bottom perspective view of a twist-lock debris blade or cone 801. FIG. 8C is a bottom perspective view of a debris blade or cone post 810 and a retaining washer interface 820 and FIG. 8D is a side perspective view of the debris blade or cone post 810, the retaining washer interface 820, and a coupler 830. FIG. 8E is a bottom perspective view of the retaining washer interface 820. FIG. 8F is an exploded, perspective view of some components of a twist-lock debris blade or cone assembly 861 and disc mounting assembly 862 according to some embodiments. FIG. 8G illustrates perspective views of parts of a twist-lock debris blade assembly 861 and disc mounting assembly 862 and a post coupling tool 870 according to some embodiments. FIG. 8H is a perspective view of a post coupling tool 870 engaged with a twist-lock debris blade assembly 861 according to some embodiments.

According to some embodiments, the debris blade 801 may have a relatively straight debris arm 801*a* coupled to or integral with a center cone 801*c* as illustrated in FIGS. 8A, 8B, 4A, and 4B or a curved debris arm 801*b* coupled to or integral with a center cone 801*c* as illustrated in FIG. 4E.

According to some embodiments, utilizing the spring force of the sorting pad 118, the debris blade 801 incorporates a quarter turn, locking geometry to install and retain the debris blade while in use. To remove, the user depresses the debris blade post 810 using a post coupling tool (such as, for example, a 5⁄16 inch [8 mm] hex tool or key fitted into a tool interface 810*t* located on the top of the debris blade post 810) and rotates the debris blade post 810 a quarter turn in the counter-clockwise direction. The pad 118 is then removed by lifting on the outer edge of the pad 118.

According to some embodiments, the debris blade post 810 has one or more retaining flanges 812 located near the bottom of the post 810. The retaining washer interface 820 has a central generally circular opening or cylindrical aperture 826 slightly larger than the generally circular or cylindrical lower portion of the post 810. The retainer washer interface 820 also has one or more retaining flange unlocked profiles 824 and one or more retaining flange locking profiles or surfaces 822 which may define one or more detents. In between the unlocked profiles 824 and the locking surfaces 822, the interface 820 has one or more cam profiles or surfaces 820*c*. To install the post 810 and couple it to the washer interface 820, the generally circular or cylindrical lower portion of the post 810 is fitted through the central, generally circular opening 826 of the interface 820 with the retaining flanges 812 lined up with the unlocked profiles 824. The post 810 is then turned a quarter turn in a clockwise direction (e.g., using the post coupling tool 870) and the retaining flanges 812 travel under the cam surfaces 820*c* and are retained by the locking surfaces 822 in the absence of downward pressure by the post coupling tool 870. The pad 118 is made of a flexible, resilient material that permits the post 810 and the retaining flanges 812 thereof to be moved downward when the post 810 is pressed downward by a person. However, when the person no longer pushes downward on the post 810, the pad 118 presses the post 810 and the retaining flanges 812 into locked engagement with the locking surfaces 822.

To uncouple the post 810 from the interface 820, the post is pressed downward and rotated a quarter-turn in the counter-clockwise direction, first moving the retaining flanges 812 out of locked engagement with the locking surfaces 822, then moving the retaining flanges 812 over the cam surfaces 820*c* and finally aligning the retaining flanges with the unlocked profiles 824 of the interface 820. The generally circular or cylindrical lower portion of the post 810 is then removed from the central, generally circular opening 826 of the interface 820 with the retaining flanges 812 lined up with the unlocked profiles 824.

Although not shown in FIGS. 8C and 8D, according to some embodiments, the debris blade 801*a*, 801*b* and the associated center cone 801*c* may remain coupled to the post 810 during the process of coupling and decoupling the post 810 to the interface washer 820.

According to some embodiments, the washer interface 820 is fixedly coupled to the rotatable disc 120 such as via one or more fasteners (e.g., screws) inserted through apertures 828 and coupled directly or indirectly to the rotatable disc. For example, according to some embodiments, the washer interface 820 is fixedly coupled to a disc coupler or debris cone base 830 which in turn is fixedly coupled to the rotatable disc 120 such as via a threaded post 832.

Turning to FIG. 8F, some components of a twist-lock debris blade assembly 861 and disc mounting assembly 862 according to some embodiments are shown. As shown, the twist-lock debris blade assembly 861 comprises a stop 841, a shim 842, the center cone 801*c* having a debris blade 801*a* formed integral therewith, a bearing housing 843, a shim 844, a washer 845, an angled washer 846, and the debris blade post 810 into which a dowel pin 847 is inserted above the stop 841. A retaining ring 848 is also coupled to the debris blade post 810. According to some embodiments, the several washers assist with allowing free rotation of the post 810 and/or reduce friction, etc., during the rotation of the post 810. According to some embodiments, the bearing housing 843 may be a one-way bearing.

The disc mounting assembly 862 comprises the retainer washer interface 820, two screws 851 and washers 852 used to secure the retaining washer interface 820 to the disc coupler or debris cone base 830. The threaded post 832 is fitted through a central aperture in the base 830 and screwed into a corresponding threaded aperture in the center of the disc 120 (not shown in FIG. 8F). Referring to FIGS. 8D and 8F, the base 830, also has one or more retaining tabs 830*t* which fit into matching depressions or holes in the surface of the disc 120 which keep the base 830 from rotating with respect to the disc 120 when the base 830 is secured to the disc 120. When installed, a top surface 830*ts* of the base 830 is flush with the top surface of the disc 120 according to some embodiments. Additionally, the base 830 may have a raised, circular, pad centering portion 830*d*. During installation of a new pad 118, the pad 118 may have a central aperture sized to accommodate the raised, circular, pad centering portion 830*d* of the base 830 which assists with centering the pad 118 on the disc 120.

According to some embodiments, the twist-lock debris blade assembly 861 is assembled during production and remains assembled during the processes of coupling and decoupling the debris blade post 810 to the retaining washer interface 820. Rather, the twist-lock debris blade assembly 861 may be removed and installed as a unit during a pad change operation.

As shown in FIGS. 8G and 8H, according to some embodiments, the post coupling tool 870 may have a large handle at the top of the tool 870 to facilitate the ability of a person to press down on the tool 870 and rotate it during the process of uncoupling and/or coupling the post 810 from/to the retaining washer interface 820. The lower end of the tool 870 is configured to mate with the tool interface 810*t* located on the top of the debris blade post 810, and may be, for example, a 5/16 inch (8 mm) hex tool or key. According to other embodiments, the tool 870 and the tool interface 810*t* may have other configurations such as, for example, an internal or external wrenching hex, flat head or cross recessed head, knurl, or other shape that provides adequate torque to the post 810 to get its retaining flanges 812 to engage and seat properly within the interface 820.

While FIGS. 8A-8B and 8F-8H illustrate a cone 801*c* having a debris blade or arm 801*a*, 801*b* extending therefrom, according to some such embodiments, a cone 801*c* not having a debris blade or arm 801*a*, 801*b* may be used.

Figure 9A:
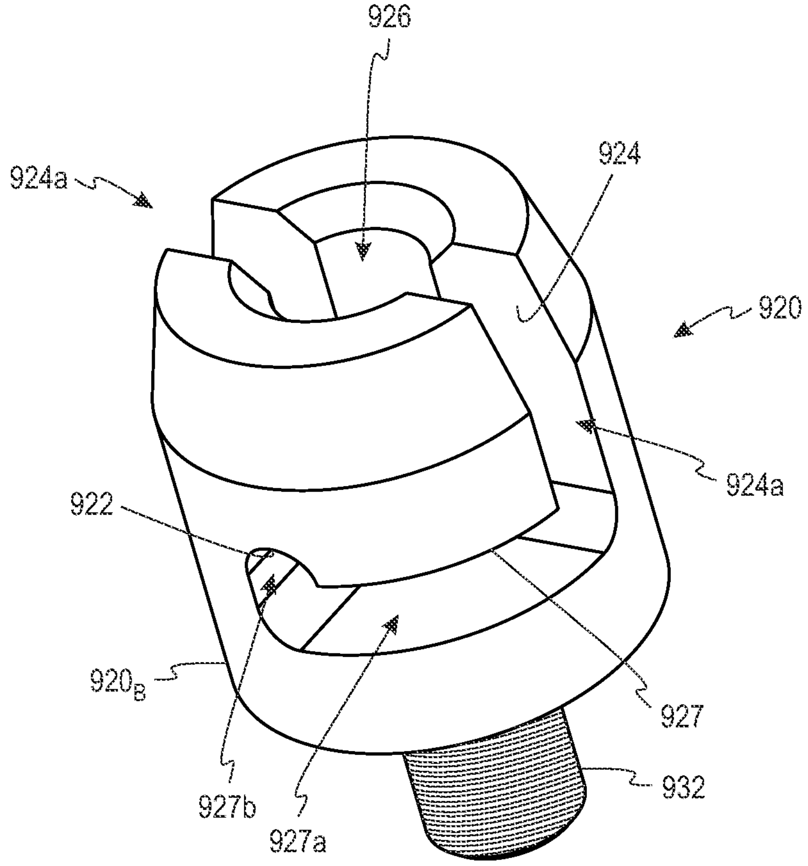
FIG. 9A is a side perspective view.
Figure 9B:
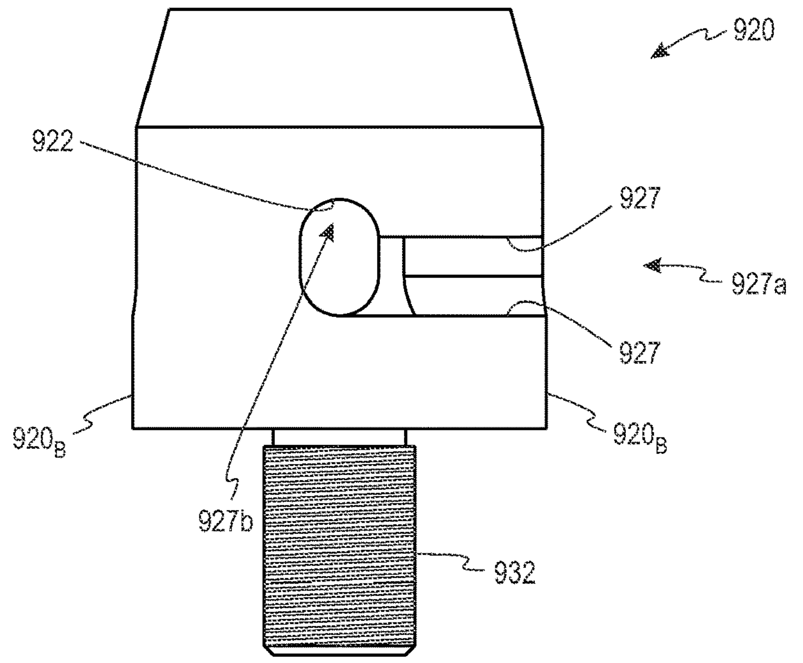
FIG. 9B is a first side.
Figure 9C:
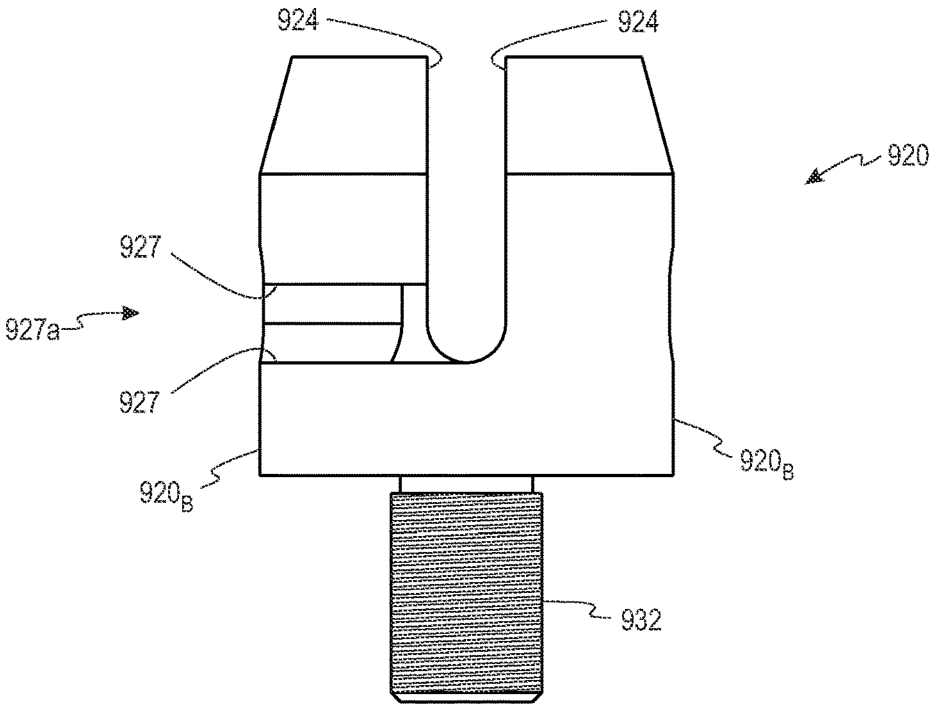
FIG. 9C is a second side view.
Figure 9D:
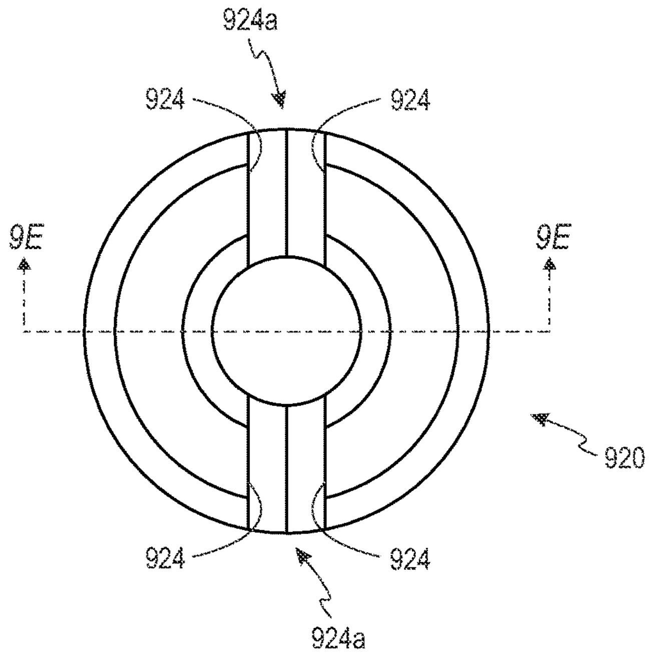
FIG. 9D is a top view.
Figure 9E:
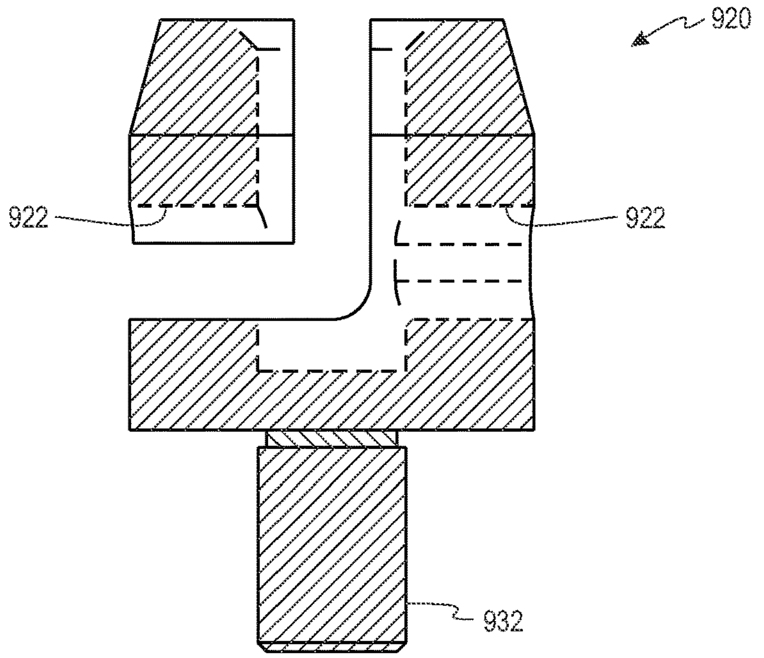
FIG. 9E is a cross-sectional side view of an alternative embodiment of a retaining washer interface according to some embodiments.

FIG. 9A is a side perspective view; FIG. 9B is a first side; FIG. 9C is a second side view; FIG. 9D is a top view; and FIG. 9E is a cross-sectional side view of an alternative embodiment of a retaining washer interface 920 according to some embodiments. The second side view shown in FIG. 9C is about 90° offset from the first side view shown in FIG. 9B. The cross-sectional view shown in FIG. 9E is taken along line 9E-9E shown in FIG. 9D.

10A is a perspective view; FIG. 10B is a first side; and FIG. 10C is a second side view of an alternative embodiment of a center cone retaining post 1010 according to some embodiments. FIG. 11 is a perspective view of portions of a coin processing system 100 showing a center cone retaining post 1010 holding a center cone 801*c* against the top of a pad 118. The pad 118 is bonded or coupled to the top surface of a solid disc 120. In FIG. 11, the retaining post 1010 is coupled to the retaining washer interface 920 which has been coupled to the solid disk 120 and/or other portion of a turntable such as by a threaded end 932 being screwed into a threaded aperture in the center of the solid disk 120 and/or turntable.

Figure 10A:
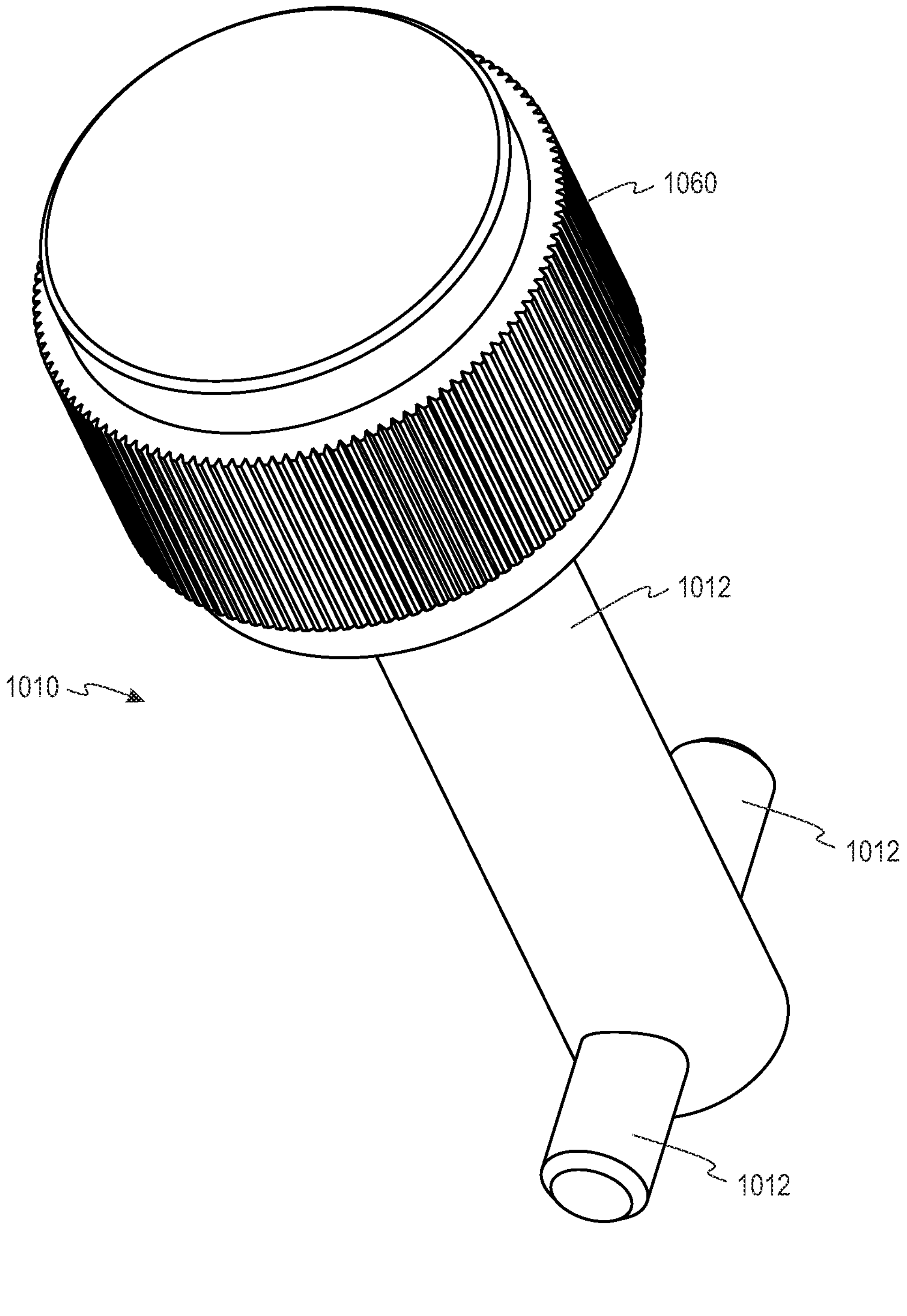
FIG. 10B is a first side.
FIG. 10C is a second side view of an alternative embodiment of a post coupling tool according to some embodiments.
Figure 10C:
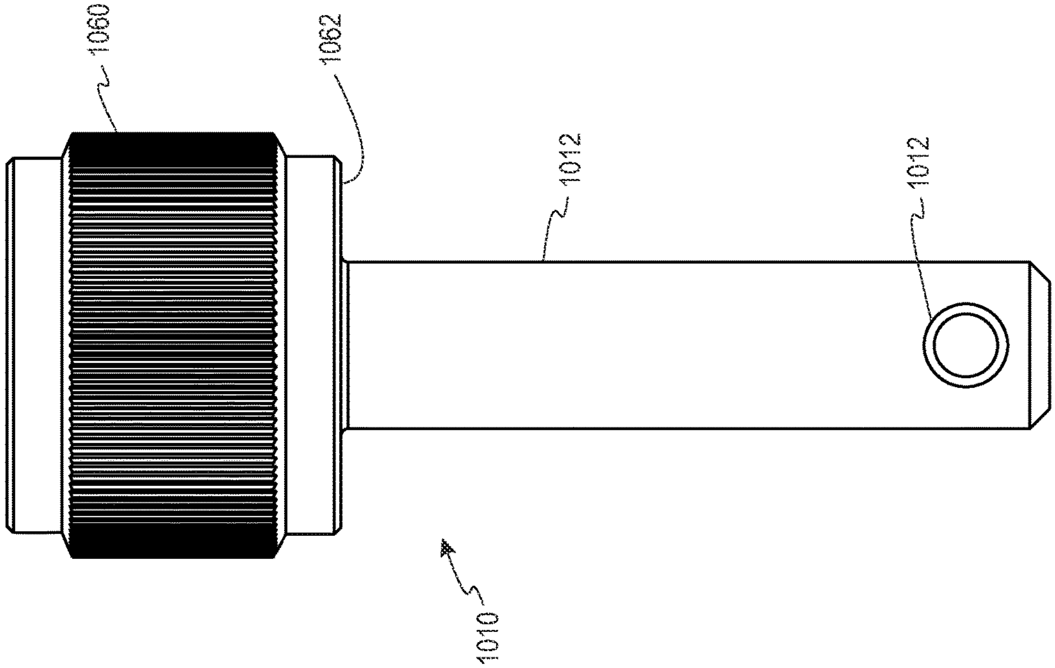
Figure 10B:
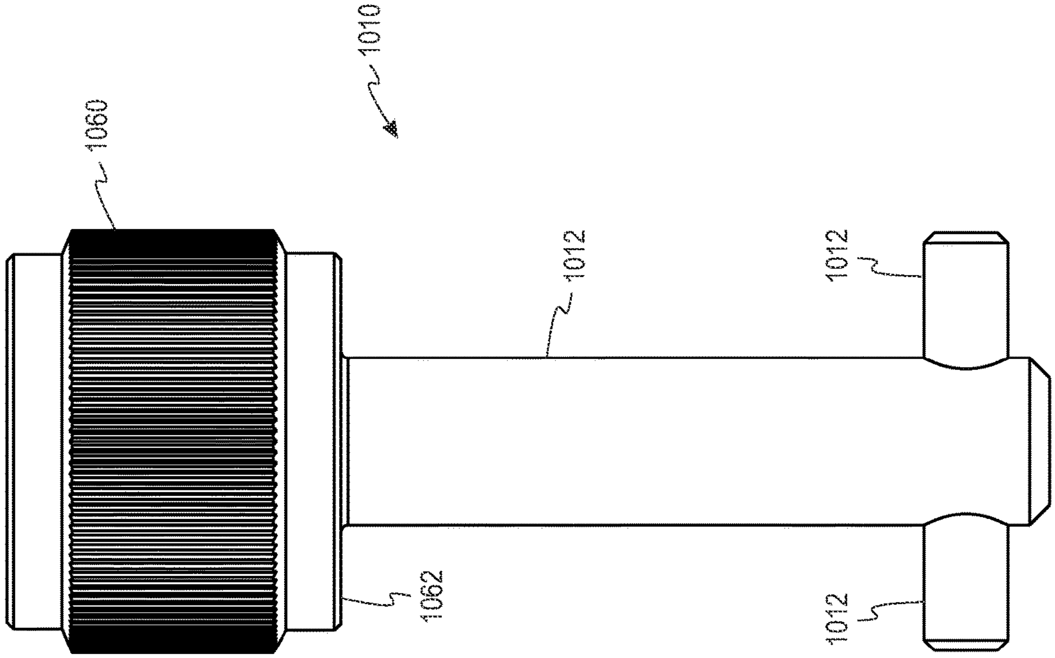
Figure 11:
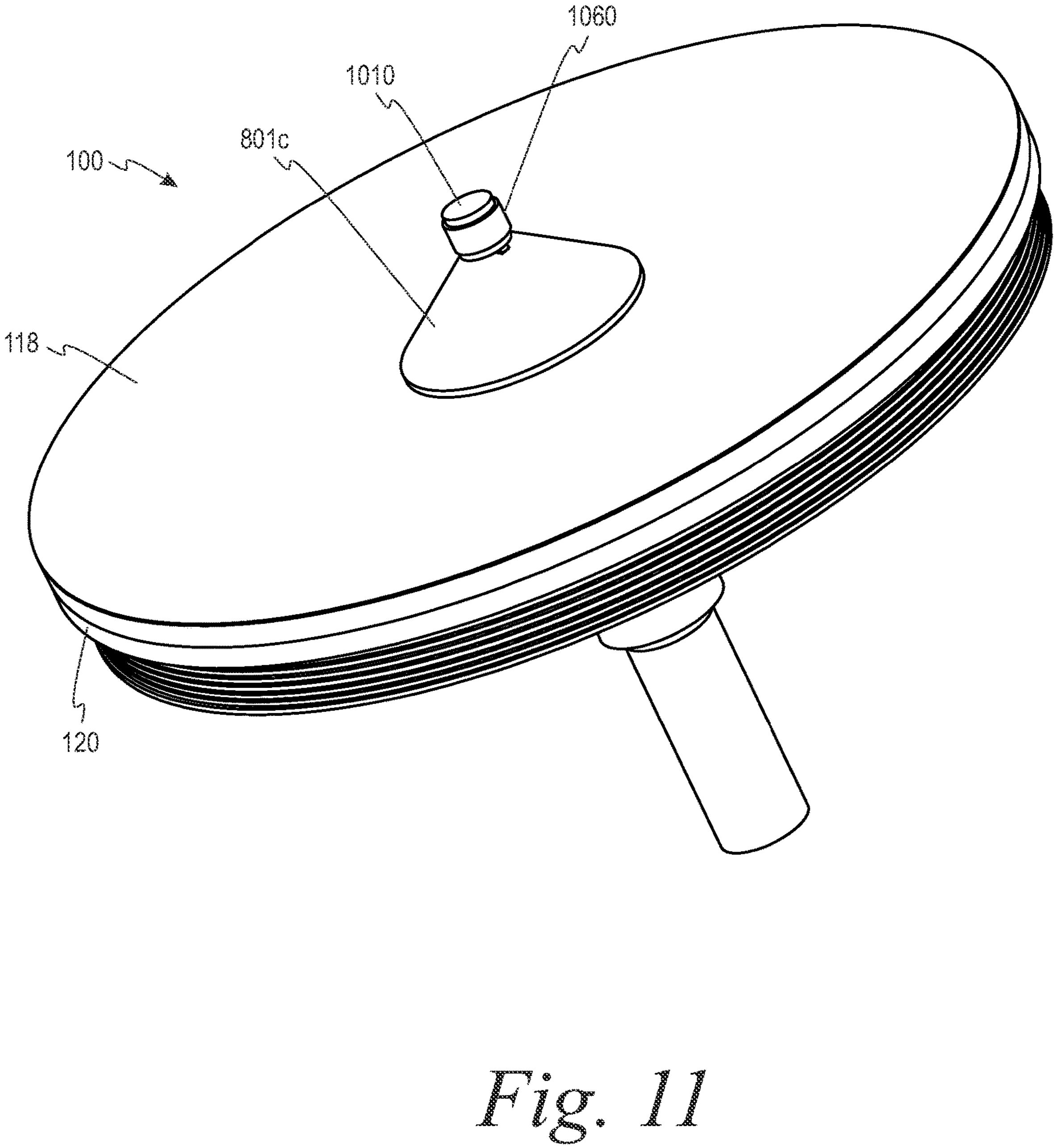
FIG. 11 is a perspective view of portions of a coin processing system showing a center cone retaining post holding a center cone against the top of a pad.

As shown in FIGS. 10A-10C, the center cone retaining post 1010 has a cylindrical post section 1012 having a high-friction handle 1060 near a first end and having retaining flanges 1012 near a second end. According to some embodiments, the high-friction handle 1060 has a knurled surface. When in an operative position, a bottom surface 1062 of the handle 1060 engages a top surface of a cone 801*c* to bias the cone 801*c* downward into a pad 118 as shown in FIG. 11. According to some embodiments, the post may not have a handle and may have a cone engaging surface 1062 without having a handle 1060.

Turning back to FIGS. 9A-9E, the retaining washer interface 920 may have a generally cylindrical shape and have a generally cylindrical central aperture 926 in a top end of the interface 920 and one or more side apertures 924*a* and one or more pivot apertures 927*a*. As illustrated, two side apertures have a generally vertical orientation and are defined by generally vertical internal side walls 924 extending from near the top of the interface 920 to a lower internal wall 927. As illustrated, two pivot apertures 927*a* defined by internal walls 927 extend generally horizontally from lower portions of side apertures 924*a* in a common direction (clockwise in FIG. 9A) and terminate with a raised upper wall 922. Although not visible in FIG. 9A, there is a second pivot aperture 927*a* on the far side of the interface 920 having the same or similar shape as the visible aperture 927*a*. The cylindrical center aperture 926 is sized to accommodate the cylindrical post section 1012 of the cone retaining post 1010 and the apertures 924*a*, 927*a* are sized to accommodate the retaining flanges 1012 of the cone retaining post 1010. The interface 920 also has a threaded post 932 at a lower end that is configured to be screwed into a corresponding threaded aperture in the center of the disc 120, thereby securely coupling the interface 920 to the disc 120.

To assemble the arrangement shown in FIG. 11, the threaded post 932 of the interface 920 is screwed into a corresponding threaded aperture in the center of the disc 120. Then a pad 118 is coupled to the disc 120. According to some embodiments, the pad 118 has a central opening or aperture sized to just fit about the circumference of a bottom portion 920B of the interface 920, thereby aiding in centering the pad 118 on the disc 120. Once the pad 118 has been installed in the disc 120, the cone 801*c* having a central opening in placed over the interface 920.

Next, the center cone retaining post 1010 is coupled to the interface 920. To accomplish this coupling, the lower end of the cone retaining post 1010 is inserted through the center opening in the cone and the retaining flanges 1012 on the post 1010 are aligned with the side apertures 924*a* of the interface 920. According to some embodiments, the center opening in the cone may have cut outs sized to permit the retaining flanges 1012 of the post 1010 to fit therethrough. Once the retaining flanges 1012 on the post 1010 are aligned with the side apertures 924*a* of the interface 920, the post 1010 is lowered within the interface 920 until the retaining flanges 1012 contact the lower internal walls 927. The post 1010 is then rotated about its longitudinal axis (here, vertical axis) until the retaining flanges 1012 contact the walls at the end of the pivot apertures 927*a*. To aid in the rotation of the post 1010, the handle 1060 may have a high-friction surface such as a knurled surface. According to some embodiments, a user, operator, or technician may insert and rotate the post 1010 into and within the interface 920 by holding and squeezing the handle 1060 in his or her handle. According to some embodiments, while the post 1010 is being lowered vertically within the interface 920 with the retaining flanges aligned within the vertical apertures 924*a*, the lower surface of 1062 of the handle contacts the top edge of the cone 801*c*. To enable the post 1010 to travel further down into the interface 920 so that the retaining flanges 1012 may become aligned with the horizontal apertures 927*a*, the user must press the handle 1060 downward, thereby pushing the cone 801*c* into the compressible pad 118. While still pressing downward, the handle is then turned or rotated (clockwise in FIG. 9A) as the retaining flanges pass through the pivot apertures 927*a*. Once the retaining flanges 1012 contact the walls at the end of the pivot apertures 927*a* and the downward bias or pressure from a person installing the post 1010 within the interface 920 is removed, the resilient pad 118 biases the cone 801*c* upward, thereby pressing upwardly into the lower surface 1062 of the handle 1060 and thereby biasing the post 1010 upward and raising the retaining flanges 1012 into the raised upper walls 922 and the corresponding rotation prevention notches or detents 927*b*.

To remove the cone 801*c* and pad 118 from the arrangement shown in FIG. 11, the above steps are followed in reverse order. A person presses the handle 1060 downward, thereby pushing the cone 801*c* into the compressible resilient pad 118 and moving the retaining flanges out of the rotation prevention notches or detents 927*b*. While still pressing downward, the handle is then turned or rotated (counter-clockwise in FIG. 9A) as the retaining flanges pass through the pivot apertures 927*a*. Once the retaining flanges 1012 contact the far interior walls 924 at the other end of the pivot apertures 927*a* and/or the retaining flanges 1012 become aligned with the vertical side apertures 924*a*, the post 1010 may be moved upward and out of the interface 920. Next the cone 801*c* may be lifted over the interface 920 and removed. Next the pad 118 may be decoupled from the disc 120 and, if desired, a new pad 118 may be coupled to the disc 120 and the cone 801*c* and the post 1010 may be reinstalled.

According to some embodiments, the post 1010 may have a tool interface on the top of the post 1010 or handle 1060. Such a tool interface may be the same or similar to tool interface 810*t* discussed above and may be designed to work with tool 870. According to some such embodiments, the high-friction area of the handle 1060 may be omitted.

While the cone 801*c* shown in FIG. 11 does not have a debris blade or arm 801*a*, 801*b* extending therefrom, according to some embodiments, it may have a debris blade or arm. Likewise, while some of the embodiments above utilize a cone 801*c* having a debris blade or arm 801*a*, 801*b* extending therefrom, according to some such embodiments, a cone 801*c* not having a debris blade or arm 801*a*, 801*b* may be used.

Thus, employing one or more of the above improvements (1)-(6), a number of advantages may be achieved. For example, a pad 118 with a higher tensile strength may be provided; a pad 118 that is tear resistant may be provided; a pad 118 that is puncture resistant may be provided; a pad 118 exhibiting reduced stretch may be provided which can contribute to maintaining a coin on its desired path, the reduction of mis-sorts, and the ability to process coin sets that are otherwise more challenging; pad tears or damage may be detected and annunciated such as by notifying appropriate personnel and halting operation of the coin sorter 100 thereby minimizing sorting inaccuracies that may otherwise be caused by use of a damaged pad; pad wear detection and/or preventative measures may be provided and, for example, the detection of a certain level of pad wear may be used to prompt service or other personnel to change a worn pad before a catastrophic failure or mis-sorts due to a worn pad occur; and/or a coating that allows for improved coin authentication and/or coin discrimination may be provided.

When combined, improvements (2), (5) and/or (6) detailed above may provide an untrained user the ability to reliably repair the machine 100 in a situation where the sorting pad 118 is damaged due to unexpected debris. For example, the twist-lock debris blade 801 may be removed using a counter-clockwise quarter-turn motion such as with an appropriate tool (e.g., a 5/16" (8 mm) Hex Key), and the pad 118 is then removed by lifting on the outer edge of the pad 118. According to some embodiments, a compound differential adhesive (5) allows the pad 118 to be removed from the turntable 120 surface easily without any or minimal residue being left behind. With improvement (2), the tolerances held during the manufacturing of the pad 118 may eliminate the need for an attendant or operator to adjust the mechanical sorting gap desired for optimal machine operation. With a new pad 118 in place, the twist-lock debris blade 801 may be reinstalled and the machine 100 may be placed back in operation.

Alternative Embodiments

Embodiment 1. A resilient coin sorting pad for imparting motion to a plurality of coins, the resilient pad configured to be coupled to a rotatable disc of a coin sorter, the resilient pad being generally circular and having an outer periphery edge, the resilient pad comprising:

- a lower foam layer having a top surface;
- an upper skin layer coupled to the top surface of the foam layer; and
- a layer of mesh material.

Embodiment 2. The resilient pad of embodiment 1 wherein:

- the upper skin layer comprises at least one layer of nitrile rubber; and
- the layer of mesh material is Kevlar® fiber mesh.

Embodiment 3. The resilient pad of embodiment 1 wherein:

- the upper skin layer comprises at least one layer of nitrile rubber; and
- the layer of mesh material is nylon fiber mesh.

Embodiment 4. The resilient pad of embodiment 2 or embodiment 3 wherein:

- the upper skin layer comprises at least two layers of nitrile rubber; and
- the layer of mesh material is positioned between the at least two layers of nitrile rubber.

Embodiment 5. The resilient pad of embodiment 4 wherein:

- the at least two layers of nitrile rubber comprise a first layer having a first thickness and a second layer having a second thickness, and the layer of mesh material has a third thickness, and the first thickness is larger than the combined thicknesses of the second and third thicknesses, and wherein the first, second, and third thicknesses contribute to a thickness of the skin layer.

Embodiment 6. The resilient pad of embodiment 5 wherein the first, second, and third thicknesses are such that the layer of mesh is positioned in about the lower 33%-35% of the thickness of the skin layer.

Embodiment 7. The resilient pad of embodiment 5 wherein the first, second, and third thicknesses are such that the layer of mesh is positioned in the lower 40% of the thickness of the skin layer.

Embodiment 8. The resilient pad of embodiment 5 wherein the first, second, and third thicknesses are such that the layer of mesh is positioned in the lower 20% of the thickness of the skin layer.

Embodiment 9. The resilient pad of embodiment 5 wherein the first, second, and third thicknesses are such that the layer of mesh is positioned in the lower 50% of the thickness of the skin layer.

Embodiment 10. The resilient pad of embodiment 5 wherein the first, second, and third thicknesses are such that the layer of mesh is positioned in the lower 70% of the thickness of the skin layer.

Embodiment 11. The resilient pad of according to any of embodiments 1-10 wherein the layer of mesh material has a leno weave pattern.

Embodiment 12. The resilient pad of according to any of embodiments 1-10 wherein the layer of mesh material has a triaxial weave pattern.

Embodiment 13. The resilient pad of according to any of embodiments 1-10 wherein the layer of mesh material comprises interwoven fibers.

Embodiment 14. A resilient coin sorting pad for imparting motion to a plurality of coins, the resilient pad designed to be coupled to a rotatable disc of a coin sorter, the resilient pad being generally circular and having an outer periphery edge, the resilient pad comprising:

a lower foam layer having a top surface;

an upper skin layer coupled to the top surface of the foam layer; and one or more coatings of detectable material applied to a top surface of the skin layer.

Embodiment 15. The resilient pad of embodiment 14 wherein:

the detectable material reflects or emits light responsive to infrared illumination.

Embodiment 16. The resilient pad of embodiment 15 wherein:

the detectable material emits visible light responsive to infrared illumination.

Embodiment 17. The resilient pad of according to any of embodiments 14-16 wherein:

the detectable material reflects or emits light responsive to ultraviolet illumination.

Embodiment 18. The resilient pad of any of embodiment 14-17 wherein:

the detectable material emits visible light responsive to ultraviolet illumination.

Embodiment 19. A resilient coin sorting pad for imparting motion to a plurality of coins, the resilient pad designed to be coupled to a rotatable disc of a coin sorter, the resilient pad being generally circular and having an outer periphery edge, the resilient pad comprising:

a lower foam layer having a top surface;

an upper skin layer coupled to the top surface of the foam layer; and one or more electrically conductive elements coupled to or embedded within the skin layer.

Embodiment 20. A coin processing system for processing a plurality of coins comprising:

a rotatable disc having a resilient coin sorting pad of embodiment 19 coupled thereto for imparting motion to the plurality of coins, the resilient pad being generally circular and having an outer periphery edge; and one or more continuity sensors coupled to the one or more electrically conductive elements configured to sense when one or more of the electrically conductive elements have a break therein preventing the flow of electricity therethrough.

Embodiment 21. The coin processing system of embodiment 20 further comprising:

a processor communicatively coupled to the one or more continuity sensors;

a motor operatively coupled to the rotatable disc for causing the rotatable disc to rotate and the motor being communicatively coupled to the processor;

wherein upon sensing one or more of the electrically conductive elements have a break therein preventing the flow of electricity therethrough, the processor sends a signal to the motor to stop the rotation of the rotatable disc.

Embodiment 22. A coin processing system for processing a plurality of coins of a mixed plurality of denominations, the coins of the plurality of denominations having a plurality of diameters, comprising:

a rotatable disc having a resilient coin sorting pad according to any of embodiments 1-19 coupled thereto for imparting motion to the plurality of coins, the resilient pad being generally circular and having an outer periphery edge; and a stationary sorting head having a lower surface generally parallel to and spaced slightly away from the resilient pad, the lower surface forming a coin path for directing the movement of each of the coins.

Embodiment 23. A disc-type coin processing system comprising:

a hopper for receiving coins;

an annular sorting head having a central opening;

a rotatable disc having a top surface; and a resilient pad of according to any of embodiments 1-19 coupled to the top surface of the rotatable disc.

Embodiment 24. A coin processing system for processing a plurality of coins of a mixed plurality of denominations, the coins of the plurality of denominations having a plurality of diameters, comprising:

a rotatable disc having a resilient pad coupled thereto for imparting motion to the plurality of coins, the resilient pad being generally circular and having an outer periphery edge, the resilient pad comprising:

a lower foam layer having a top surface;

an upper skin layer coupled to the top surface of the foam layer; and one or more electrically conductive elements coupled to or embedded within the skin layer, when unbroken the electrically conductive elements conducting electricity and completing one or more associated continuity paths;

a stationary sorting head having a lower surface generally parallel to and spaced slightly away from the resilient pad, the lower surface forming a coin path for directing the movement of each of the coins;

at least one continuity sensor communicatively coupled to a processor or controller, the continuity sensor monitoring whether the one or more electrically conductive elements continue to conduct electricity and complete the associated one or more associated continuity paths;

wherein when the sensor detects that one or more of the continuity paths have been disrupted and no longer conduct electricity, the processor or controller generates a stop signal to stop the rotation of the rotatable disc.

Embodiment 25. The coin processing system of embodiment 24 further comprising a motor driving the rotation of the rotatable disc and being communicatively coupled to the processor or controller; and wherein in response to the generation of a stop signal, the processor or controller halts the operation of the motor.

Embodiment 26. The coin processing system of embodiment 24 or embodiment 25 further comprising a rotatable disc brake communicatively coupled to the processor or controller; and wherein in response to the generation of a stop signal, the processor or controller initiates the operation of the brake to stop the rotation of the rotatable disc.

Embodiment 27. A twist-lock debris blade comprising:

a debris blade post; and a retaining washer interface;

wherein the debris blade post comprises a generally circular lower portion and one or more retaining flanges located near a bottom of the post extending outward from the generally circular lower portion;

wherein the retaining washer interface comprises:

a central, generally circular opening, one or more retaining flange unlocked profiles, one or more retaining flange locking profiles or surfaces, and one or more cam profiles or surfaces between the unlocked profiles and the locking surfaces;

wherein to couple the post to the washer interface, the generally circular lower portion of the post is fitted through the central, generally circular opening of the interface with the retaining flanges lined up with the unlocked profiles, the post is then turned a quarter turn so that the retaining flanges travel under the cam surfaces and are retained by the locking surfaces in the absence of downward pressure on the post;

wherein to uncouple the post from the washer interface, the post is pressed downward and rotated a quarter-turn so that the retaining flanges move out of locked engagement with the locking surfaces and then move over the cam surfaces and are finally aligned with the unlocked profiles of the washer interface, whereby the post may be moved upward and the generally circular lower portion of the post may be removed from the central, generally circular opening of the interface.

Embodiment 28. A twist-lock debris blade or cone comprising:

a post; and a retaining washer interface;

wherein the post comprises a generally circular lower portion and one or more retaining flanges located near a bottom of the post extending outward from the generally circular lower portion;

wherein the retaining washer interface comprises:

a central, generally circular opening, one or more retaining flange unlocked profiles, one or more retaining flange locking profiles or surfaces, and one or more cam profiles or surfaces between the unlocked profiles and the locking surfaces.

Embodiment 29. The twist-lock debris blade or cone of embodiment 28 wherein the generally circular lower portion of the post and the retaining flanges are sized to fit through the central, generally circular opening of the interface when the retaining flanges are lined up with the unlocked profiles and wherein the generally circular lower portion of the post and the retaining flanges are sized not to fit through the central, generally circular opening of the interface when the retaining flanges are lined up with flange locking profiles or surfaces.

Embodiment 30. The twist-lock debris blade or cone of embodiments 28 or 29 wherein the unlocked profiles and the flange locking profiles or surfaces of the retaining washer interface are displaced from each other by about 90° relative to the central, generally circular opening of the retaining washer interface.

Embodiment 31. A method of coupling the post of any of embodiments 28-30 to the retaining washer interface of any of embodiments 28-30 in a disc-type coin processing system comprising an annular sorting head having a central opening, a rotatable disc having a top surface, and a resilient pad coupled to the top surface of the rotatable disc, wherein the post has a longitudinal axis, wherein the retaining washer interface is coupled to the rotatable disc, the method comprising:

aligning the retaining flanges of the post with the unlocked profiles of the retaining washer interface;

fitting the generally circular lower portion of the post through the central, generally circular opening of the interface with the retaining flanges lined up with the unlocked profiles;

pressing downward on the post to overcome an upward bias asserted on the post by the resilient pad and turning the post about its longitudinal axis so that the retaining flanges travel under the cam surfaces of the interface move adjacent to locking surfaces;

removing the downward pressure on the post wherein the retaining flanges are biased upward by the resilient pad into engagement with the locking surfaces of the interface.

Embodiment 32. A method of decoupling the post of any of embodiments 28-30 from the retaining washer interface of any of embodiments 28-30 in a disc-type coin processing system comprising an annular sorting head having a central opening, a rotatable disc having a top surface, and a resilient pad coupled to the top surface of the rotatable disc, wherein the post has a longitudinal axis, wherein the retaining washer interface is coupled to the rotatable disc, and wherein the retaining flanges of the post are biased upward by the resilient pad into engagement with the locking surfaces of the interface, the method comprising:

pressing downward on the post to overcome the upward bias asserted on the post by the resilient pad and turning the post about its longitudinal axis so that the retaining flanges travel under the cam surfaces of the interface move into alignment with the unlocked profiles of the retaining washer interface;

lifting the post upward out of the interface by fitting the generally circular lower portion of the post through the central, generally circular opening of the interface with the retaining flanges aligned with the unlocked profiles.

Embodiment 33. The methods according to any of embodiments 31 or 32 wherein the act of turning the post comprises turning the post a quarter turn.

Embodiment 34. The methods according to any of embodiments 31-33 wherein the post comprises a tool interface located on a top of the post and wherein the acts of pressing downward on the post and turning the post are performed using a tool engaged with the tool interface.

Embodiment 35. A resilient coin sorting pad for imparting motion to a plurality of coins, the resilient pad designed to be coupled to a rotatable disc of a coin sorter, the resilient pad being generally circular and having an outer periphery edge, the resilient pad comprising:

a foam layer having a bottom surface;

a differential adhesive coupled to the bottom surface of the foam layer, the differential adhesive comprising at least two adhesive layers, the adhesive layers having different degrees of tack.

Embodiment 36. The resilient coin sorting pad of embodiment 35 wherein the differential adhesive comprises a layer of high tack coupled to the bottom surface of the foam layer and a layer of lower tack coupled to the layer of high tack adhesive.

Embodiment 37. The resilient coin sorting pad of embodiment 35 or embodiment 36 wherein the differential adhesive comprises a layer of 3M Flexomount™ Solid Printing Tape 412DL coupled to the bottom surface of the foam layer and a layer of 3M Repositionable Tape 9415PC tape coupled to the layer of 3M Flexomount™ Solid Printing Tape 412DL.

Embodiment 38. A coin processing system for processing a plurality of coins of a mixed plurality of denominations, the coins of the plurality of denominations having a plurality of diameters, comprising:

a rotatable disc having a resilient coin sorting pad according to any of embodiments coupled thereto for imparting motion to the plurality of coins, the resilient pad being generally circular and having an outer periphery edge, wherein the adhesive layer having the lower degree of tack contacts and couples the pad to the rotatable disc; and a stationary sorting head having a lower surface generally parallel to and spaced slightly away from the resilient pad, the lower surface forming a coin path for directing the movement of each of the coins.

Embodiment 39. A disc-type coin processing system comprising:

a hopper for receiving coins;

an annular sorting head having a central opening;

a rotatable disc having a top surface; and a resilient pad of according to any of embodiments 35-37 coupled to the top surface of the rotatable disc, wherein the adhesive layer having the lower degree of tack contacts and couples the pad to the rotatable disc.

Embodiment 40. A method of manufacturing a resilient coin sorting pad for imparting motion to a plurality of coins, the resilient pad designed to be coupled to a rotatable disc of a coin sorter, the resilient pad being generally circular and having an outer periphery edge, the pad comprising a foam layer and a skin layer, the method comprising:

a mounting an assembled sorting pad to a vacuum chuck in a lathe;

using a tool post grinder and grinding wheel, grinding the skin layer of the pad so as to bring the thickness of the coin pad to a desired thickness within a tolerance of about +/−0.0015" (about +/−38 μm).

Embodiment 41. A twist-lock cone retaining assembly comprising:

a cone retaining post; and a retaining washer interface;

wherein the cone retaining post comprises a generally circular lower portion and one or more retaining flanges located near a bottom of the post extending outward from the generally circular lower portion;

wherein the retaining washer interface comprises:

a central, generally circular opening in a top surface of the interface, one or more elongated side apertures in communication with the circular opening and extending downward from the top surface of the interface, one or more pivot apertures pivot apertures, a first end of each pivot aperture being in communication with a respective one of the side apertures near a lower end of the side apertures, each pivot aperture having an upper detent near a second end of each pivot aperture.

Embodiment 42. The twist-lock debris blade of embodiment 41 wherein the generally circular lower portion of the post and the retaining flanges are sized to fit through the central, generally circular opening of the interface when the retaining flanges are lined up with the elongated side apertures and wherein the generally circular lower portion of the post and the retaining flanges are sized not to fit through the central, generally circular opening of the interface when the retaining flanges are lined up with the one or more upper detents.

Embodiment 43. The twist-lock debris blade of embodiments 41 or 42 wherein the elongated side apertures and the upper detents of the retaining washer interface are displaced from each other by about 90° relative to the central, generally circular opening of the retaining washer interface.

Embodiment 44. A method of coupling the cone retaining post of any of embodiments 41-43 to the retaining washer interface of any of embodiments 41-43 in a disc-type coin processing system comprising an annular sorting head having a central opening, a rotatable disc having a top surface, and a resilient pad coupled to the top surface of the rotatable disc, wherein the post has a longitudinal axis, wherein the retaining washer interface is coupled to the rotatable disc, wherein the cone retaining post comprises a handle having a cone engaging surface configured to engage a post engaging surface of a cone, the cone having an upper central opening, the method comprising:

positioning the cone over retaining washer interface and over the pad so that the central opening of the cone is aligned with the central, generally circular opening in the top surface of the interface;

aligning the one or more retaining flanges of the cone retaining post with the one or more elongated side apertures of the retaining washer interface;

fitting the generally circular lower portion of the post through the central opening of the cone and the central, generally circular opening of the interface with the retaining flanges lined up with the elongated side apertures;

moving the post downward within the circular opening of the interface until the cone engaging surface of the handle of the post engages the post engaging surface of the cone;

pressing downward on the cone retaining post to overcome an upward bias asserted on the post by the resilient pad via the cone engaging with the cone engaging surface of the post so that the retaining flanges become aligned with the one or more pivot apertures and turning the post about its longitudinal axis so that the retaining flanges move through the pivot apertures until the retaining flanges move adjacent to the one or more detents;

removing the downward pressure on the cone retaining post wherein the retaining flanges are biased upward by the resilient pad into engagement with the detents of the interface.

Embodiment 45. A method of decoupling the cone retaining post of any of embodiments 41-43 from the retaining washer interface of any of embodiments 41-43 in a disc-type coin processing system comprising an annular sorting head having a central opening, a rotatable disc having a top surface, and a resilient pad coupled to the top surface of the rotatable disc, and a cone having an upper central opening, wherein the cone is positioned about the interface, wherein the post has a longitudinal axis, wherein the retaining washer interface is coupled to the rotatable disc, and wherein the retaining flanges of the cone retaining post are biased upward by the resilient pad into engagement with the detents of the interface, and wherein the cone retaining post comprises a cone engaging surface configured to engage a post engaging surface of a cone, the method comprising:

pressing downward on the cone retaining post to overcome the upward bias asserted on the post by the resilient pad and turning the post about its longitudinal axis so that the retaining flanges travel under the detents of the interface and move through the pivot apertures and come into alignment with the side apertures of the retaining washer interface;

lifting the cone retaining post upward out of the interface by fitting the generally circular lower portion of the post through the central, generally circular opening of the interface with the retaining flanges aligned with the side apertures and though the central opening of the cone.

Embodiment 46. The methods according to any of embodiments 44 or 45 wherein the act of turning the post comprises turning the post a quarter turn.

Embodiment 47. The methods according to any of embodiments 44-46 wherein the cone retaining post comprises a tool interface located on a top of the cone retaining post and wherein the acts of pressing downward on the cone retaining post and turning the post are performed using a tool engaged with the tool interface.

Embodiment 48. The methods according to any of embodiments 44-47 wherein the post has a high-friction handle having a knurled surface.

While the disclosure is susceptible to various modifications and alternative forms, specific embodiments have been shown by way of example in the drawings and described in detail herein. It should be understood, however, that the disclosure is not intended to be limited to the particular forms disclosed. Rather, the disclosure is to cover all modifications, equivalents and alternatives falling within the spirit and scope of the inventions as defined by the appended claims.

What is claimed is:

1. A twist-lock debris blade and cone comprising:

a post; and a retaining washer interface, wherein the post comprises a lower portion and one or more retaining flanges located near a bottom of the post extending outward from the lower portion, and wherein the retaining washer interface comprises:

a central opening;

one or more retaining flange unlocked profiles;

one or more retaining flange locking profiles or surfaces; and one or more cam profiles or surfaces between the one or more retaining flange unlocked profiles and the one or more retaining flange locking profiles or surfaces.

2. The twist-lock debris blade and cone of claim 1, wherein the lower portion of the post and the one or more retaining flanges are sized to fit through the central opening of the retaining washer interface when the one or more retaining flanges are lined up with the one or more retaining flange unlocked profiles, and wherein the lower portion of the post and the one or more retaining flanges are sized not to fit through the central opening of the retaining washer interface when the one or more retaining flanges are lined up with the one or more flange locking profiles or surfaces.

3. The twist-lock debris blade and cone of claim 1, further comprising a debris arm coupled to or integral with a center cone.

4. The twist-lock debris blade and cone of claim 3, further comprising an angled washer coupled to the center cone and operable to reduce friction during rotation of the post.

5. The twist-lock debris blade and cone of claim 1, further comprising a stop and a dowel pin inserted above the stop and into an aperture of the post.

6. The twist-lock debris blade and cone of claim 1, wherein:

the post is configured to couple to the retaining washer interface in a disc-type coin processing system, the disc-type coin processing system comprising an annular sorting head having a central opening, a rotatable disc having a top surface, and a resilient pad coupled to the top surface of the rotatable disc;

the post has a longitudinal axis;

the retaining washer interface is coupled to the rotatable disc; and to couple the post to the retaining washer interface in the disc-type coin processing system:

the one or more retaining flanges of the post are configured to be aligned with the one or more retaining flange unlocked profiles of the retaining washer interface;

the lower portion of the post is configured to be fitted through the central opening of the retaining washer interface with the one or more retaining flanges lined up with the one or more retaining flange unlocked profiles;

the post is configured to be pressed downward via downward pressure to overcome an upward bias asserted on the post by the resilient pad and the post is configured to be turned about its longitudinal axis so that the one or more retaining flanges travel under the one or more cam profiles or surfaces of the retaining washer interface and move adjacent to the one or more retaining flange locking profiles or surfaces; and the post is configured to have the downward pressure removed, wherein the one or more retaining flanges are biased upward by the resilient pad into engagement with the one or more retaining flange locking profiles or surfaces of the retaining washer interface.

7. The twist-lock debris blade and cone of claim 1, wherein:

the post is configured to decouple from the retaining washer interface in a disc-type coin processing system, the disc-type coin processing system comprising an annular sorting head having a central opening, a rotatable disc having a top surface, and a resilient pad coupled to the top surface of the rotatable disc;

the post has a longitudinal axis;

the retaining washer interface is coupled to the rotatable disc;

the one or more retaining flanges of the post are biased upward via an upward bias by the resilient pad into engagement with the one or more retaining flange locking profiles or surfaces of the retaining washer interface; and to decouple the post from the retaining washer interface in the disc-type coin processing system:

the post is configured to be pressed downward to overcome the upward bias asserted on the post by the resilient pad and the post is configured to be turned about its longitudinal axis so that the one or more retaining flanges travel under the one or more cam profiles or surfaces of the retaining washer interface move into alignment with the one or more retaining flange unlocked profiles of the retaining washer interface; and the post is configured to be lifted upward out of the retaining washer interface by fitting the lower portion of the post through the central opening of the retaining washer interface with the one or more retaining flanges aligned with the one or more retaining flange unlocked profiles.

8. A twist-lock debris blade and cone retaining assembly comprising:

a cone retaining post; and
a retaining washer interface,
wherein the cone retaining post comprises a lower portion and one or more retaining flanges located near a bottom of the cone retaining post extending outward from the lower portion, and
wherein the retaining washer interface comprises:
a central opening in a top surface of the retaining washer interface;
one or more elongated side apertures in communication with the central opening and extending downward from the top surface of the retaining washer interface; and
one or more pivot apertures, a first end of each pivot aperture being in communication with a respective one of the one or more elongated side apertures near a lower end of the one or more elongated side apertures, each of the one or more pivot apertures having an upper detent near a second end of each of the one or more pivot apertures.

9. The twist-lock debris blade and cone retaining assembly of claim 8, further comprising a cone having a center opening including one or more cut outs sized according to the one or more retaining flanges.

10. The twist-lock debris blade and cone retaining assembly of claim 8, wherein the cone retaining post includes a high-friction handle disposed near a top of the cone retaining post.

11. The twist-lock debris blade and cone retaining assembly of claim 10, wherein the high-friction handle has a knurled surface.

12. The twist-lock debris blade and cone retaining assembly of claim 8, wherein the retaining washer interface further comprises a threaded post configured to be threaded into a disc of a coin sorting system.

13. The twist-lock debris blade and cone retaining assembly of claim 8, wherein:
the cone retaining post is configured to couple to the retaining washer interface in a disc-type coin processing system, the disc-type coin processing system comprising an annular sorting head having a central opening, a rotatable disc having a top surface, and a resilient pad coupled to the top surface of the rotatable disc;
the cone retaining post has a longitudinal axis;
the retaining washer interface is coupled to the rotatable disc;
the cone retaining post comprises a handle having a cone engaging surface configured to engage a post engaging surface of a cone, the cone having an upper central opening; and
to couple the cone retaining post to the retaining washer interface in the disc-type coin processing system:
the cone is configured to be positioned over the retaining washer interface and over the resilient pad so that the central opening of the cone is aligned with the central opening in the top surface of the retaining washer interface;
the one or more retaining flanges of the cone retaining post is configured to be aligned with the one or more elongated side apertures of the retaining washer interface;
the lower portion of the cone retaining post is configured to be fitted through the central opening of the cone and the central opening of the retaining washer interface with the one or more retaining flanges lined up with the one or more elongated side apertures;
the cone retaining post is configured to be moved downward within the central opening of the retaining washer interface until the cone engaging surface of the handle of the cone retaining post engages the post engaging surface of the cone;
the cone retaining post is configured to be pressed downward via downward pressure to overcome an upward bias asserted on the cone retaining post by the resilient pad via the cone engaging with the cone engaging surface of the cone retaining post so that the one or more retaining flanges become aligned with the one or more pivot apertures and the cone retaining post is configured to be turned about its longitudinal axis so that the one or more retaining flanges move through the pivot apertures until the one or more retaining flanges move adjacent to a corresponding one of the upper detents; and
the cone retaining post is configured to have the downward pressure removed, wherein the one or more retaining flanges are biased upward by the resilient pad into engagement with the corresponding one of the upper detents of the retaining washer interface.

14. The twist-lock debris blade and cone retaining assembly of claim 8, wherein the cone retaining post is configured to decouple from the retaining washer interface in a disc-type coin processing system, the disc-type coin processing system comprising an annular sorting head having a central opening, a rotatable disc having a top surface, and a resilient pad coupled to the top surface of the rotatable disc;
the cone retaining post has a longitudinal axis;
the retaining washer interface is coupled to the rotatable disc;
the one or more retaining flanges of the cone retaining post are biased upward via an upward bias by the resilient pad into engagement with a corresponding one of the upper detents of the retaining washer interface;
the cone retaining post comprises a cone engaging surface configured to engage a post engaging surface of a cone; and
to decouple the cone retaining post from the retaining washer interface in the disc-type coin processing system:
the cone retaining post is configured to be pressed downward to overcome the upward bias asserted on the cone retaining post by the resilient pad and the cone retaining post is configured to be turned about its longitudinal axis so that the one or more retaining flanges travel under the corresponding one of the upper detents of the retaining washer interface and move through the pivot apertures and come into alignment with the one or more elongated side apertures of the retaining washer interface; and
the cone retaining post is configured to be lifted upward out of the retaining washer interface by fitting the lower portion of the cone retaining post through the central opening of the retaining washer interface with the one or more retaining flanges aligned with the one or more elongated side apertures and though the central opening of the cone.

* * * * *